United States Patent
Kramar et al.

(10) Patent No.: US 11,824,898 B2
(45) Date of Patent: *Nov. 21, 2023

(54) USER INTERFACES FOR MANAGING A LOCAL NETWORK

(71) Applicant: Apple Inc., Cupertino, CA (US)

(72) Inventors: Vitalii Kramar, Mountain View, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,789

(22) Filed: May 17, 2022

(65) Prior Publication Data

US 2022/0279022 A1    Sep. 1, 2022

Related U.S. Application Data

(63) Continuation of application No. 16/817,328, filed on Mar. 12, 2020, now Pat. No. 11,363,071.

(Continued)

(51) Int. Cl.
*H04L 9/40* (2022.01)
*H04L 12/08* (2006.01)
*H04L 41/0893* (2022.01)

(52) U.S. Cl.
CPC .......... *H04L 63/20* (2013.01); *H04L 12/08* (2013.01); *H04L 41/0893* (2013.01);

(Continued)

(58) Field of Classification Search
CPC ..... H04L 63/20; H04L 12/08; H04L 41/0893; H04L 63/0227; H04L 63/102;
(Continued)

(56) References Cited

U.S. PATENT DOCUMENTS 5,086,385 A    2/1992   Launey et al.
5,974,235 A   10/1999   Nunally et al.
(Continued)

FOREIGN PATENT DOCUMENTS

CN    1641589 A    7/2005
CN    1679019 A   10/2005
(Continued)

OTHER PUBLICATIONS

Notice of Allowance received for Japanese Patent Application No. 2022-014389, dated Jan. 27, 2023, 4 pages (1 page of English Translation and 3 pages of Official Copy).
(Continued)

*Primary Examiner* — El Hadji M Sall
(74) *Attorney, Agent, or Firm* — DLA Piper LLP (US)

(57) ABSTRACT

The present disclosure generally relates to user interfaces for managing a local network using an electronic device, where the electronic device is connected to a router and a plurality of external devices, including a first set of one or more external devices and a second set of one or more external devices, on the local network. The user interfaces enable a user to apply the same network access policy to the first set of one or more external devices and the second set of one or more external devices or to apply different network access policies to the first set of one or more external devices and the second set of one or more external devices, respectively.

18 Claims, 31 Drawing Sheets

Related U.S. Application Data

(60) Provisional application No. 62/855,815, filed on May 31, 2019.

(52) U.S. Cl.
CPC ........ *H04L 63/0227* (2013.01); *H04L 63/102* (2013.01); *H04L 63/105* (2013.01)

(58) Field of Classification Search
CPC ............. H04L 63/105; H04L 2012/285; H04L 12/282; H04L 41/0894; H04L 41/0886; H04L 41/22; H04M 1/72415; H04W 12/37; H04W 84/12; H04W 12/08; H04W 12/50; G06F 3/0488; G06F 3/0482; G06F 9/451; G06F 3/0483

See application file for complete search history.

(56) References Cited

U.S. PATENT DOCUMENTS

| | | | |
|---|---|---|---|
| 6,140,987 A | 10/2000 | Stein et al. | |
| 6,456,306 B1 | 9/2002 | Chin et al. | |
| 6,483,986 B1 | 11/2002 | Krapf | |
| 6,901,439 B1 | 5/2005 | Bonasia et al. | |
| 6,912,429 B1 | 6/2005 | Bilger | |
| 6,931,594 B1 | 8/2005 | Jun | |
| 7,092,768 B1 | 8/2006 | Labuda | |
| 7,293,280 B1 | 11/2007 | Gupta et al. | |
| 7,401,351 B2 | 7/2008 | Boreczky et al. | |
| 7,571,014 B1 | 8/2009 | Lambourne et al. | |
| 7,730,223 B1 | 6/2010 | Bavor et al. | |
| 7,859,571 B1 | 12/2010 | Brown et al. | |
| 7,904,814 B2 | 3/2011 | Errico et al. | |
| 8,031,230 B2 | 10/2011 | Takada | |
| 8,214,494 B1 | 7/2012 | Slavin | |
| 8,234,395 B2 | 7/2012 | Millington | |
| 8,253,704 B2 | 8/2012 | Jang | |
| 8,516,374 B2 | 8/2013 | Fleischman et al. | |
| 8,745,500 B1 | 6/2014 | Kostello et al. | |
| 8,762,844 B2 | 6/2014 | Kim et al. | |
| 8,914,752 B1 | 12/2014 | Spiegel | |
| 8,954,889 B2 | 2/2015 | Fujibayashi | |
| 8,990,861 B2 | 3/2015 | Nishikawa et al. | |
| 9,021,526 B1 | 4/2015 | Baron et al. | |
| 9,082,018 B1 | 7/2015 | Laska et al. | |
| 9,158,974 B1 | 10/2015 | Laska et al. | |
| 9,170,707 B1 | 10/2015 | Laska et al. | |
| 9,185,062 B1 | 11/2015 | Yang et al. | |
| 9,247,380 B1 | 1/2016 | Vincent | |
| 9,313,556 B1 | 4/2016 | Borel et al. | |
| 9,361,011 B1 | 6/2016 | Burns et al. | |
| 9,413,606 B1 | 8/2016 | Roberts | |
| 9,433,032 B1 | 8/2016 | Ghadge et al. | |
| 9,454,336 B1 | 9/2016 | Rudradevan et al. | |
| 9,582,178 B2 | 2/2017 | Grant et al. | |
| 9,680,982 B2 | 6/2017 | Fiedler | |
| 9,727,346 B2 | 8/2017 | Shao | |
| 9,728,230 B2 | 8/2017 | Cudak et al. | |
| 9,750,116 B2 | 8/2017 | Witzgall | |
| 9,858,739 B1 | 1/2018 | Johnson et al. | |
| 9,898,175 B2 | 2/2018 | Fiedler | |
| 10,055,094 B2 | 8/2018 | Li et al. | |
| 10,068,364 B2 | 9/2018 | Cui | |
| 10,091,017 B2 | 10/2018 | Landow et al. | |
| 10,120,536 B2 | 11/2018 | Cha et al. | |
| 10,142,122 B1 | 11/2018 | Hill et al. | |
| 10,219,026 B2 | 2/2019 | Eim et al. | |
| 10,237,141 B2 | 3/2019 | Sasaki et al. | |
| 10,282,068 B2 | 5/2019 | Dubin et al. | |
| 10,284,980 B1 | 5/2019 | Woo et al. | |
| 10,296,128 B1 | 5/2019 | Nold et al. | |
| 10,298,643 B1 | 5/2019 | Toal et al. | |
| 10,303,422 B1 | 5/2019 | Woo et al. | |
| 10,310,725 B2 | 6/2019 | Smith et al. | |
| 10,409,239 B2 | 9/2019 | Reeder et al. | |
| 10,436,977 B2 | 10/2019 | Bergman et al. | |
| 10,454,781 B2 | 10/2019 | Sasaki et al. | |
| 10,474,349 B2 | 11/2019 | Jang et al. | |
| 10,511,456 B2 | 12/2019 | Smith et al. | |
| 10,523,625 B1 | 12/2019 | Allen et al. | |
| 10,631,123 B2 | 4/2020 | O'keeffe | |
| 10,708,653 B1 | 7/2020 | Stinson et al. | |
| 10,779,085 B1 | 9/2020 | Carrigan | |
| 10,924,446 B1 | 2/2021 | Paul | |
| 10,963,145 B1 | 3/2021 | Voss et al. | |
| 11,079,913 B1 | 8/2021 | Kim et al. | |
| 2001/0030597 A1 | 10/2001 | Inoue et al. | |
| 2002/0012526 A1 | 1/2002 | Sai et al. | |
| 2002/0060701 A1 | 5/2002 | Naughton et al. | |
| 2002/0063737 A1 | 5/2002 | Feig et al. | |
| 2002/0154888 A1 | 10/2002 | Allen et al. | |
| 2002/0180774 A1 | 12/2002 | Errico et al. | |
| 2003/0040813 A1 | 2/2003 | Gonzales et al. | |
| 2003/0063130 A1 | 4/2003 | Barbieri et al. | |
| 2003/0093790 A1 | 5/2003 | Logan et al. | |
| 2003/0110511 A1 | 6/2003 | Schutte et al. | |
| 2003/0112938 A1 | 6/2003 | Kanakubo et al. | |
| 2004/0003051 A1 | 1/2004 | Krzyzanowski et al. | |
| 2004/0131254 A1 | 7/2004 | Liang et al. | |
| 2005/0055472 A1 | 3/2005 | Krzyzanowski et al. | |
| 2005/0094610 A1 | 5/2005 | De et al. | |
| 2005/0144247 A1 | 6/2005 | Christensen et al. | |
| 2005/0163345 A1 | 7/2005 | Van et al. | |
| 2005/0169503 A1 | 8/2005 | Howell et al. | |
| 2005/0275626 A1 | 12/2005 | Mueller et al. | |
| 2006/0002523 A1 | 1/2006 | Bettis et al. | |
| 2006/0013554 A1 | 1/2006 | Poslinski et al. | |
| 2006/0034586 A1 | 2/2006 | Millar et al. | |
| 2006/0132455 A1 | 6/2006 | Rimas-ribikauskas et al. | |
| 2006/0171453 A1 | 8/2006 | Rohlfing et al. | |
| 2006/0174035 A1* | 8/2006 | Tufail .................. | H04L 45/02 |
| | | | 709/239 |
| 2006/0221184 A1 | 10/2006 | Vallone et al. | |
| 2006/0279628 A1 | 12/2006 | Fleming | |
| 2006/0280186 A1 | 12/2006 | Carlton et al. | |
| 2007/0033632 A1 | 2/2007 | Baynger et al. | |
| 2007/0050452 A1 | 3/2007 | Raju et al. | |
| 2007/0061020 A1 | 3/2007 | Bovee et al. | |
| 2007/0162762 A1 | 7/2007 | Huh et al. | |
| 2007/0174774 A1 | 7/2007 | Lerman et al. | |
| 2007/0192486 A1 | 8/2007 | Wilson et al. | |
| 2007/0198111 A1 | 8/2007 | Oetzel et al. | |
| 2007/0241945 A1 | 10/2007 | Moorer et al. | |
| 2008/0165160 A1 | 7/2008 | Kocienda et al. | |
| 2009/0133070 A1 | 5/2009 | Hamano et al. | |
| 2009/0153289 A1 | 6/2009 | Hope et al. | |
| 2009/0199119 A1 | 8/2009 | Park et al. | |
| 2009/0220206 A1 | 9/2009 | Kisliakov | |
| 2009/0232028 A1 | 9/2009 | Baalbergen et al. | |
| 2009/0282362 A1 | 11/2009 | Matsumoto | |
| 2009/0299810 A1 | 12/2009 | Jardine et al. | |
| 2010/0081375 A1 | 4/2010 | Rosenblatt et al. | |
| 2010/0121636 A1 | 5/2010 | Burke et al. | |
| 2010/0138007 A1 | 6/2010 | Clark et al. | |
| 2010/0145485 A1 | 6/2010 | Duchene et al. | |
| 2010/0191575 A1 | 7/2010 | Raleigh | |
| 2010/0191833 A1 | 7/2010 | Hofrichter et al. | |
| 2010/0201815 A1 | 8/2010 | Anderson et al. | |
| 2010/0267370 A1 | 10/2010 | Lee | |
| 2010/0318917 A1 | 12/2010 | Holladay et al. | |
| 2010/0318928 A1 | 12/2010 | Neuman et al. | |
| 2010/0318939 A1 | 12/2010 | Moon | |
| 2011/0040754 A1 | 2/2011 | Peto et al. | |
| 2011/0040760 A1 | 2/2011 | Fleischman et al. | |
| 2011/0071656 A1 | 3/2011 | Mckiel, Jr. | |
| 2011/0145745 A1 | 6/2011 | Hyeon et al. | |
| 2011/0173545 A1 | 7/2011 | Meola et al. | |
| 2011/0228084 A1 | 9/2011 | Colciago | |
| 2011/0249861 A1 | 10/2011 | Tokutake | |
| 2011/0252357 A1 | 10/2011 | Chaudhri | |
| 2011/0254683 A1 | 10/2011 | Soldan et al. | |
| 2012/0054278 A1 | 3/2012 | Taleb et al. | |
| 2012/0066632 A1 | 3/2012 | Sundermeyer et al. | |
| 2012/0070129 A1 | 3/2012 | Lin et al. | |

(56) References Cited

U.S. PATENT DOCUMENTS

| | | |
|---|---|---|
| 2012/0169583 A1 | 7/2012 | Rippel et al. |
| 2012/0173767 A1 | 7/2012 | Kim et al. |
| 2012/0177339 A1 | 7/2012 | Chang et al. |
| 2012/0223890 A1 | 9/2012 | Borovsky et al. |
| 2012/0266199 A1 | 10/2012 | Noonan et al. |
| 2012/0269361 A1 | 10/2012 | Bhow et al. |
| 2012/0282974 A1 | 11/2012 | Green et al. |
| 2012/0311499 A1 | 12/2012 | Dellinger et al. |
| 2013/0060352 A1 | 3/2013 | Kouda et al. |
| 2013/0099672 A1 | 4/2013 | Lin et al. |
| 2013/0113822 A1 | 5/2013 | Putrevu et al. |
| 2013/0124997 A1 | 5/2013 | Speir et al. |
| 2013/0132865 A1 | 5/2013 | Li |
| 2013/0141223 A1 | 6/2013 | Brandsma et al. |
| 2013/0225152 A1 | 8/2013 | Matthews et al. |
| 2013/0227414 A1 | 8/2013 | Hwang et al. |
| 2013/0282180 A1 | 10/2013 | Layton |
| 2013/0283161 A1 | 10/2013 | Reimann et al. |
| 2013/0298021 A1 | 11/2013 | Park et al. |
| 2013/0331083 A1 | 12/2013 | Oslund |
| 2014/0013243 A1 | 1/2014 | Flynn et al. |
| 2014/0025798 A1 | 1/2014 | Apte et al. |
| 2014/0068439 A1 | 3/2014 | Lacaze et al. |
| 2014/0068486 A1 | 3/2014 | Sellers et al. |
| 2014/0070959 A1 | 3/2014 | Bhargava et al. |
| 2014/0075321 A1 | 3/2014 | Masera |
| 2014/0082501 A1 | 3/2014 | Bae et al. |
| 2014/0092292 A1 | 4/2014 | Kuznetsov et al. |
| 2014/0150029 A1 | 5/2014 | Avedissian et al. |
| 2014/0215365 A1 | 7/2014 | Hiraga et al. |
| 2014/0218517 A1 | 8/2014 | Kim et al. |
| 2014/0232273 A1 | 8/2014 | Sasaki et al. |
| 2014/0236325 A1 | 8/2014 | Sasaki et al. |
| 2014/0237419 A1 | 8/2014 | Ryu |
| 2014/0257532 A1 | 9/2014 | Kim et al. |
| 2014/0258854 A1 | 9/2014 | Li |
| 2014/0267068 A1 | 9/2014 | Smith et al. |
| 2014/0267549 A1 | 9/2014 | Pinter et al. |
| 2014/0285017 A1 | 9/2014 | Noguchi et al. |
| 2014/0293046 A1 | 10/2014 | Ni |
| 2014/0313032 A1 | 10/2014 | Sager et al. |
| 2014/0363024 A1 | 12/2014 | Apodaca |
| 2014/0365980 A1 | 12/2014 | Morrison et al. |
| 2014/0375819 A1 | 12/2014 | Larsen et al. |
| 2014/0380234 A1 | 12/2014 | Shim et al. |
| 2015/0008845 A1 | 1/2015 | Kim et al. |
| 2015/0010167 A1 | 1/2015 | Arling et al. |
| 2015/0042576 A1 | 2/2015 | Wang |
| 2015/0058780 A1 | 2/2015 | Malik et al. |
| 2015/0071601 A1 | 3/2015 | Dabous et al. |
| 2015/0081072 A1 | 3/2015 | Kallai et al. |
| 2015/0082225 A1 | 3/2015 | Shearer |
| 2015/0092009 A1 | 4/2015 | Deluca et al. |
| 2015/0095804 A1 | 4/2015 | Grossman et al. |
| 2015/0095937 A1 | 4/2015 | Tobin |
| 2015/0106721 A1 | 4/2015 | Cha et al. |
| 2015/0113418 A1 | 4/2015 | Sasaki et al. |
| 2015/0120768 A1 | 4/2015 | Wellen et al. |
| 2015/0135068 A1 | 5/2015 | Chiu |
| 2015/0142587 A1 | 5/2015 | Salgar et al. |
| 2015/0145435 A1 | 5/2015 | Ogawa |
| 2015/0146945 A1 | 5/2015 | Han |
| 2015/0147067 A1 | 5/2015 | Ryan et al. |
| 2015/0159895 A1 | 6/2015 | Quam et al. |
| 2015/0160797 A1 | 6/2015 | Shearer et al. |
| 2015/0177914 A1 | 6/2015 | Coyner et al. |
| 2015/0180922 A1 | 6/2015 | Draznin et al. |
| 2015/0188724 A1 | 7/2015 | Kim et al. |
| 2015/0193196 A1 | 7/2015 | Lin et al. |
| 2015/0198938 A1 | 7/2015 | Steele et al. |
| 2015/0201480 A1 | 7/2015 | Ogawa |
| 2015/0207849 A1 | 7/2015 | Bingzhou et al. |
| 2015/0244539 A1 | 8/2015 | Ickman et al. |
| 2015/0256957 A1 | 9/2015 | Kim et al. |
| 2015/0264304 A1 | 9/2015 | Chastney et al. |
| 2015/0319006 A1 | 11/2015 | Plummer et al. |
| 2015/0319046 A1 | 11/2015 | Plummer et al. |
| 2015/0332586 A1 | 11/2015 | Hamm et al. |
| 2015/0341227 A1 | 11/2015 | Tatzel et al. |
| 2015/0348493 A1 | 12/2015 | Chae et al. |
| 2015/0350031 A1 | 12/2015 | Burks et al. |
| 2015/0370230 A1 | 12/2015 | Duchene et al. |
| 2015/0370426 A1 | 12/2015 | Carrigan et al. |
| 2016/0004499 A1 | 1/2016 | Kim et al. |
| 2016/0005281 A1 | 1/2016 | Laska et al. |
| 2016/0033985 A1 | 2/2016 | Gulli' et al. |
| 2016/0037140 A1 | 2/2016 | Lindsey et al. |
| 2016/0037436 A1 | 2/2016 | Spencer et al. |
| 2016/0043905 A1 | 2/2016 | Fiedler |
| 2016/0043962 A1 | 2/2016 | Kim et al. |
| 2016/0070244 A1 | 3/2016 | Cipollo et al. |
| 2016/0073197 A1 | 3/2016 | Hammer et al. |
| 2016/0073482 A1 | 3/2016 | Fok et al. |
| 2016/0085412 A1 | 3/2016 | Meganathan et al. |
| 2016/0092072 A1 | 3/2016 | So et al. |
| 2016/0093180 A1 | 3/2016 | Fitzgibbon et al. |
| 2016/0093338 A1 | 3/2016 | Laska et al. |
| 2016/0099901 A1 | 4/2016 | Allen et al. |
| 2016/0103830 A1 | 4/2016 | Cheong et al. |
| 2016/0117402 A1 | 4/2016 | Gowel |
| 2016/0133297 A1 | 5/2016 | Thornton et al. |
| 2016/0139752 A1 | 5/2016 | Shim et al. |
| 2016/0150135 A1 | 5/2016 | Chen |
| 2016/0165390 A1 | 6/2016 | Hartzell et al. |
| 2016/0173318 A1 | 6/2016 | Ha et al. |
| 2016/0179068 A1 | 6/2016 | Qian et al. |
| 2016/0187995 A1 | 6/2016 | Rosewall |
| 2016/0191992 A1 | 6/2016 | Kwon |
| 2016/0224233 A1 | 8/2016 | Phang et al. |
| 2016/0231902 A1 | 8/2016 | Sirpal et al. |
| 2016/0253145 A1 | 9/2016 | Lee et al. |
| 2016/0255706 A1 | 9/2016 | Kim et al. |
| 2016/0259459 A1 | 9/2016 | Yang et al. |
| 2016/0277903 A1 | 9/2016 | Poosala et al. |
| 2016/0286630 A1 | 9/2016 | Witzgall |
| 2016/0301566 A1* | 10/2016 | Ramasubramani .......................... H04L 41/0813 |
| 2016/0320849 A1 | 11/2016 | Koo |
| 2016/0335041 A1 | 11/2016 | Wachter et al. |
| 2016/0364123 A1 | 12/2016 | Burns et al. |
| 2016/0364129 A1 | 12/2016 | Mclean et al. |
| 2016/0366481 A1 | 12/2016 | Lim et al. |
| 2017/0017531 A1 | 1/2017 | Choi et al. |
| 2017/0046025 A1 | 2/2017 | Dascola et al. |
| 2017/0053008 A1 | 2/2017 | Frenkel et al. |
| 2017/0070775 A1 | 3/2017 | Taxier et al. |
| 2017/0078767 A1 | 3/2017 | Borel et al. |
| 2017/0084135 A1 | 3/2017 | Yu |
| 2017/0097621 A1 | 4/2017 | Ackmann et al. |
| 2017/0185277 A1 | 6/2017 | Sundermeyer et al. |
| 2017/0206779 A1 | 7/2017 | Lee et al. |
| 2017/0251314 A1 | 8/2017 | Pye et al. |
| 2017/0285788 A1 | 10/2017 | Park et al. |
| 2017/0302779 A1 | 10/2017 | Zhao et al. |
| 2017/0337791 A1 | 11/2017 | Gordon-Carroll |
| 2017/0352380 A1 | 12/2017 | Doumbouya et al. |
| 2017/0357425 A1 | 12/2017 | Smith et al. |
| 2017/0357434 A1 | 12/2017 | Coffman et al. |
| 2017/0359189 A1 | 12/2017 | Smith et al. |
| 2017/0359191 A1 | 12/2017 | Smith et al. |
| 2017/0359311 A1* | 12/2017 | Chen .................. H04L 63/0823 |
| 2017/0359555 A1 | 12/2017 | Irani et al. |
| 2018/0014043 A1 | 1/2018 | Zhang et al. |
| 2018/0014077 A1 | 1/2018 | Hou et al. |
| 2018/0018081 A1 | 1/2018 | Dattilo-green et al. |
| 2018/0019889 A1 | 1/2018 | Burns et al. |
| 2018/0088795 A1 | 3/2018 | Van Os et al. |
| 2018/0101297 A1 | 4/2018 | Yang et al. |
| 2018/0109754 A1 | 4/2018 | Kwon |
| 2018/0113577 A1 | 4/2018 | Burns et al. |
| 2018/0115788 A1 | 4/2018 | Burns et al. |
| 2018/0199080 A1 | 7/2018 | Jackson et al. |
| 2018/0227341 A1 | 8/2018 | Rizzi |
| 2018/0228003 A1 | 8/2018 | O'driscoll et al. |

(56) References Cited

U.S. PATENT DOCUMENTS

| | | |
|---|---|---|
| 2018/0232592 A1 | 8/2018 | Stewart et al. |
| 2018/0232705 A1 | 8/2018 | Baker et al. |
| 2018/0246639 A1 | 8/2018 | Han et al. |
| 2018/0249113 A1 | 8/2018 | Faulkner |
| 2018/0308480 A1 | 10/2018 | Jang et al. |
| 2018/0332559 A1 | 11/2018 | Gudivada et al. |
| 2018/0341448 A1 | 11/2018 | Behzadi et al. |
| 2018/0364665 A1 | 12/2018 | Clymer et al. |
| 2018/0367578 A1 | 12/2018 | Verma et al. |
| 2019/0025943 A1 | 1/2019 | Jobs et al. |
| 2019/0026021 A1 | 1/2019 | Coffman et al. |
| 2019/0028419 A1 | 1/2019 | Sullivan |
| 2019/0056907 A1 | 2/2019 | So et al. |
| 2019/0089934 A1 | 3/2019 | Goulden et al. |
| 2019/0102145 A1 | 4/2019 | Wilberding et al. |
| 2019/0130185 A1 | 5/2019 | Delaney et al. |
| 2019/0138951 A1 | 5/2019 | Brownhill et al. |
| 2019/0208282 A1 | 7/2019 | Singh et al. |
| 2019/0265946 A1 | 8/2019 | Bae et al. |
| 2019/0286651 A1 | 9/2019 | Lee et al. |
| 2019/0295393 A1 | 9/2019 | Lee et al. |
| 2019/0342621 A1 | 11/2019 | Carrigan et al. |
| 2019/0342622 A1 | 11/2019 | Carrigan et al. |
| 2019/0361575 A1 | 11/2019 | Ni et al. |
| 2020/0050502 A1 | 2/2020 | Ghafourifar et al. |
| 2020/0135191 A1 | 4/2020 | Nourbakhsh |
| 2020/0152186 A1 | 5/2020 | Koh et al. |
| 2020/0186378 A1 | 6/2020 | Six et al. |
| 2020/0225841 A1 | 7/2020 | Coffman et al. |
| 2020/0302913 A1 | 9/2020 | Marcinkiewicz |
| 2020/0382332 A1 | 12/2020 | Carrigan et al. |
| 2020/0382559 A1 | 12/2020 | Kramar et al. |
| 2020/0395012 A1 | 12/2020 | Kim et al. |
| 2020/0413197 A1 | 12/2020 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0092491 A1 | 3/2021 | Carrigan et al. |
| 2021/0099829 A1 | 4/2021 | Soto et al. |
| 2021/0158830 A1 | 5/2021 | Boehlke |
| 2021/0266274 A1 | 8/2021 | Liu et al. |
| 2021/0323406 A1 | 10/2021 | So et al. |
| 2021/0349680 A1 | 11/2021 | Kim et al. |
| 2021/0352172 A1 | 11/2021 | Kim et al. |
| 2022/0004356 A1 | 1/2022 | Kim et al. |
| 2022/0365667 A1 | 11/2022 | Carrigan et al. |
| 2023/0041125 A1 | 2/2023 | Kim et al. |
| 2023/0082492 A1 | 3/2023 | Coffman et al. |

FOREIGN PATENT DOCUMENTS

| | | |
|---|---|---|
| CN | 101517557 A | 8/2009 |
| CN | 101627361 A | 1/2010 |
| CN | 102202192 A | 9/2011 |
| CN | 102915630 A | 2/2013 |
| CN | 102932216 A | 2/2013 |
| CN | 103136497 A | 6/2013 |
| CN | 103347116 A | 10/2013 |
| CN | 103677711 A | 3/2014 |
| CN | 104076757 A | 10/2014 |
| CN | 104155938 A | 11/2014 |
| CN | 104247449 A | 12/2014 |
| CN | 104284477 A | 1/2015 |
| CN | 104298188 A | 1/2015 |
| CN | 104429094 A | 3/2015 |
| CN | 104469512 A | 3/2015 |
| CN | 104581043 A | 4/2015 |
| CN | 104684207 A | 6/2015 |
| CN | 104766021 A | 7/2015 |
| CN | 104780654 A | 7/2015 |
| CN | 104820631 A | 8/2015 |
| CN | 104898603 A | 9/2015 |
| CN | 104956417 A | 9/2015 |
| CN | 105069118 A | 11/2015 |
| CN | 105159107 A | 12/2015 |
| CN | 105263114 A | 1/2016 |
| CN | 105373165 A | 3/2016 |
| CN | 105374192 A | 3/2016 |
| CN | 105474580 A | 4/2016 |
| CN | 105553796 A | 5/2016 |
| CN | 105900376 A | 8/2016 |
| CN | 107197441 A | 9/2017 |
| CN | 107533368 A | 1/2018 |
| CN | 107613235 A | 1/2018 |
| CN | 107819928 A | 3/2018 |
| CN | 109117078 A | 1/2019 |
| CN | 109196825 A | 1/2019 |
| CN | 109287140 A | 1/2019 |
| CN | 109302531 A | 2/2019 |
| CN | 109348052 A | 2/2019 |
| CN | 109688441 A | 4/2019 |
| CN | 109688442 A | 4/2019 |
| EP | 1881649 A2 | 1/2008 |
| EP | 2675195 A2 | 12/2013 |
| EP | 2784611 A2 | 10/2014 |
| EP | 2797391 A1 | 10/2014 |
| EP | 2879470 A1 | 6/2015 |
| EP | 2894948 A2 | 7/2015 |
| EP | 2933953 A1 | 10/2015 |
| EP | 2981093 A1 | 2/2016 |
| EP | 3038427 A1 | 6/2016 |
| EP | 3445058 A1 | 2/2019 |
| EP | 3460770 A1 | 3/2019 |
| EP | 3038427 B1 | 12/2019 |
| GB | 2499123 A | 8/2013 |
| GB | 2512821 A | 10/2014 |
| GB | 2533101 A | 6/2016 |
| IN | 1038/MUM/2005 A | 6/2007 |
| JP | 4-175921 A | 6/1992 |
| JP | 6-178356 A | 6/1994 |
| JP | 2002-153678 A | 5/2002 |
| JP | 2004-110559 A | 4/2004 |
| JP | 2006-350819 A | 12/2006 |
| JP | 2008-99330 A | 4/2008 |
| JP | 2009-201127 A | 9/2009 |
| JP | 2011-124665 A | 6/2011 |
| JP | 2012-73839 A | 4/2012 |
| JP | 2012-123460 A | 6/2012 |
| JP | 2013-98613 A | 5/2013 |
| JP | 2014-71835 A | 4/2014 |
| JP | 2014-87126 A | 5/2014 |
| JP | 2014-160461 A | 9/2014 |
| JP | 2014-170982 A | 9/2014 |
| JP | 2014-186961 A | 10/2014 |
| JP | 2015-70327 A | 4/2015 |
| JP | 2015-125671 A | 7/2015 |
| JP | 2015-128043 A | 7/2015 |
| JP | 2015-128326 A | 7/2015 |
| JP | 2015-149710 A | 8/2015 |
| JP | 2015-154253 A | 8/2015 |
| JP | 2015-195222 A | 11/2015 |
| JP | 2015-211035 A | 11/2015 |
| JP | 2016-51661 A | 4/2016 |
| JP | 2016-72953 A | 5/2016 |
| JP | 2016-119600 A | 6/2016 |
| JP | 2017-41008 A | 2/2017 |
| JP | 2017-508195 A | 3/2017 |
| JP | 2017-84253 A | 5/2017 |
| JP | 2017-158202 A | 9/2017 |
| JP | 2018-7158 A | 1/2018 |
| JP | 2018-63826 A | 4/2018 |
| JP | 2019-526095 A | 9/2019 |
| KR | 10-2001-0091156 A | 10/2001 |
| KR | 10-2011-0022980 A | 3/2011 |
| KR | 10-2011-0093040 A | 8/2011 |
| KR | 10-2012-0059860 A | 6/2012 |
| KR | 10-2012-0079208 A | 7/2012 |
| KR | 10-2013-0115611 A | 10/2013 |
| KR | 10-2014-0148289 A | 12/2014 |
| KR | 10-2015-0005134 A | 1/2015 |
| KR | 10-2015-0043146 A | 4/2015 |
| KR | 10-1522311 B1 | 5/2015 |
| KR | 10-2015-0136440 A | 12/2015 |
| KR | 10-2017-0008601 A | 1/2017 |

(56) References Cited

FOREIGN PATENT DOCUMENTS

| | | |
|---|---|---|
| KR | 10-2017-0100358 A | 9/2017 |
| KR | 10-2018-0034637 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0057414 A | 5/2019 |
| KR | 20200039030 A | 4/2020 |
| TW | 201547326 A | 12/2015 |
| WO | 2000/39964 A1 | 7/2000 |
| WO | 2005/055521 A1 | 6/2005 |
| WO | 2011/027964 A1 | 3/2011 |
| WO | 2012/085794 A1 | 6/2012 |
| WO | 2014/030540 A1 | 2/2014 |
| WO | 2014/128800 A1 | 8/2014 |
| WO | 2014/155429 A1 | 10/2014 |
| WO | 2014/208057 A1 | 12/2014 |
| WO | 2015/008409 A1 | 1/2015 |
| WO | 2015/105763 A1 | 7/2015 |
| WO | 2015/179031 A1 | 11/2015 |
| WO | 2016/052888 A1 | 4/2016 |
| WO | 2017/027526 A1 | 2/2017 |
| WO | 2017/058293 A1 | 4/2017 |
| WO | 2017/147081 A1 | 8/2017 |
| WO | 2017/205657 A1 | 11/2017 |
| WO | 2017/218143 A1 | 12/2017 |
| WO | 2017/218192 A1 | 12/2017 |
| WO | 2018/144339 A2 | 8/2018 |
| WO | 2018/213401 A1 | 11/2018 |
| WO | 2018/213415 A1 | 11/2018 |
| WO | 2018/232333 A1 | 12/2018 |
| WO | 2019/090653 A1 | 5/2019 |
| WO | 2019/217341 A1 | 11/2019 |

OTHER PUBLICATIONS

Notice of Allowance received for Japanese Patent Application No. 2022-125792, dated Jan. 27, 2023, 4 pages (1 page of English Translation and 3 pages of Official Copy).

Office Action received for European Patent Application No. 20719301.2, dated Jan. 24, 2023, 9 pages.

Applicant-Initiated Interview Summary received for U.S. Appl. No. 17/476,404, dated Jul. 27, 2022, 6 pages.

Non-Final Office Action received for U.S. Appl. No. 17/116,938, dated Aug. 1, 2022, 15 pages.

Notice of Allowance received for U.S. Appl. No. 17/027,373, dated Aug. 2, 2022, 2 pages.

Office Action received for Australian Patent Application No. 2020217458, dated Aug. 2, 2022, 4 pages.

Applicant-Initiated Interview Summary received for U.S. Appl. No. 17/742,273, dated Mar. 30, 2023, 5 pages.

Non-Final Office Action received for U.S. Appl. No. 16/830,838, dated Mar. 30, 2023, 16 pages.

Non-Final Office Action received for U.S. Appl. No. 17/476,404, dated Mar. 30, 2023, 29 pages.

Notice of Acceptance received for Australian Patent Application No. 2021261941, dated Mar. 15, 2023, 3 pages.

Office Action received for Indian Patent Application No. 202215025360, dated Mar. 29, 2023, 6 pages.

Office Action received for Indian Patent Application No. 202215025363, dated Mar. 29, 2023, 6 pages.

Office Action received for Indian Patent Application No. 202215025364, dated Mar. 29, 2023, 6 pages.

Notice of Reasons for Refusal received for Japanese Patent Application No. 2020-047952, dated Apr. 3, 2023, 4 pages (2 pages of English Translation and 2 pages of Official Copy).

Office Action received for Indian Patent Application No. 202215025361, dated Mar. 29, 2023, 6 pages.

104766021, CN, A, Cited by Chinese Patent Office in an Office Action for related Patent Applicaton No. 202110819254.6 dated May 16, 2022.

Applicant-Initiated Interview Summary received for U.S. Appl. No. 16/830,838, dated Sep. 21, 2022, 2 pages.

Non-Final Office Action received for U.S. Appl. No. 17/476,404, dated Sep. 14, 2022, 31 pages.

Notice of Acceptance received for Australian Patent Application No. 2020217458, dated Sep. 7, 2022, 3 pages.

Notice of Allowance received for Chinese Patent Application No. 202110818370.6, dated Sep. 2, 2022, 7 pages (4 pages of English Translation and 3 pages of Official Copy).

Final Office Action received for U.S. Appl. No. 17/742,273, dated Feb. 15, 2023, 56 pages.

Applicant-Initiated Interview Summary received for U.S. Appl. No. 16/830,838, dated Dec. 16, 2022, 2 pages.

Applicant-Initiated Interview Summary received for U.S. Appl. No. 17/476,404, dated Dec. 20, 2022, 2 pages.

Office Action received for Australian Patent Application No. 2022201532, dated Dec. 19, 2022, 5 pages.

Summons to Attend Oral Proceedings received for European Patent Application No. 21161005.0, dated Dec. 13, 2022, 9 pages.

Examiner's Pre-Review Report received for Japanese Patent Application No. 2020-047952, dated Dec. 13, 2022, 10 pages (5 pages of English Translation and 5 pages of Official Copy).

Final Office Action received for U.S. Appl. No. 17/116,938, dated Dec. 29, 2022, 42 pages.

Notice of Allowance received for Chinese Patent Application No. 202110819254.6, dated Dec. 27, 2022, 4 pages (1 page of English Translation and 3 pages of Official Copy).

Office Action received for Korean Patent Application No. 10-2022-7001521, dated Dec. 6, 2022, 13 pages (6 pages of English Translation and 7 pages of Official Copy).

Decision to Refuse received for European Patent Application No. 20187610.9, dated Jul. 19, 2022, 13 pages.

Notice of Allowance received for Japanese Patent Application No. 2020-159840, dated Jul. 8, 2022, 4 pages (1 page of English Translation and 3 pages of Official Copy).

Notice of Allowance received for Korean Patent Application No. 10-2020-0123805, dated Jun. 19, 2022, 5 pages (2 pages of English Translation and 3 pages of Official Copy).

Office Action received for Australian Patent Application No. 2019267527, dated Jun. 15, 2022, 3 pages.

Office Action received for Chinese Patent Application No. 202110819254.6, dated May 16, 2022, 16 pages (8 pages of English Translation and 8 pages of Official Copy).

Applicant-Initiated Interview Summary received for U.S. Appl. No. 17/742,273, dated Jan. 18, 2023, 4 pages.

Extended European Search Report received for European Patent Application No. 22196865.4, dated Jan. 13, 2023, 7 pages.

Notice of Allowance received for Korean Patent Application No. 10-2021-7029861, dated Jan. 4, 2023, 7 pages (2 pages of English Translation and 5 pages of Official Copy).

2004-110559, JP, A, Cited by Japanese Patent Office in an Office Action for related Patent Application No. 2022-016138 dated Apr. 24, 2023.

2012-73839, JP, A, Cited by Japanese Patent Office in an Office Action for related Patent Application No. 2022-016138 dated Apr. 24, 2023.

2016-72953, JP, A, Cited by Japanese Patent Office in an Office Action for related Patent Application No. 2022-016138 dated Apr. 24, 2023.

2017-84253, JP, A, Cited by Japanese Patent Office in an Office Action for related Patent Application No. 2022-016138 dated Apr. 24, 2023.

Applicant-Initiated Interview Summary received for U.S. Appl. No. 17/116,938, dated Oct. 13, 2022, 3 pages.

Final Office Action received for U.S. Appl. No. 16/830,838, dated Oct. 14, 2022, 16 pages.

Notice of Allowance received for Chinese Patent Application No. 202011450203.2, dated Sep. 30, 2022, 4 pages (1 page of English Translation and 3 pages of Official Copy).

Notice of Allowance received for U.S. Appl. No. 17/027,373, dated Oct. 3, 2022, 5 pages.

(56) References Cited

OTHER PUBLICATIONS

Office Action received for Chinese Patent Application No. 202110819254.6, dated Sep. 15, 2022, 13 pages (7 pages of English Translation and 6 pages of Official Copy).
Office Action received for Chinese Patent Application No. 202111652452.4, dated Aug. 29, 2022, 23 pages (12 pages of English Translation and 11 pages of Official Copy).
Advisory Action received for U.S. Appl. No. 16/404,605, dated Apr. 15, 2020, 10 pages.
AndroidCentral, "How do i respond to group messages from notification bar?", Available online at: https://forums.andriodcentral.com/ask-question/952030-how-do-i-respond-group-messages-notification-bar.html, Mar. 25, 2019, 3 pages.
Applicant Initiated Interview Summary received for U.S. Appl. No. 16/404,605, dated Nov. 13, 2019, 3 pages.
Applicant Initiated Interview Summary received for U.S. Appl. No. 16/817,328, dated Dec. 21, 2021, 3 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Applicant-Initiated Interview Summary received for U.S. Appl. No. 16/830,838, dated Apr. 6, 2022, 2 pages.
Applicant-Initiated Interview Summary received for U.S. Appl. No. 16/830,838, dated May 24, 2021, 3 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/116,938, dated Dec. 13, 2021, 3 pages.
Applicant-Initiated Interview Summary received for U.S. Appl. No. 17/223,794, dated Sep. 7, 2021, 3 pages.
Applicant-Initiated Interview Summary received for U.S. Appl. No. 17/476,404, dated Mar. 18, 2022, 2 pages.
Benjamin Jeff, "iOS 10: How to use the new Home app to control HorneKit devices [Video]", Available online at: https://9t05mac.com/2016/09/23/ios-10-how-to-use-new-home-app-control-homekit-devices-video, Sep. 23, 2016, 36 pages.
Brief Communication Regarding Oral Proceedings received for European Patent Application No. 17813777.4, mailed on Nov. 23, 2020, 6 pages.
Brief Communication Regarding Oral Proceedings received for European Patent Application No. 19182037.2, dated Apr. 15, 2021, 2 pages.
Certificate of Examination received for Australian Patent Application No. 2019100487, dated Jan. 7, 2020, 2 pages.
Certificate of Examination received for Australian Patent Application No. 2020100303, dated Apr. 17, 2020, 2 pages.
Certificate of Examination received for Australian Patent Application No. 2020100886, dated Dec. 22, 2020, 2 pages.
Certificate of Examination received for Australian Patent Application No. 2021100721, dated Dec. 16, 2021, 2 pages.
Certification of Examination received for Australian Patent Application No. 2017100666, dated Jan. 29, 2018, 2 pages.
Corrected International Search Report and Written Opinion received for PCT Patent Application No. PCT/US2017/035293, dated Dec. 8, 2017, 21 pages.
Corrected Notice of Allowance received for U.S. Appl. No. 15/427,516, dated Apr. 29, 2019, 2 pages.
Corrected Notice of Allowance received for U.S. Appl. No. 15/427,516, dated May 8, 2019, 2 pages.
Corrected Notice of Allowance received for U.S. Appl. No. 16/143,379, dated Dec. 18, 2019, 2 pages.
Corrected Notice of Allowance received for U.S. Appl. No. 16/143,379, dated Feb. 14, 2020, 2 pages.
Corrected Notice of Allowance received for U.S. Appl. No. 16/143,379, dated Mar. 3, 2020, 2 pages.
Corrected Notice of Allowance received for U.S. Appl. No. 16/143,379, dated Mar. 12, 2020, 2 pages.
Corrected Notice of Allowance received for U.S. Appl. No. 16/404,605, dated Dec. 23, 2020, 3 pages.
Corrected Notice of Allowance received for U.S. Appl. No. 16/584,743, dated Dec. 30, 2020, 3 pages.
Corrected Notice of Allowance received for U.S. Appl. No. 16/143,379, dated Aug. 15, 2019, 2 pages.
Corrected Notice of Allowance received for U.S. Appl. No. 16/143,379, dated Nov. 12, 2019, 2 pages.
Corrected Notice of Allowance received for U.S. Appl. No. 16/143,379, dated Oct. 16, 2019, 2 pages.
Decision to Grant received for Danish Patent Application No. PA201670601, dated Jun. 21, 2019, 2 pages.
Decision to Grant received for Danish Patent Application No. PA201670602, dated Nov. 30, 2018, 2 pages.
Decision to Grant received for Danish Patent Application No. PA201670604, dated Aug. 22, 2018, 2 pages.
Decision to Grant received far Danish Patent Application No. PA201670605, dated Nov. 29, 2018, 2 pages.
Decision to Grant received for Danish Patent Application No. PA201870293, dated Dec. 3, 2018, 2 pages.
Decision to Grant received for Danish Patent Application No. PA201870435, dated Oct. 20, 2020, 2 pages.
Decision to Grant received for European Patent Application No. 19182037.2, dated Sep. 16, 2021, 3 pages.
Decision to Grant received for Japanese Patent Application No. 2021-051415, dated Jan. 6, 2022, 3 pages.
Examiner-Initiated Interview Summary received for U.S. Appl. No. 17/027,373, dated Mar. 31, 2022, 4 pages.
Extended European Search Report includes Supplementary European Search Report and Search Opinion) received for European Patent Application No. 17813777.4, dated Mar. 25, 2019, 8 pages.
Extended European Search Report received for European Patent Application No. 19182037.2, dated Oct. 31, 2019, 8 pages.
Extended European Search Report received for European Patent Application No. 20187610.9, dated Nov. 16, 2020, 7 pages.
Extended European Search Report received for European Patent Application No. 21160991.2, dated Jul. 16, 2021, 14 pages.
Extended Search Report received for European Patent Application No. 21161005.0, dated Jun. 14, 2021, 12 pages.
Final Office Action received for U.S. Appl. No. 16/404,605, dated Feb. 10, 2020, 21 pages.
Final Office Action received for U.S. Appl. No. 16/830,838, dated Dec. 9, 2021, 16 pages.
Final Office Action received for U.S. Appl. No. 17/026,818, dated Jan. 29, 2021, 21 pages.
Final Office Action received for U.S. Appl. No. 17/116,938, dated Mar. 1, 2022, 27 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
Intention to Grant received for Danish Patent Application No. PA201670601, dated Apr. 10, 2019, 2 pages.
Intention to Grant received for Danish Patent Application No. PA201670602, dated Aug. 1, 2018, 2 pages.
Intention to Grant received for Danish Patent Application No. PA201670604, dated Jun. 14, 2018, 2 pages.
Intention to Grant received for Danish Patent Application No. PA201670604, dated Mar. 15, 2018, 2 pages.
Intention to Grant received for Danish Patent Application No. PA201670605, dated Aug. 1, 2018, 2 pages.
Intention to Grant received for Danish Patent Application No. PA201870293, dated Aug. 31, 2018, 2 pages.
Intention to Grant received for Danish Patent Application No. PA201870435, dated Jul. 1, 2020, 2 pages.
Intention to Grant received for Danish Patent Application No. PA202070617, dated Nov. 15, 2021, 2 pages.
Intention to Grant received for European Patent Application No. 19182037.2, dated May 4, 2021, 9 pages.
International Preliminary Report on Patentability received for PCT Patent Application No. PCT/US2017/035293, dated Dec. 27, 2018, 16 pages.

(56) References Cited

OTHER PUBLICATIONS

International Preliminary Report on Patentability received for PCT Patent Application No. PCT/US2019/030963, dated Nov. 19, 2020, 12 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/035426, dated Dec. 9, 2021, 10 pages.
International Search Report and Written Opinion received for PCT Patent Application No. PCT/US2017/035293, dated Oct. 10, 2017, 25 pages.
International Search Report and Written Opinion received for PCT Patent Application No. PCT/US2019/030963, dated Oct. 17, 2019, 21 pages.
International Search Report and written Opinion received for PCT Patent Application No. PCT/US2020/024390, dated Aug. 17, 2020, 22 pages.
International Search Report and Written Opinion received for PCT Patent Application No. PCT/US2020/024390, dated Oct. 23, 2020, 26 pages.
International Search Report and Written Opinion received for PCT Patent Application No. PCT/US2020/035426, dated Sep. 11, 2020, 12 pages.
International Search Report and Written Opinion received for PCT Patent Application No. PCT/US2021/031760, dated Sep. 16, 2021, 18 pages.
Invitation to Pay Addition Fees received for PCT Patent Application No. PCT/US2017/035293, dated Aug. 17, 2017, 3 pages.
Invitation to Pay Additional Fees received for PCT Patent Application No. PCT/US2020/024390, dated Jun. 26, 2020, 15 pages.
Invitation to Pay Additional Fees received for PCT Patent Application No. PCT/US2019/030963, dated Aug. 22, 2019, 12 pages.
Invitation to Pay Search Fees received for European Patent Application No. 19728558.8, dated Apr. 20, 2021, 4 pages.
Invitation to Pay Search Fees received for European Patent Application No. 20719301.2, dated Dec. 17, 2020, 5 pages.
Non-Final Office Action received for U.S. Appl. No. 15/427,516, dated Aug. 28, 2018, 11 pages.
Non-Final Office Action received for U.S. Appl. No. 16/143,379, dated Mar. 14, 2019, 10 pages.
Non-Final Office Action received for U.S. Appl. No. 16/404,605, dated Aug. 1, 2019, 19 pages.
Non-Final Office Action received for U.S. Appl. No. 16/404,605, dated Jun. 24, 2020, 18 pages.
Non-Final Office Action received for U.S. Appl. No. 16/404,612, dated Feb. 28, 2020, 13 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/817,328, dated Oct. 29, 2021, 9 pages.
Non-Final Office Action received for U.S. Appl. No. 16/830,838, dated Apr. 1, 2021, 13 pages.
Non-Final Office Action received for U.S. Appl. No. 17/026,818, dated Nov. 25, 2020, 20 pages.
Non-Final Office Action received for U.S. Appl. No. 17/027,373, dated Feb. 2, 2022, 17 pages.
Non-Final Office Action received for U.S. Appl. No. 17/116,938, dated Jul. 30, 2021, 19 pages.
Non-Final Office Action received for U.S. Appl. No. 17/223,794, dated Jun. 16, 2021, 32 pages.
Non-Final Office Action received for U.S. Appl. No. 17/476,404, dated Feb. 8, 2022, 26 pages.
Notice of Acceptance received for Australian Patent Application No. 2026239711, dated Dec. 18, 2021, 3 pages.
Notice of Acceptance received for Australian Patent Application No. 2020257092, dated Aug. 27, 2021, 3 pages.
Notice of Acceptance received for Australian Patent Application No. 2021261403, dated Oct. 22, 2021, 3 pages.
Notice of Allowance received for Australian Patent Application No. 2017286129, dated Dec. 10, 2018, 3 pages.
Notice of Allowance received for Chinese Patent Application No. 201710493025.3, dated May 7, 2021, 6 pages.
Notice of Allowance received for Chinese Patent Application No. 201810730279.7, dated Nov. 5, 2020, 2 pages.
Notice of Allowance received for Chinese Patent Application No. 201811151702.4, dated Jul. 6, 2020, 6 pages.
Notice of Allowance received for Chinese Patent Application No. 201811152097.2, dated Oct. 28, 2019, 6 pages.
Notice of Allowance received for Chinese Patent Application No. 202010742019.9, dated Jul. 6, 2021, 7 pages.
Notice of Allowance received for Chinese Patent Application No. 202011336156.9, dated Jan. 6, 2022, 3 pages.
Notice of Allowance Received for Chinese Patent Application No. 202110248576.X, dated Mar. 21, 2022, 2 pages.
Notice of Allowance received for Japanese Patent Application No. 2018-562659, dated Jul. 30, 2021, 4 pages.
Notice of Allowance received for Japanese Patent Application No. 2020-558885, dated Jul. 26, 2021, 4 pages.
Notice of Allowance received for Japanese Patent Application No. 2021-026630, dated Jan. 7, 2022, 4 pages.
Notice of Allowance received for Korean Patent Application No. 10-2018-7034909, dated Sep. 30, 2019, 4 pages.
Notice of Allowance received for Korean Patent Application No. 10-2019-7038093, dated Aug. 10, 2020, 5 pages.
Notice of Allowance received for Korean Patent Application No. 10-2020-7031319, dated Apr. 6, 2021, 5 pages.
Notice of Allowance received for Korean Patent Application No. 10-2020-7031700, dated Apr. 21, 2021, 4 pages.
Notice of Allowance received for Korean Patent Application No. 10-2020-7032488, dated Jun. 16, 2021, 4 pages.
Notice of Allowance received for Korean Patent Application No. 10-2021-7021047, dated Dec. 6, 2021, 3 pages.
Notice of Allowance received for Korean Patent Application No. 10-2021-7022610, dated Oct. 13, 2021, 3 pages.
Notice of Allowance received for U.S. Appl. No. 15/427,516, dated Mar. 4, 2019, 7 pages.
Notice of Allowance received for U.S. Appl. No. 16/143,379, dated Jan. 29, 2020, 5 pages.
Notice of Allowance received for U.S. Appl. No. 16/404,605, dated Sep. 18, 2020, 5 pages.
Notice of Allowance received for U.S. Appl. No. 16/404,612, dateed Jul. 13, 2020, 6 pages.
Notice of Allowance received for U.S. Appl. No. 16/404,612, dated Aug. 7, 2019, 9 pages.
Notice of Allowance received for U.S. Appl. No. 16/584,743, dated Aug. 7, 2020, 8 pages.
Notice of Allowance received for U.S. Appl. No. 16/584,743, dated Nov. 16, 2020, 7 pages.
Notice of Allowance received for U.S. Appl. No. 16/586,002, dated Jun. 9, 2020, 5 pages.
Notice of Allowance received for U.S. Appl. No. 16/817,328, dated Apr. 18, 2022, 8 pages.
Notice of Allowance received for U.S. Appl. No. 16/817,328, dated Feb. 16, 2022, 9 pages.
Notice of Allowance received for U.S. Appl. No. 17/026,88, dated May 13, 2021, 10 pages.
Notice of Allowance received for U.S. Appl. No. 16/143,379, dated Jun. 26, 2019, 5 pages.
Notice of Allowance received for U.S. Appl. No. 16/143,379, dated Sep. 25, 2019, 5 pages.
Office Action received for Australian Patent Application No. 2017100666, dated Jul. 27, 2017, 4 pages.
Office Action received for Australian Patent Application No. 2017286129, dated Oct. 18, 2018, 3 pages.
Office Action received for Australian Patent Application No. 2019100487, dated Aug. 16, 2019, 5 pages.
Office Action received for Australian Patent Application No. 2019100523, dated Jan. 23, 2020, 3 pages.

(56) References Cited

OTHER PUBLICATIONS

Office Action received for Australian Patent Application No. 2019100523, dated Mar. 2, 2020, 3 pages.
Office Action received for Australian Patent Application No. 2019100523, dated Sep. 2, 2019, 3 pages.
Office Action received for Australian Patent Application No. 2019201853, dated Apr. 23, 2020, 5 pages.
Office Action received for Australian Patent Application No. 2019201853, dated Aug. 10, 2020, 4 pages.
Office Action received for Australian Patent Application No. 2019201853, dated Aug. 16, 2019, 5 pages.
Office Action received for Australian Patent Application No. 2019201853, dated Dec. 9, 2019, 5 pages.
Office Action received for Australian Patent Application No. 2019267527, dated Dec. 2, 2021, 4 pages.
Office Action received for Australian Patent Application No. 2019267527, dated Jun. 24, 2021, 8 pages.
Office Action received for Australian Patent Application No. 2019267527, dated Mar. 3, 2022, 3 pages.
Office Action received for Australian Patent Application No. 2020100886, dated Aug. 5, 2020, 6 pages.
Office Action received for Australian Patent Application No. 2020217458, dated Sep. 2, 2021, 6 pages.
Office Action received for Australian Patent Application No. 2020239711, dated Sep. 13, 2021, 5 pages.
Office Action received for Australian Patent Application No. 2020257092, dated Mar. 3, 2021, 7 pages.
Office Action received for Australian Patent Application No. 2020257092, dated Nov. 30, 2020, 6 pages.
Office Action received for Australian Patent Application No. 2021100721, dated Jun. 4, 2021, 7 pages.
Office Action received for Australian Patent Application No. 2021100721, dated Oct. 18, 2021, 4 pages.
Office Action received for Australian Patent Application No. 2021201403, dated Mar. 16, 2021, 3 pages.
Office Action received for Chinese Patent Application No. 201710493025.3, dated Dec. 6, 2019, 11 pages.
Office Action received for Chinese Patent Application No. 201710493025.3, dated Jan. 6, 2021, 17 pages.
Office Action received for Chinese Patent Application No. 201710493025.3, dated Jul. 10, 2020, 17 pages.
Office Action received for Chinese Patent Application No. 201710493025.3, dated Sep. 19, 2017, 2 pages.
Office Action received for Chinese Patent Application No. 201810730279.7, dated Jul. 6, 2020, 7 pages.
Office Action received for Chinese Patent Application No. 201810730279.7, dated Mar. 4, 2020, 14 pages.
Office Action received for Chinese Patent Application No. 201810730279.7, dated May 7, 2019, 15 pages.
Office Action received for Chinese Patent Application No. 201810730279.7, dated Nov. 5, 2019, 14 pages.
Office Action received for Chinese Patent Application No. 201811151702.4, dated Mar. 4, 2020, 13 pages.
Office Action received for Chinese Patent Application No. 201811151702.4, dated May 7, 2019, 16 pages.
Office Action received for Chinese Patent Application No. 201811151702.4, dated Oct. 9, 2019, 11 pages.
Office Action received for Chinese Patent Application No. 201811152097.2, dated May 7, 2019, 18 pages.
Office Action received for Chinese Patent Application No. 201811152726.1 , dated Apr. 22, 2019, 15 pages.
Office Action received for Chinese Patent Application No. 201811152726.1, dated Apr. 28, 2021, 14 pages.
Office Action received for Chinese Patent Application No. 201811152726.1, dated Jan. 28, 2021, 13 pages.
Office Action received for Chinese Patent Application No. 201811152726.1, dated Mar. 18, 2020, 12 pages.
Office Action received for Chinese Patent Application No. 201811152726.1, dated Oct. 24, 2020, 14 pages.
Office Action received for Chinese Patent Application No. 201811152726.1, dated Oct. 29, 2020, 12 pages.
Office Action received for Chinese Patent Application No. 202010742019.9, dated Feb. 3, 2021, 17 pages.
Office Action received for Chinese Patent Application No. 202011336156.9, dated May 20, 2021, 13 pages.
Office Action received for Chinese Patent Application No. 202011450203.2, dated Sep. 1, 2021, 12 pages.
Office Action received for Chinese Patent Application No. 202110248576.X, dated Sep. 15, 2021, 28 pages.
Office Action received for Chinese Patent Application No. 202110818370.6, dated Mar. 2, 2022, 13 pages.
Office Action Received for Danish Patent Application No. PA201670601, dated Apr. 10, 2018, 3 pages.
Office Action received for Danish Patent Application No. PA201670601, dated Aug. 9, 2018, 2 pages.
Office Action Received for Danish Patent Application No. PA201670601, dated Dec. 11, 2018, 3 pages.
Office Action Received for Danish Patent Application No. PA201670601, dated Feb. 6, 2017, 5 pages.
Office Action Received for Danish Patent Application No. PA201670601, dated Oct. 21, 2016, 9 pages.
Office Action Received for Danish Patent Application No. PA201670601, dated Sep. 26, 2017, 3 pages.
Office Action received for Danish Patent Application No. PA201670602, dated Apr. 16, 2018, 3 pages.
Office Action received for Danish Patent Application No, PA201670602, dated Feb. 9, 2017, 3 pages.
Office Action received for Danish Patent Application No. PA201670602, dated Oct. 25, 2016, 9 pages.
Office Action received for Danish Patent Application No. PA201670602, dated Sep. 26, 2017, 3 pages.
Office Action received for Danish Patent Application No. PA201670603, dated Nov. 1, 2016, 9 pages.
Office Action received for Danish Patent Application No. PA201670604, dated Feb. 19, 2018, 3 pages.
Office Action received for Danish Patent Application No. PA201670604, dated Jun. 9, 2017, 3 pages.
Office Action received for Danish Patent Application No. PA201670604, dated Nov. 8, 2016, 8 pages.
Office Action received for Danish Patent Application No. PA201670605, dated Apr. 9, 2018, 2 pages.
Office Action received for Danish Patent Application No. PA201670605, dated Feb. 19, 2018, 2 pages.
Office Action received for Danish Patent Application No. PA201670605, dated Jun. 13, 2017, 4 pages.
Office Action received for Danish Patent Application No. PA201670605, dated Nov. 14, 2016, 8 pages.
Office Action received for Danish Patent Application No. PA201870293, dated Jul. 17, 2018, 2 pages.
Office Action received for Danish Patent Application No. PA201870293, dated Jun. 19, 2018, 8 pages.
Office Action received for Danish Patent Application No. PA201870435, dated Feb. 6, 2020, 3 pages.
Office Action received for Danish Patent Application No. PA201870435, dated May 2, 2019, 3 pages.
Office Action received for Danish Patent Application No. PA201870435, dated May 25, 2020, 3 pages.
Office Action received for Danish Patent Application No. PA202070617, dated Sep. 24, 2021, 4 pages.
Office Action received for European Patent Application No. 17813777.4, dated Jan. 3, 2020, 5 pages.
Office Action received for European Patent Application No. 19182037.2, dated Jun. 16, 2020, 6 pages.
Office Action received for European Patent Application No. 19728558.8, dated Jun. 21, 2021, 9 pages.
Office Action received for European Patent Application No. 20187610.9, dated May 21, 2021, 7 pages.
Office Action received for European Patent Application No. 20719301.2, dated Feb. 21, 2022, 9 pages.
Office Action received for European Patent Application No. 20719301.2, dated Jan. 28, 2021, 15 pages.

(56) References Cited

OTHER PUBLICATIONS

Office Action received for European Patent Application No. 21160991.2, dated Mar. 24, 2022, 11 pages.
Office Action received for Indian Patent Application No. 202014041529, dated Dec. 6, 2021, 6 pages.
Office Action received for Japanese Patent Application No. 2018-562659, dated Dec. 6, 2019, 7 pages.
Office Action received for Japanese Patent Application No. 2018-562659, dated Jul. 26, 2019, 9 pages.
Office Action received for Japanese Patent Application No. 2018-562659, dated Mar. 12, 2021, 79 pages.
Office Action received for Japanese Patent Application No. 2018-562659, dated May 28, 2020, 5 pages.
Office Action received for Japanese Patent Application No. 2020-047952, dated Aug. 27, 2021, 13 pages.
Office Action received for Japanese Patent Application No. 2020-047952, dated Feb. 8, 2021, 6 pages.
Office Action received for Japanese Patent Application No. 2020-159840, dated Dec. 10, 2021, 13 pages.
Office Action received for Japanese Patent Application No. 2020-159840, dated Mar. 28, 2022, 6 pages.
Office Action received for Japanese Patent Application No. 2020-560927, dated Dec. 1, 2021, 3 pages.
Office Action received for Japanese Patent Application No. 2020-560927, dated Jun. 10, 2021, 5 pages.
Office Action received for Japanese Patent Application No. 2021-026630, dated Aug. 20, 2021, 7 pages.
Office Action received for Japanese Patent Application No. 2021-051415, dated Jul. 19, 2021, 4 pages.
Office Action received for Korean Patent Application No. 10-2019-7038093, dated Feb. 13, 2020, 11 pages.
Office Action received for Korean Patent Application No. 10-2020-7031319, dated Dec. 8, 2020, 14 pages.
Office Action received for Korean Patent Application No. 10-2020-7031700, dated Dec. 15, 2020, 6 pages.
Office Action received for Korean Patent Application No. 10-2020-7032488, dated Feb. 9, 2021, 11 pages.
Office Action received for Korean Patent Application No. 10-2021-7021047, dated Aug. 13, 2021, 5 pages.
Office Action received for Korean Patent Application No. 10-2021-7029861, dated Jan. 25, 2022, 11 pages.
Result of Consultation received for European Patent Application No. 19182037.2, dated Mar. 22, 2021, 5 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870435, dated Oct. 26, 2018, 9 pages.
Search Report and Opinion received for Danish Patent Application No. PA202070617, dated Dec. 23, 2020, 8 pages.
Senicar et al., "User-Centred Design and Development of an Intelligent Light Switch for Sensor Systems", Technical Gazette, vol. 26, No. 2, available online at: https://hrcak.srce.hr/file1320403, 2019, pp. 339-345.
SolarWinds Network Configuration Manager Administrator Guide, Available online at:-https://web.archive.org/web1201410311332 07/http://www.solarwinds.com/documentation/orionNCMidocs/OrionNCMAdministratorGuide.pdf, Oct. 31, 2014, 466 pages.
Summons to Attend Oral Proceedings received for European Patent Application No. 17813777.4, dated Jun. 18, 2020, 8 pages.
Summons to Attend Oral Proceedings received for European Patent Application No. 19182037.2, dated Nov. 24, 2020, 12 pages.
Summons to Attend Oral Proceedings received for European Patent Application No. 19728558.8, dated Jan. 18, 2022, 9 pages.
Summons to Attend Oral Proceedings received for European Patent Application No. 20187610.9, dated Dec. 16, 2021, 12 pages.
Summons to Attend Oral Proceedings received for European Patent Application No. 20187610.9, dated Jan. 27, 2022, 2 pages.
Supplemental Notice of Allowance received for U.S. Appl. No. 16/584,743, dated Nov. 25, 2020, 2 pages.
Applicant-Initiated Interview Summary received for U.S. Appl. No. 17/116,938, dated Jun. 14, 2022, 2 pages.
Brief Communication Regarding Oral Proceedings received for European Patent Application No. 20187610.9, dated May 31, 2022, 1 page.
D-LINK USA, "How to Control Your Network with Mydlink Lite", Online Available at: https://www.youtube.com/watch?v=2DWct_P3o7Y, Sep. 6, 2013, 3 pages.
D-LINK. "D-Link Wi-Fi app—Complete Wi-Fi Management in the Palm of Your Hand", Online Available at: https://www.youtube.com/watch?v=EA8L7ZHxsbg, Apr. 12, 2019.
Final Office Action received for U.S. Appl. No. 17/476,404, dated May 5, 2022, 30 pages.
Minutes of the Oral Proceedings received for European Patent Appiication No. 201876109, dated Jun. 7, 2022, 6 pages.
Non-Final Office Action received for U.S. Appl. No. 16/830,838, dated Jun. 9, 2022, 17 pages.
Notice of Allowance received for Japanese Patent Application No. 2020-560927, dated May 30. 2022, 3 pages (1 page of English Translation and 2 pages of Official Copy).
Notice of Allowance received for U.S. Appl. No. 17/027,373, dated Jun. 3, 2022, 8 pages.
Office Action received for Australian Patent Application No. 2020217458, dated May 10, 2022, 3 pages.
Office Action received for Chinese Patent Application No. 2020114502032, dated Apr. 20, 2022, 9 pages (5 pages of English Translation and 4 pages of Official Copy).
Office Action received for Chinese Patent Application No. 202110235995.X, dated Mar. 22, 2022, 17 pages (9 pages of English Translation and 8 pages of Official Copy).
Office Action received for European Patent Apptication No. 211610050, dated Apr. 22, 2022, 11 pages.
Office Action received for indian Patent Application No. 202118046028, dated Apr. 6, 2022, 6 pages.
Result of Consultation received for European Patent Apptication No. 201876109, dated Jun. 1, 2022, 3 pages.
REVIEWDORK, "Linksys Smart Wifi App Linksys Wireless Router Setup and Tutorial (Android or iPhone)", Online Available at: https://www.youtube.com/watch?v=UjJUq1g1738, Feb. 13, 2017, 3 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2022/029282, dated Nov. 9, 2022, 22 pages.
Invitation to Pay Additional Fees and Partial International Search Report received for PCT Patent Application No. PCT/US2022/029282, dated Sep. 15, 2022, 15 pages.
Invitation to Pay Search Fees received for European Patent Application No. 21728781.2, dateed Dec. 2, 2022, 3 pages.
Non-Final Office Action received for U.S. Appl. No. 17/742,273, dated Dec. 7, 2022, 47 pages.
Office Action received for Japanese Patent Application No. 2022-016138, dated Apr. 24, 2023, 9 pages (5 pages of English Translation and 4 pages of Official Copy).
Office Action received for Korean Patent Application No. 10-2022-7001332, dated Apr. 20, 2023, 8 pages (4 pages of English Translation and 4 pages of Official Copy).
Brief Communication Regarding Oral Proceedings received for European Patent Application No. 19728558.8, mailed on Jul. 5, 2022, 1 page.
Corrected Notice of Allowance received for U.S. Appl. No. 17/027,373, dated Jul. 12, 2022, 2 pages.
Office Action received for Chinese Patent Application No. 202110818370.6, dated Jun. 22, 2022, 7 pages (4 pages of English Translation and 3 pages of Official Copy).
Office Action received for Japanese Patent Application No. 2020-047952, dated Jul. 1, 2022, 8 pages (4 pages of English Translation and 4 pages of Official Copy).

(56) References Cited

OTHER PUBLICATIONS

Result of Consultation received for European Patent Application No. 19728558.8, dated Jun. 28, 2022, 4 pages.
Corrected Notice of Allowance received for U.S. Appl. No. 17/027,373, dated Oct. 26, 2022, 2 pages.
Notice of Allowance received for Korean Patent Application No. 10-2022-0091730, dated Oct. 4, 2022, 5 pages (2 pages of English Translation and 3 pages of official copy).
Office Action received for Chinese Patent Application No. 202110235995.X, dated Sep. 30, 2022, 13 pages (7 pages of English Translation and 6 pages of Official Copy).
Summons to Attend Oral Proceedings received for European Patent Application No. 21160991.2, dated Oct. 19, 2022, 10 pages.
Office Action received for Chinese Patent Application No. 202111652452.4, dated Feb. 11, 2023, 28 pages (13 pages of English Translation and 15 pages of Official Copy).
Office Action received for European Patent Application No. 21728781.2, dated Mar. 1, 2023, 13 pages.
2008-99330, JP, A, Cited by Japanese Patent Office in an Office Action for related Patent Application No. 2022-125792 dated Jan. 27, 2023.
2014-170982, JP, A, Cited by Japanese Patent Office in an Office Action for related Patent Application No. 2022-125792 dated Jan. 27, 2023.
2017-41008, JP, A, Cited by Japanese Patent Office in an Office Action for related Patent Application No. 2022-014389 dated Jan. 27, 2023.
Extended European Search Report received for European Patent Application No. 22191264.5, dated Nov. 11, 2022, 8 pages.
Office Action received for Australian Patent Application No. 2021261941, dated Nov. 3, 2022, 3 pages.
Office Action received for Korean Patent Application No. 10-2021-7029861, dated Nov. 1, 2022, 7 pages (3 pages of English Translation and 4 pages of Official Copy).
Non-Final Office Action received for U.S. Appl. No. 17/992,229, dated Jul. 13, 2023, 14 pages.
Office Action received for Korean Patent Application No. 10-2022-7001521, dated Jun. 21, 2023, 10 pages (5 page of English Translation and 5 pages of Official Copy).
Notice of Allowance received for Japanese Patent Application No. 2020-047952, dated Jun. 26, 2023, 25 pages (1 page of English Translation and 24 pages of Official Copy).
Applicant-Initiated Interview Summary received for U.S. Appl. No. 16/830,838, dated Jun. 1, 2023, 2 pages.
Applicant-Initiated Interview Summary received for U.S. Appl. No. 17/476,404, dated Jun. 2, 2023, 2 pages.
Notice of Acceptance received for Australian Patent Application No. 2022201532, dated May 22, 2023, 3 pages.
Notice of Allowance received for U.S. Appl. No. 17/019,845, dated Jun. 5, 2023, 10 pages.
Final Office Action received for U.S. Appl. No. 16/830,838, dated Jun. 26, 2023, 16 pages.
Office Action received for Australian Patent Application No. 2022204466, dated Jun. 7, 2023, 4 pages.
Office Action received for Chinese Patent Application No. 202111652452.4, dated May 19, 2023, 15 pages (8 pages of English Translation and 7 pages of Official Copy).
Office Action received for European Patent Application No. 20746426.4, dated Aug. 17, 2023, 5 pages.

\* cited by examiner

USER INTERFACES FOR MANAGING A LOCAL NETWORK

CROSS REFERENCE TO RELATED APPLICATIONS

This application is a continuation of U.S. nonprovisional patent application Ser. No. 16/817,328, entitled "USER INTERFACES FOR MANAGING A LOCAL NETWORK," filed on Mar. 12, 2020, which claims priority to U.S. provisional patent application 62/855,815, entitled "USER INTERFACES FOR MANAGING A LOCAL NETWORK," filed on May 31, 2019, the contents of which are hereby incorporated by reference in their entirety.

FIELD

The present disclosure relates generally to computer user interfaces, and more specifically to user interfaces for managing and securing a local network.

BACKGROUND

A local network (e.g., a home network) is typically managed by a router. The local network can have a plurality of external devices connected to the local network. The plurality of external devices can be managed and controlled using an electronic device. Network security settings for the plurality of external devices can be managed and controlled using the electronic device.

BRIEF SUMMARY

Some techniques for managing and securing a local network using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing and securing a local network. Such methods and interfaces optionally complement or replace other methods for managing and securing a local network. Such methods and interfaces can reduce the number of user inputs needed to manage and secure a local network. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device with a display is described. The method comprises: while the electronic device is connected to a router and a plurality of external devices that includes a first set of one or more external devices and a second set of one or more external devices, displaying a first user interface that includes a first affordance and a second affordance; receiving a first input; and in response to receiving the first input: in accordance with a determination that the first input corresponds to selection of the first affordance: applying a first network access policy to the first set of one or more external devices; and applying the first network access policy to the second set of one or more external devices; in accordance with a determination that the first input corresponds to the second affordance: displaying a second user interface that includes: a third affordance that, when selected, initiates a process for applying a network access policy to the first set of one or more external devices that is selected from a group consisting of the first network access policy and a second network access policy that is different from the first network access policy; and a fourth affordance that, when selected, initiates a process for applying a network access policy to the second set of one or more external devices that is selected from a group consisting of the first network access policy and a second network access policy that is different from the first network access policy.

In accordance with some embodiments, a non-transitory computer-readable storage medium storing one or more programs configured to be executed by one or more processors of an electronic device with a display is described. The one or more programs include instructions for: while the electronic device is connected to a router and a plurality of external devices that includes a first set of one or more external devices and a second set of one or more external devices, displaying a first user interface that includes a first affordance and a second affordance; receiving a first input; and in response to receiving the first input: in accordance with a determination that the first input corresponds to selection of the first affordance: applying a first network access policy to the first set of one or more external devices; and applying the first network access policy to the second set of one or more external devices; in accordance with a determination that the first input corresponds to the second affordance: displaying a second user interface that includes: a third affordance that, when selected, initiates a process for applying a network access policy to the first set of one or more external devices that is selected from a group consisting of the first network access policy and a second network access policy that is different from the first network access policy; and a fourth affordance that, when selected, initiates a process for applying a network access policy to the second set of one or more external devices that is selected from a group consisting of the first network access policy and a second network access policy that is different from the first network access policy.

In accordance with some embodiments, a transitory computer-readable storage medium storing one or more programs configured to be executed by one or more processors of an electronic device with a display is described. The one or more programs include instructions for: while the electronic device is connected to a router and a plurality of external devices that includes a first set of one or more external devices and a second set of one or more external devices, displaying a first user interface that includes a first affordance and a second affordance; receiving a first input; and in response to receiving the first input: in accordance with a determination that the first input corresponds to selection of the first affordance: applying a first network access policy to the first set of one or more external devices; and applying the first network access policy to the second set of one or more external devices; in accordance with a determination that the first input corresponds to the second affordance: displaying a second user interface that includes: a third affordance that, when selected, initiates a process for applying a network access policy to the first set of one or more external devices that is selected from a group consisting of the first network access policy and a second network access policy that is different from the first network access policy; and a fourth affordance that, when selected, initiates a process for applying a network access policy to the second set of one or more external devices that is selected from a group consisting of the first network access policy and a second network access policy that is different from the first network access policy.

In accordance with some embodiments, an electronic device with a display; one or more processors; and memory storing one or more programs configured to be executed by the one or more processors is described. The one or more programs include instructions for: while the electronic device is connected to a router and a plurality of external devices that includes a first set of one or more external devices and a second set of one or more external devices, displaying a first user interface that includes a first affordance and a second affordance; receiving a first input; and in response to receiving the first input: in accordance with a determination that the first input corresponds to selection of the first affordance: applying a first network access policy to the first set of one or more external devices; and applying the first network access policy to the second set of one or more external devices; in accordance with a determination that the first input corresponds to the second affordance: displaying a second user interface that includes: a third affordance that, when selected, initiates a process for applying a network access policy to the first set of one or more external devices that is selected from a group consisting of the first network access policy and a second network access policy that is different from the first network access policy; and a fourth affordance that, when selected, initiates a process for applying a network access policy to the second set of one or more external devices that is selected from a group consisting of the first network access policy and a second network access policy that is different from the first network access policy.

In accordance with some embodiments, an electronic device is described. The electronic device comprises a display; means, while the electronic device is connected to a router and a plurality of external devices that includes a first set of one or more external devices and a second set of one or more external devices, for displaying a first user interface that includes a first affordance and a second affordance; means for receiving a first input; and means, in response to receiving the first input, for: in accordance with a determination that the first input corresponds to selection of the first affordance: applying a first network access policy to the first set of one or more external devices; and applying the first network access policy to the second set of one or more external devices; in accordance with a determination that the first input corresponds to the second affordance: displaying a second user interface that includes: a third affordance that, when selected, initiates a process for applying a network access policy to the first set of one or more external devices that is selected from a group consisting of the first network access policy and a second network access policy that is different from the first network access policy; and a fourth affordance that, when selected, initiates a process for applying a network access policy to the second set of one or more external devices that is selected from a group consisting of the first network access policy and a second network access policy that is different from the first network access policy.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing and securing a local network, thereby increasing the effectiveness, efficiency, and user satisfaction with such devices. Such methods and interfaces may complement or replace other methods for managing and securing a local network.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
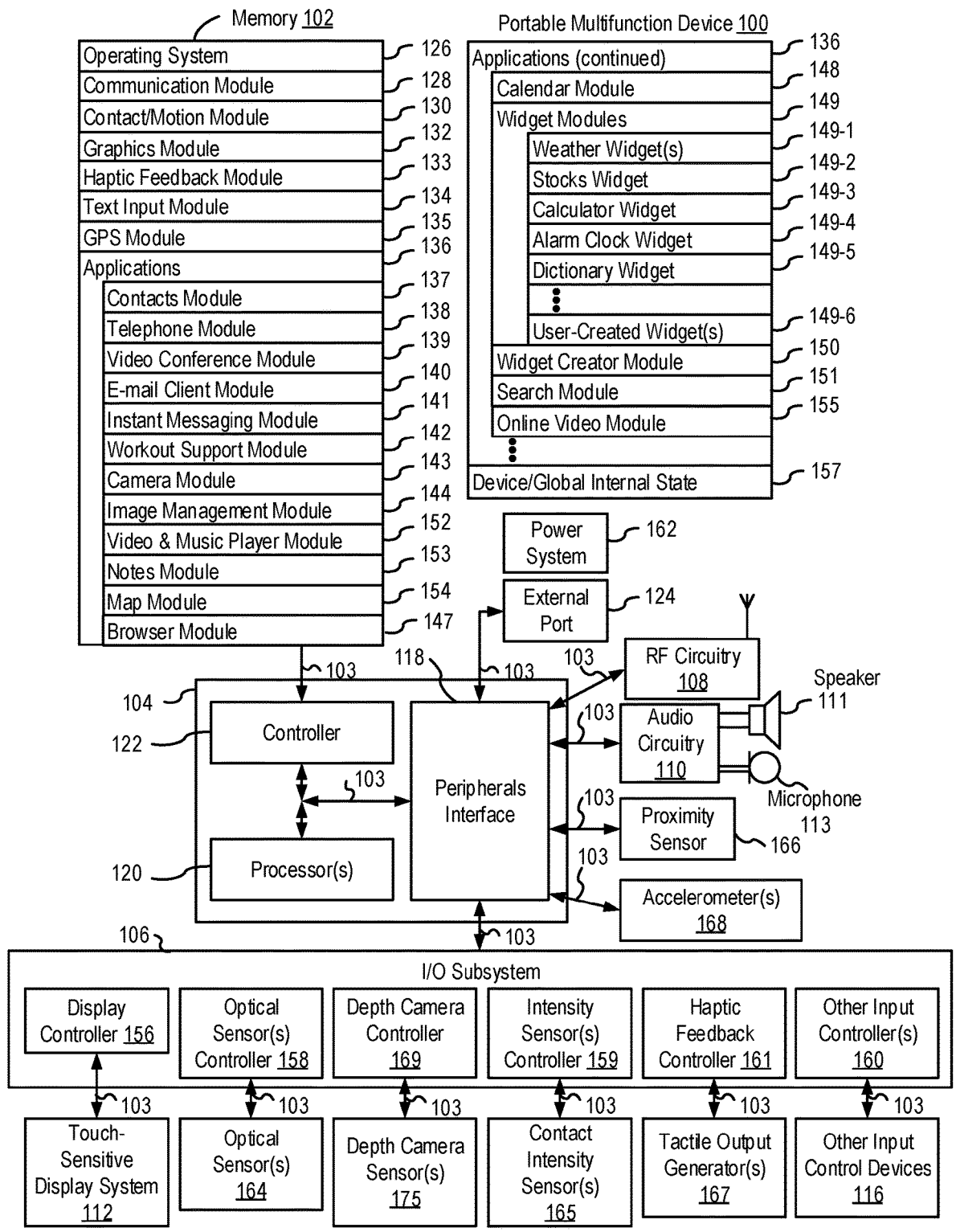
FIG. 1A is a block diagram illustrating a portable multifunction device with a touch-sensitive display, in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing and securing a local network. For example, there is a need for user interfaces that enable a user to conveniently apply and/or customize network security settings to a plurality of external devices connected to a local area network. Such techniques can reduce the cognitive burden on a user who accesses local networks, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing and securing a local network. FIG. 6A is a diagram of an example local area network configuration. FIGS. 6B-6S illustrate exemplary user interfaces for managing and securing a local network using an electronic device, in accordance with some embodiments. FIGS. 7A-7D are a flow diagram illustrating a method for managing and securing a local network using an electronic device, in accordance with some embodiments. The user interfaces in FIGS. 6B-6S are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
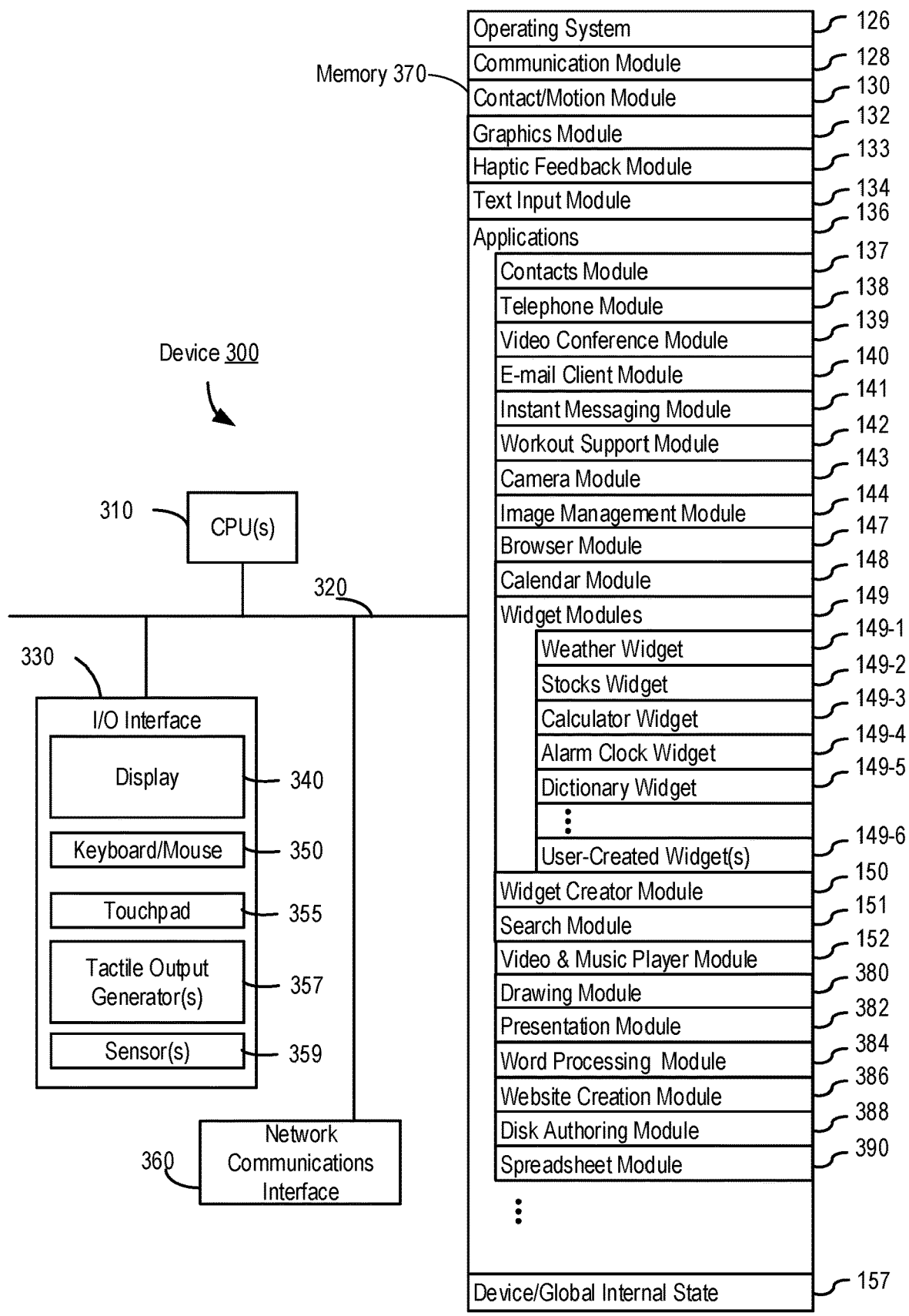
FIG. 3 is a block diagram of an exemplary multifunction device with a display and a touch-sensitive surface, in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;

Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
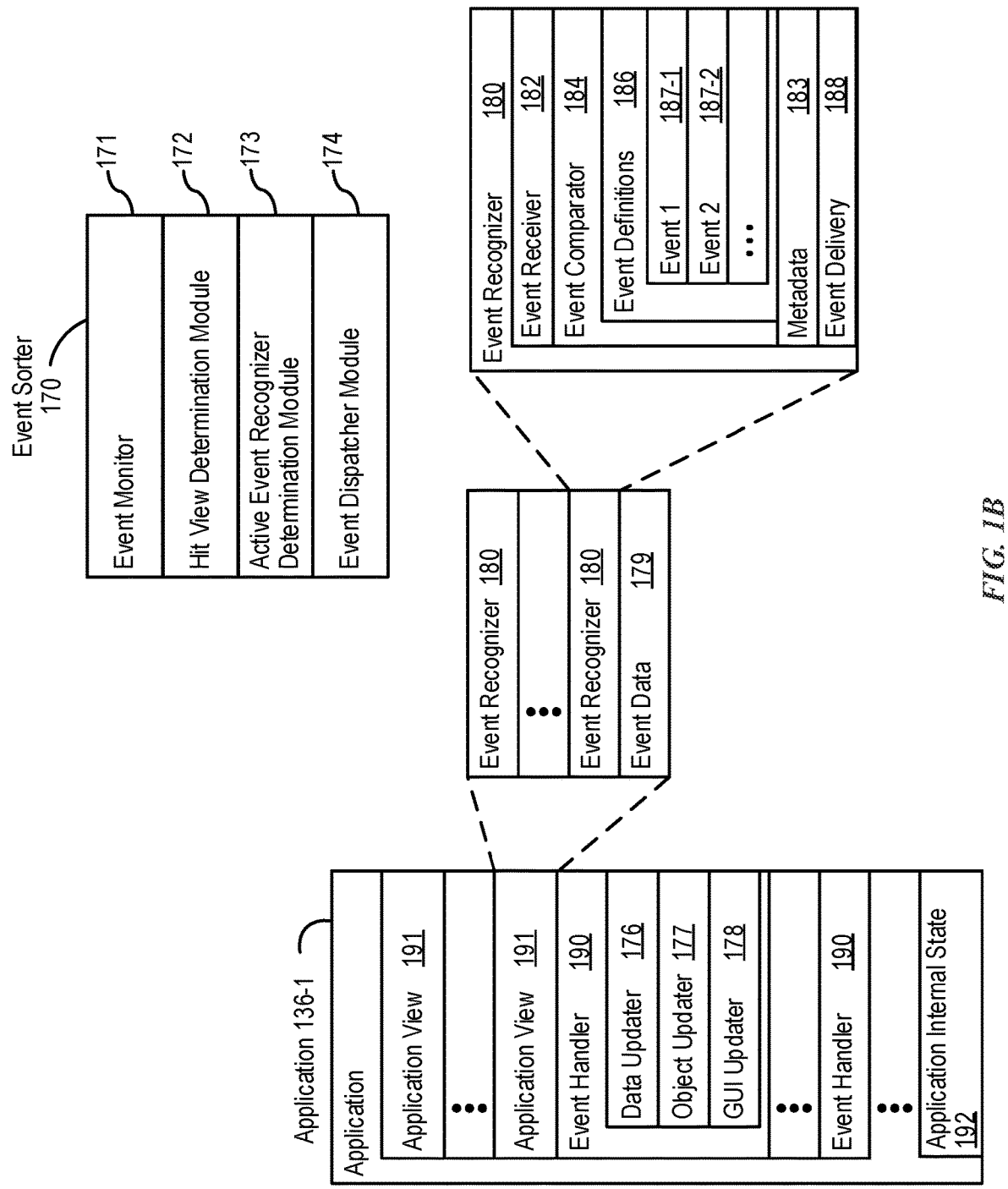
FIG. 1B is a block diagram illustrating exemplary components for event handling, in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
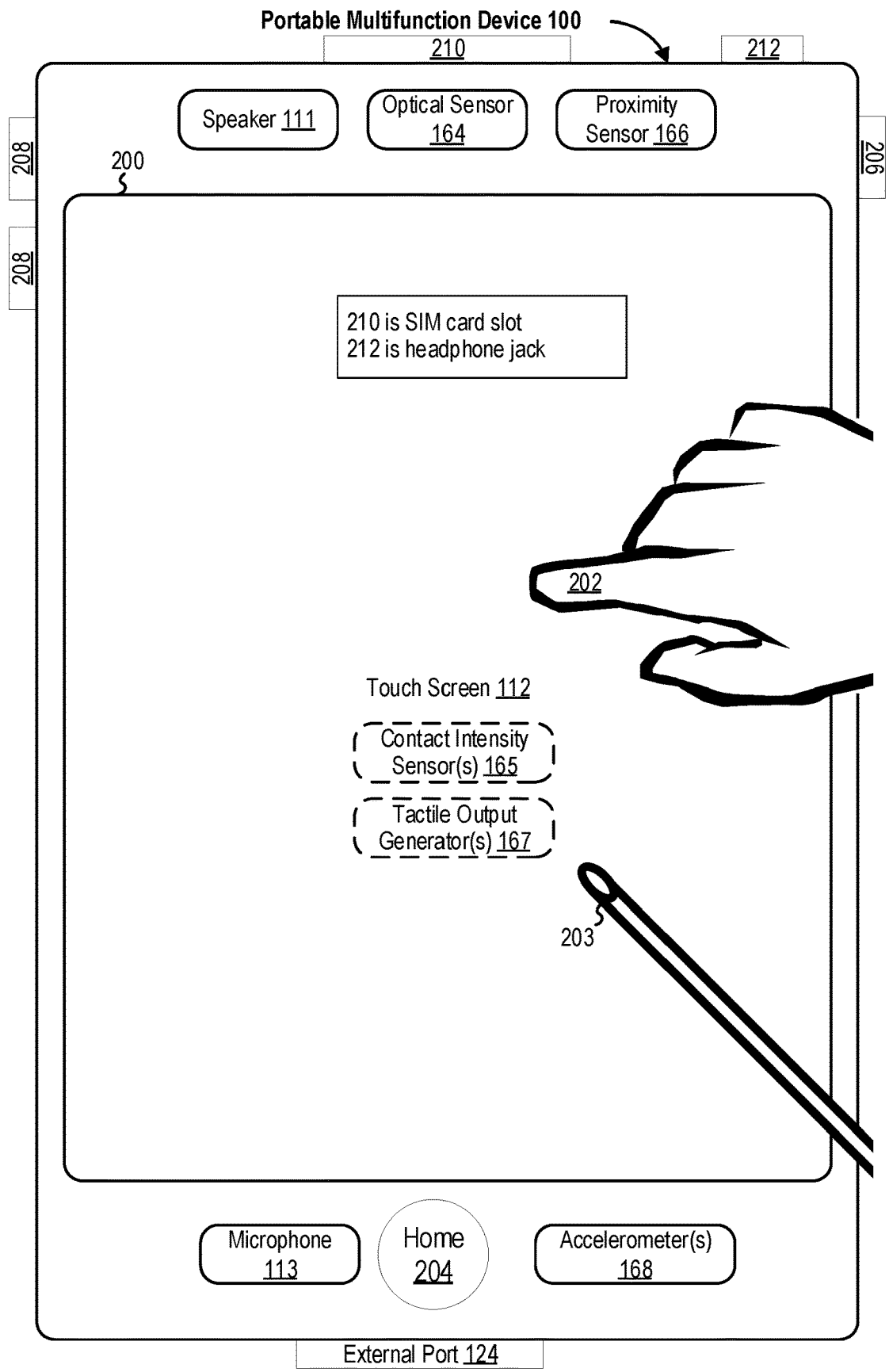
FIG. 2 illustrates a portable multifunction device having a touch screen, in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
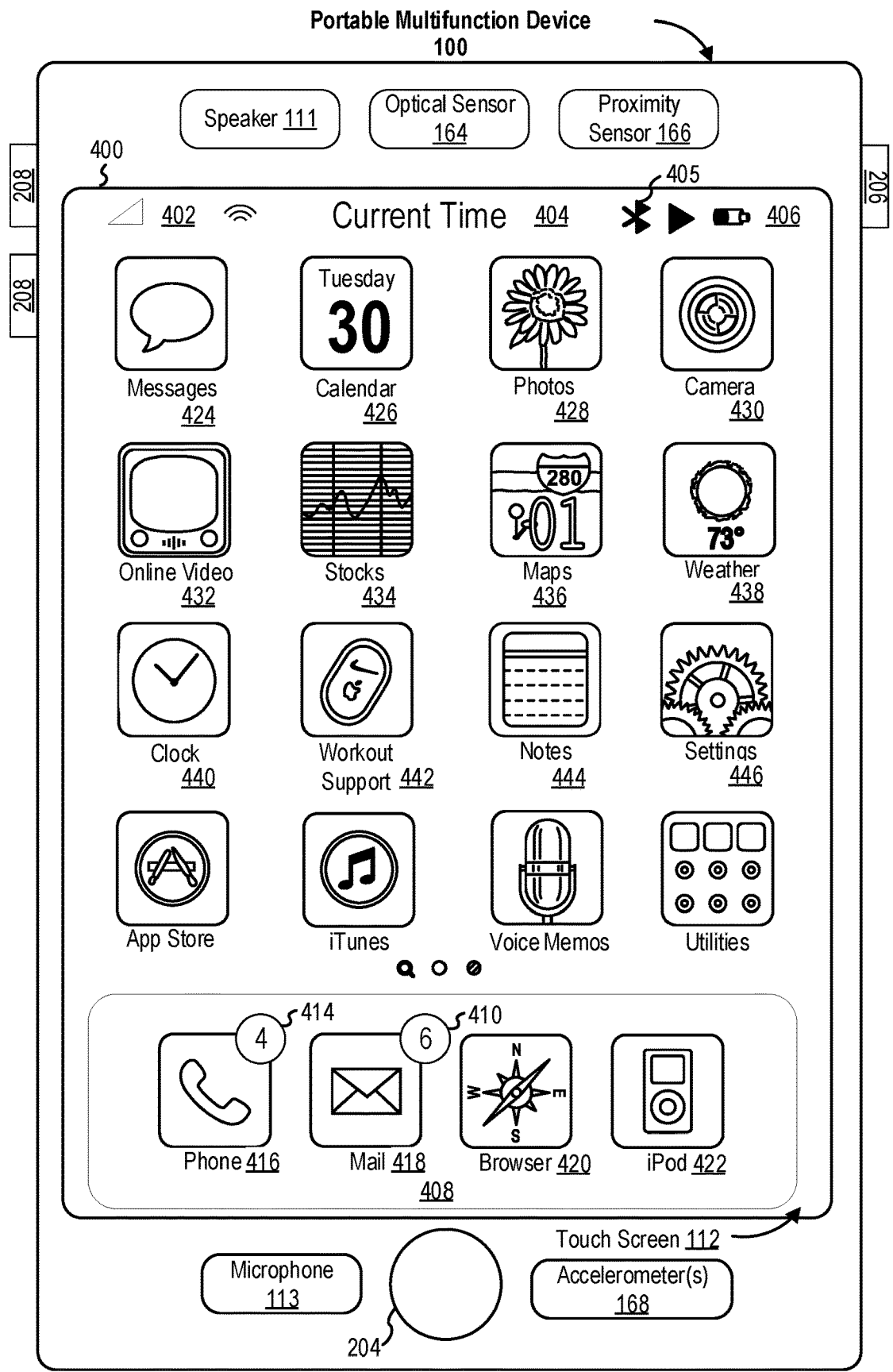
FIG. 4A illustrates an exemplary user interface for a menu of applications on a portable multifunction device, in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
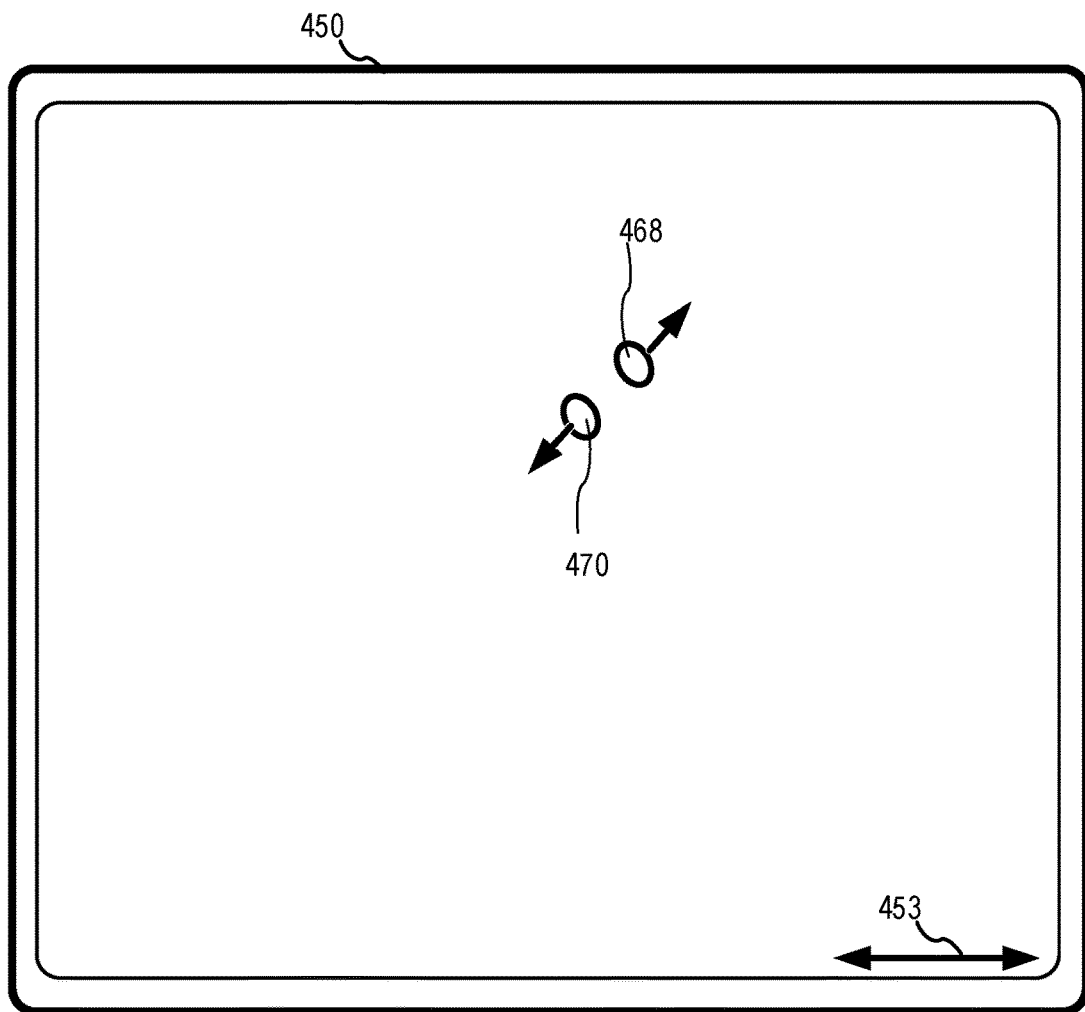
FIG. 4B illustrates an exemplary user interface for a multifunction device with a touch-sensitive surface that is separate from the display, in accordance with some embodiments.
Figure 4B:
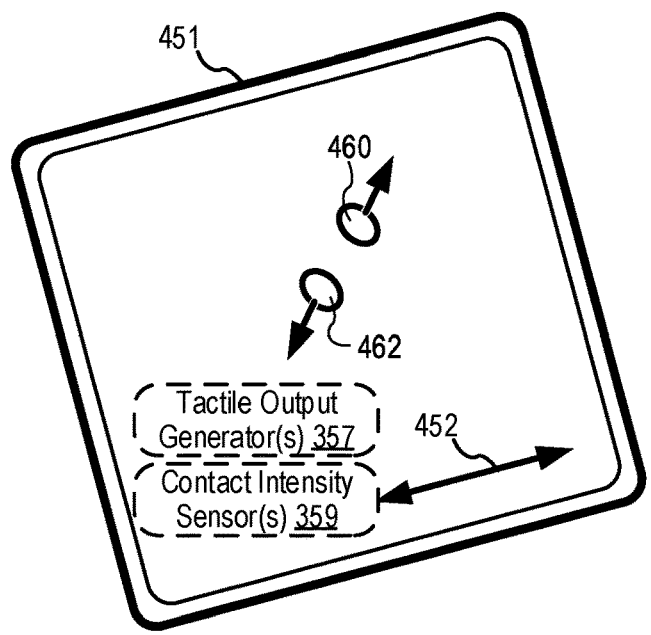

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
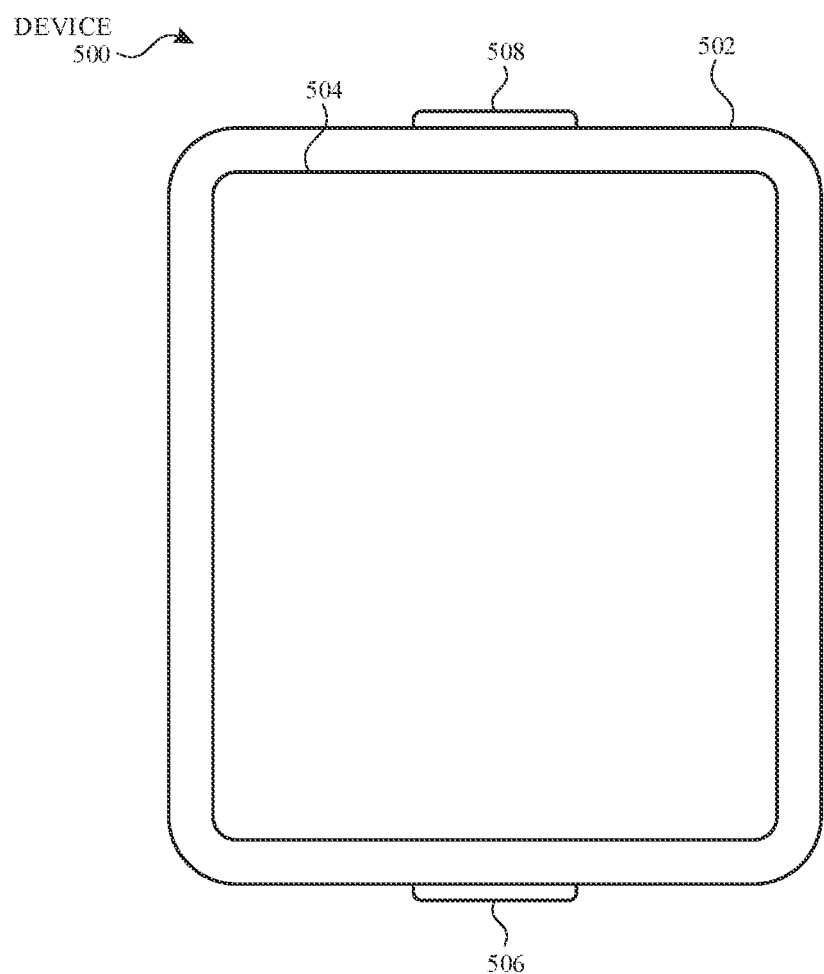
FIG. 5A illustrates a personal electronic device, in accordance with some embodiments.
Figure 6A:
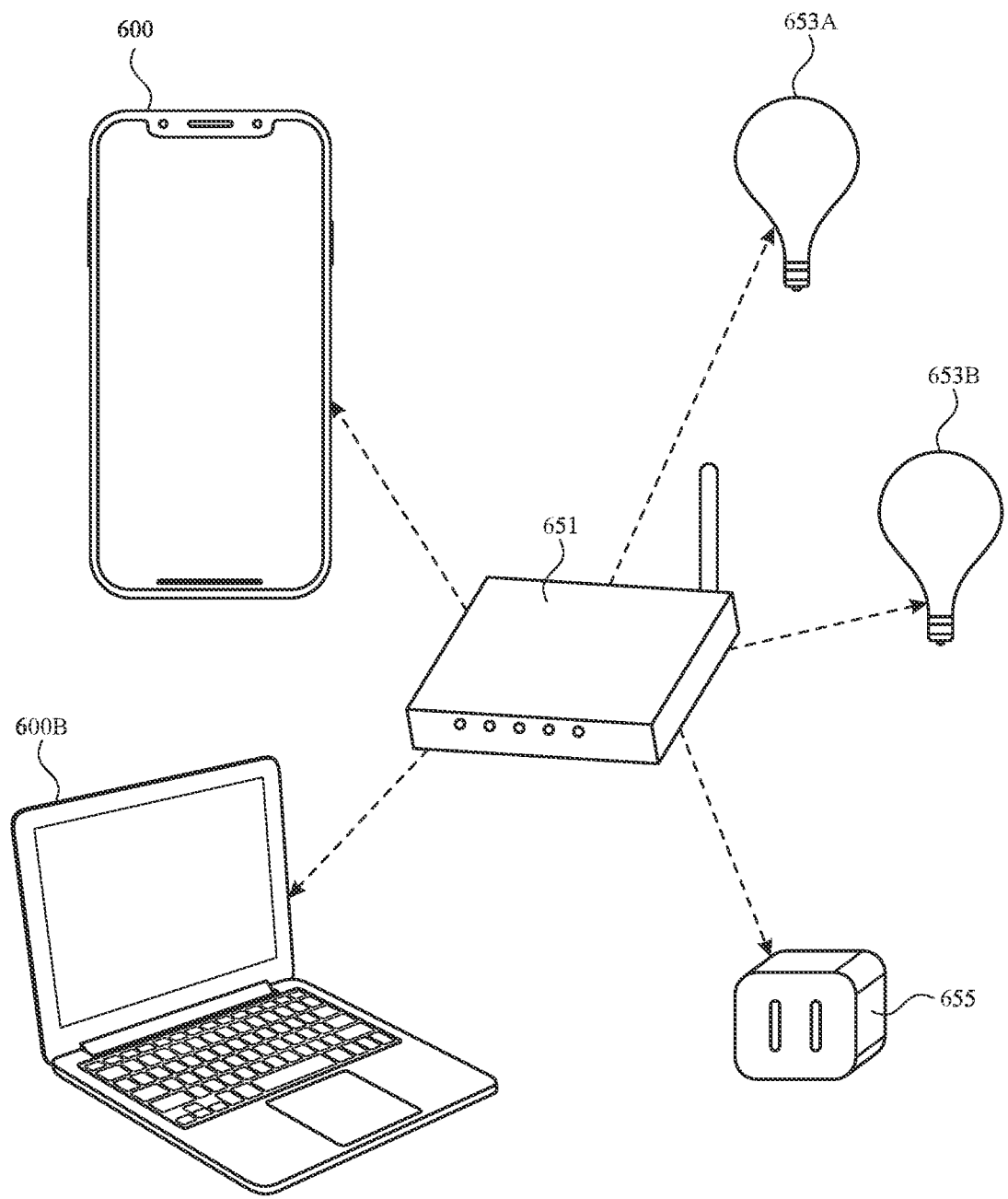
FIG. 6A is a diagram of an example local area network configuration.
Figure 6B:
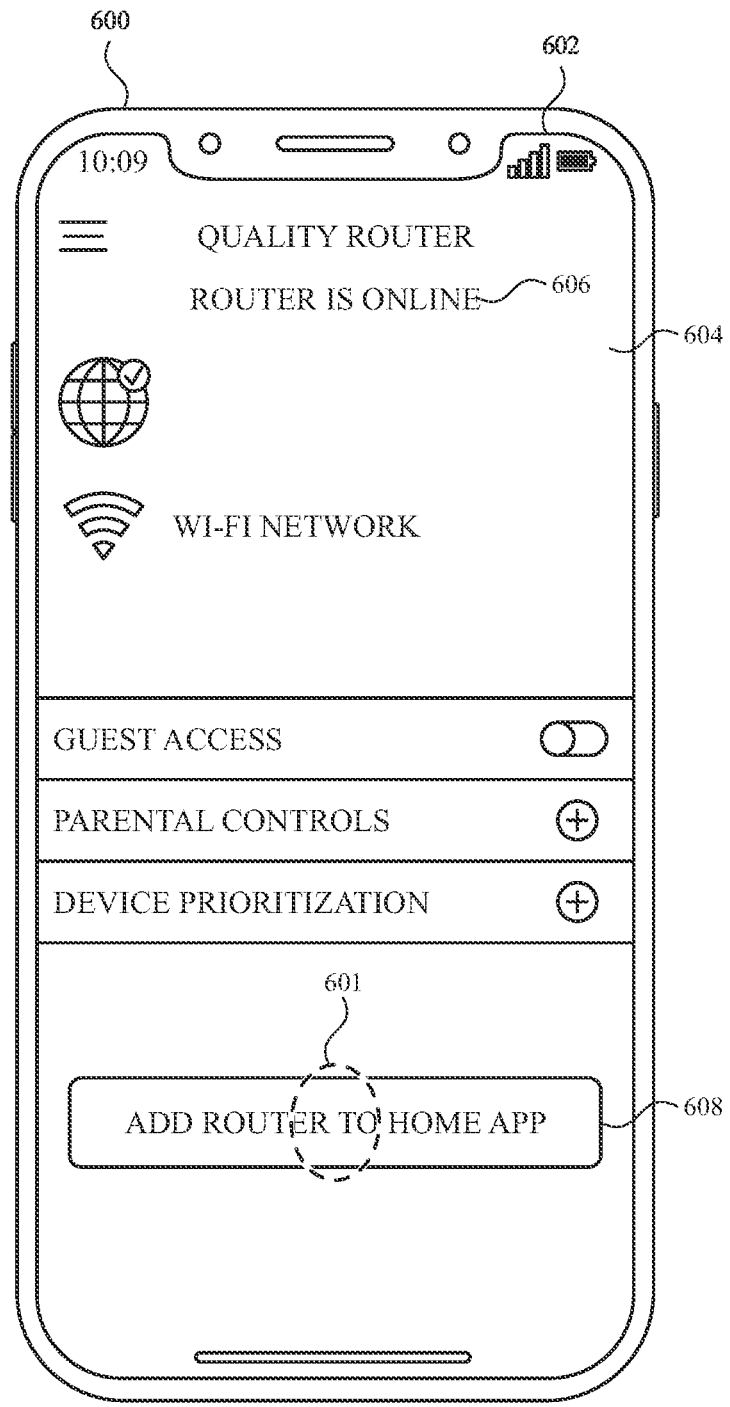
FIGS. 6B-6S illustrate exemplary user interfaces for managing and securing a local network using an electronic device, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
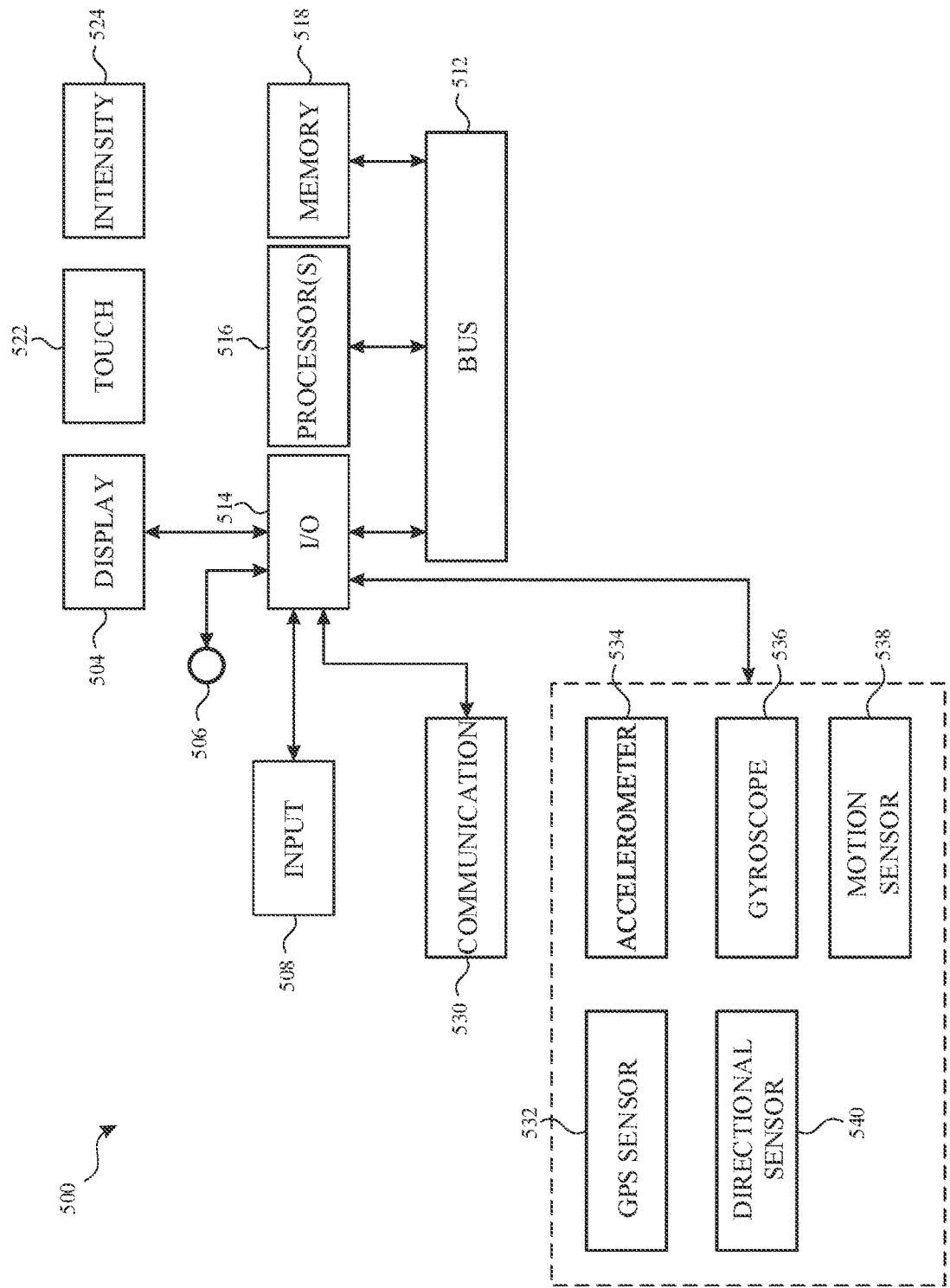
FIG. 5B is a block diagram illustrating a personal electronic device, in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input)

is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIG. 6A is a diagram of an example local area network configuration, and FIGS. 6B-6S illustrate exemplary user interfaces for managing and securing the local network (e.g., a home network) using an electronic device 600 (e.g., similar to portable multifunction device 100, device 300, and device 500 described above; a smartphone), in accordance with some embodiments. Electronic device 600 includes a display 602 (e.g., a touch-sensitive display, as described above). In some embodiments, electronic device includes a wireless communication radio (e.g., for WiFi, Cellular, LTE, NFC, and/or Bluetooth connections). The user interfaces in these figures are used to illustrate the processes described below, including the processes in FIGS. 7A-7D.

FIG. 6A illustrates an example local network (e.g., a local area network (LAN); a home network) of a plurality of devices that are connected via a router 651 (e.g., a WiFi router; a packet-forwarding networking device for managing the local network). In some embodiments, router 651 is a third-party device of a third-party manufacturer that is different from the manufacturer of electronic device 600.

In FIG. 6A, electronic device 600 is connected to the local network via router 651. In some embodiments, a second electronic device 600B (e.g., a laptop computer; a PC) is also connected to the local network via router 651. In some embodiments, a set of first type of external devices 653A-653B (e.g., smart light bulbs) is also connected to the local network via router 651. In some embodiments, a second type of external device 655 (e.g., a smart plug) is also connected to the local network via router 651. In some embodiments, second electronic device 600B, while connected to the local network, is not a type of device that is controllable by electronic device 600 (e.g., to access, manage, and configure network security settings). In some embodiments, external devices 653A and 653B (e.g., smart light bulbs) and external device 655 are types of devices that are controllable by electronic device 600. That is, electronic device 600 is both connected to the plurality of external devices and configured to control (e.g., remotely control) one or more functions of each of the external devices using a home application, which is described in greater detail below.

FIG. 6B illustrates electronic device 600 displaying, on display 602, a third-party router external device 655 of a third-party router application corresponding to router 651. In some embodiments, third-party router external device 655 includes an indication 606 that router 651 is currently online (and thus the local network of FIG. 6A is currently online). In some embodiments, third-party router external device 655 includes an affordance 608 for adding router 651 to the home application (e.g., a smart home management application; a home automation management application; an application for managing smart devices and/or smart accessories that are connected to the local network; a first-party application that is managed by the manufacturer of electronic device 600).

In FIG. 6B, router 651 is a new router that has not yet been added to the home application. In some embodiments, as described in greater detail below, adding a router to the home application comprises enabling management and configuration of the router's settings (e.g., network security settings) via the home application on electronic device 600.

In FIG. 6B, electronic device 600 detects, via display 602, an activation 601 of (e.g., a selection of; a tap gesture or tap input on; a user input directed to) affordance 608 for adding router 651 to the home application.

Figure 6C:
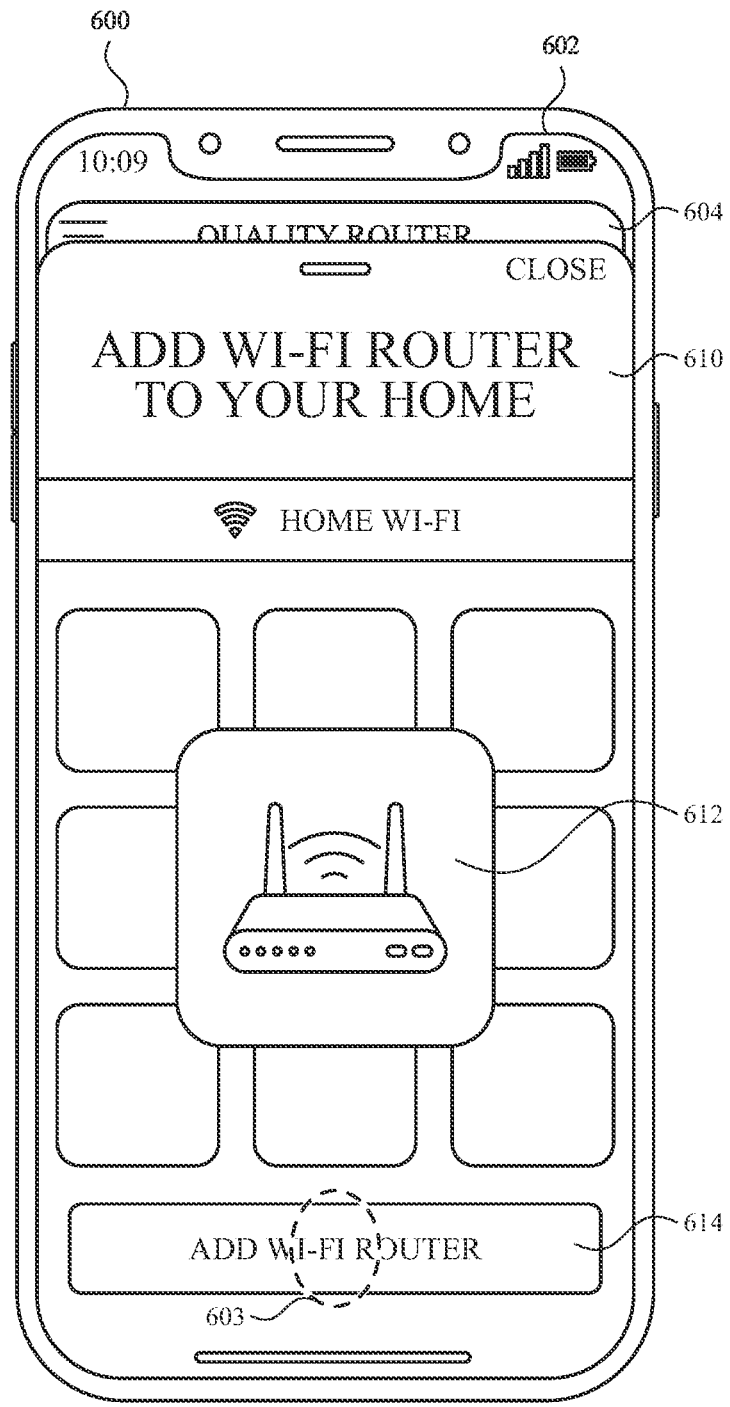

In FIG. 6C, in response to detecting activation 601 of affordance 608 of third-party router external device 655, electronic device 600 displays, on display 602, a user interface 610 of the home application for initiating a process to add router 651 to the home application. In some embodiments, user interface 610 of the home application is displayed over a portion of, but not all of, third-party router external device 655 such that a portion of third-party router external device 655 remains visible on display 602. That is, in some embodiments, user interface 610 of the home application (e.g., and all other user interfaces of the home application) are displayed as a card (e.g., pop-up; overlay) user interface on display 602.

In some embodiments, user interface 610 of the home application includes an indication 612 (e.g., a graphical representation) of router 651 which is to be added to the home application. In some embodiments, user interface 610 of the home application includes an affordance 614 for proceeding with the process of adding router 651 to the home application.

In FIG. 6C, while displaying user interface 610 of the home application, electronic device 600 detects, via display 602, an activation 603 of (e.g., a selection of; a tap gesture or tap input on; a user input directed to) affordance 614 for proceeding with the process of adding router 651 to the home application.

Figure 6D:
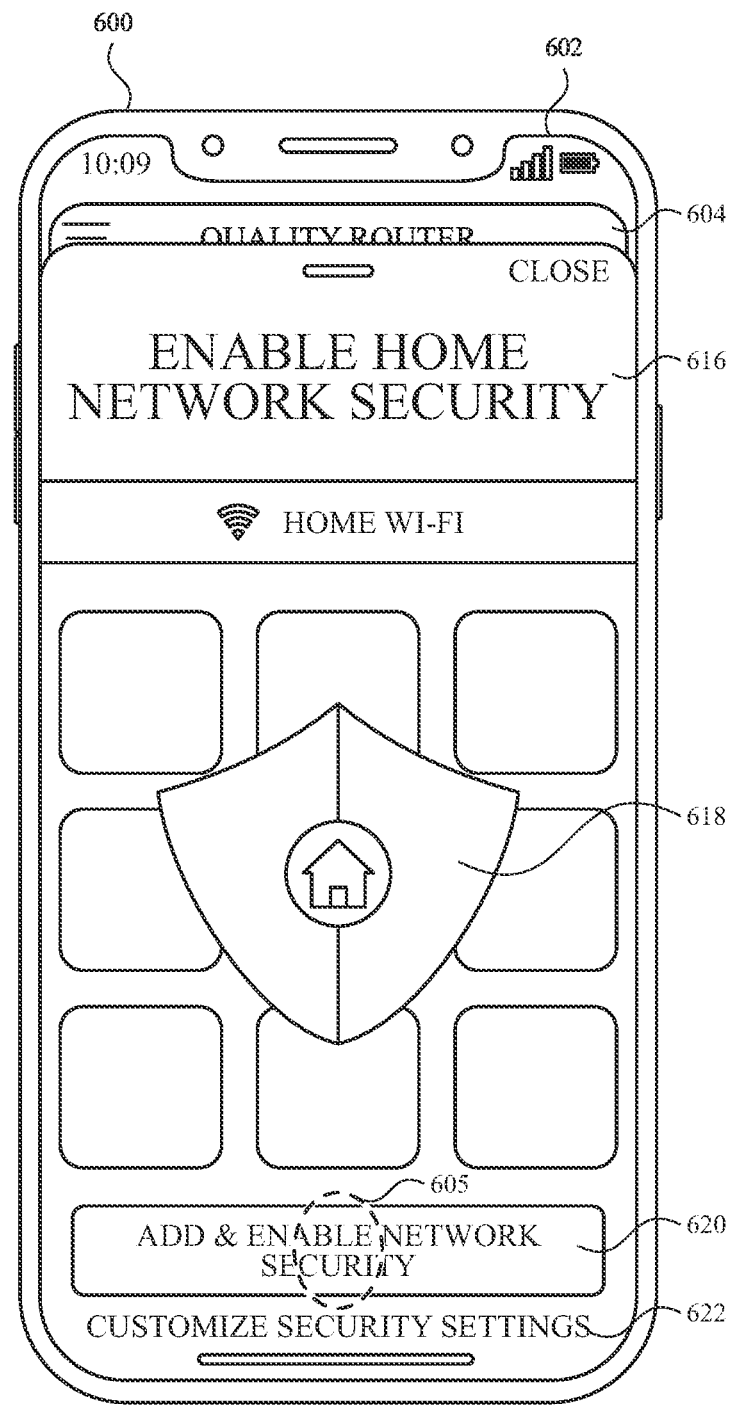

In FIG. 6D, in response to detecting activation 603 of affordance 614 of user interface 610 of the home application, electronic device 600 displays (e.g., replaces display of user interface 610 with), on display 602, a user interface 616 of the home application directed to initiating a process for adding and enabling one or more network access policies for the local network connected via router 651. In some embodiments, as in FIG. 6C, a portion of third-party router external device 655 remains visible on display 602 while displaying user interface 616 of the home application.

In some embodiments, user interface 616 of the home application includes an indication 618 (e.g., a graphical representation) that user interface 616 relates to network access policy settings for the local network managed by router 651. In some embodiments, user interface 616 of the home application includes an affordance 620 for adding and enabling a single network access policy (e.g., a global network access policy; a universal network access policy) across all controllable external devices (e.g., smart cameras, smart light bulbs, smart plugs) (in this example, the set of first type of external devices 653A-653B (e.g., smart light bulbs) and the second type of external device 655 (e.g., a smart plug)) on the local network. In some embodiments, a network access policy applied by the home application controls the controllable external devices' (in this example, the set of first type of external devices 653A-653B's and the second type of external device 655's) access to one or more local and/or remote network domains/addresses, and is administered and enforced via router 651 (e.g., via one or more functions and/or settings of router 651).

In some embodiments, user interface 616 of the home application includes a selectable option 622 (e.g., an affordance) for customizing network access policies such that different network access policies are applied to different controllable external devices on the local network managed by router 651.

In FIG. 6D, while displaying user interface 616 of the home application, electronic device 600 detects, via display 602, an activation 605 of (e.g., a selection of; a tap gesture or tap input on; a user input directed to) affordance 620 for adding and enabling a single network access policy (e.g., a global network access policy; a universal network access policy) to all controllable external devices (in this example, the set of first type of external devices 653A-653B (e.g., smart light bulbs) and the second type of external device 655 (e.g., a smart plug)) on the local network.

Figure 6E:
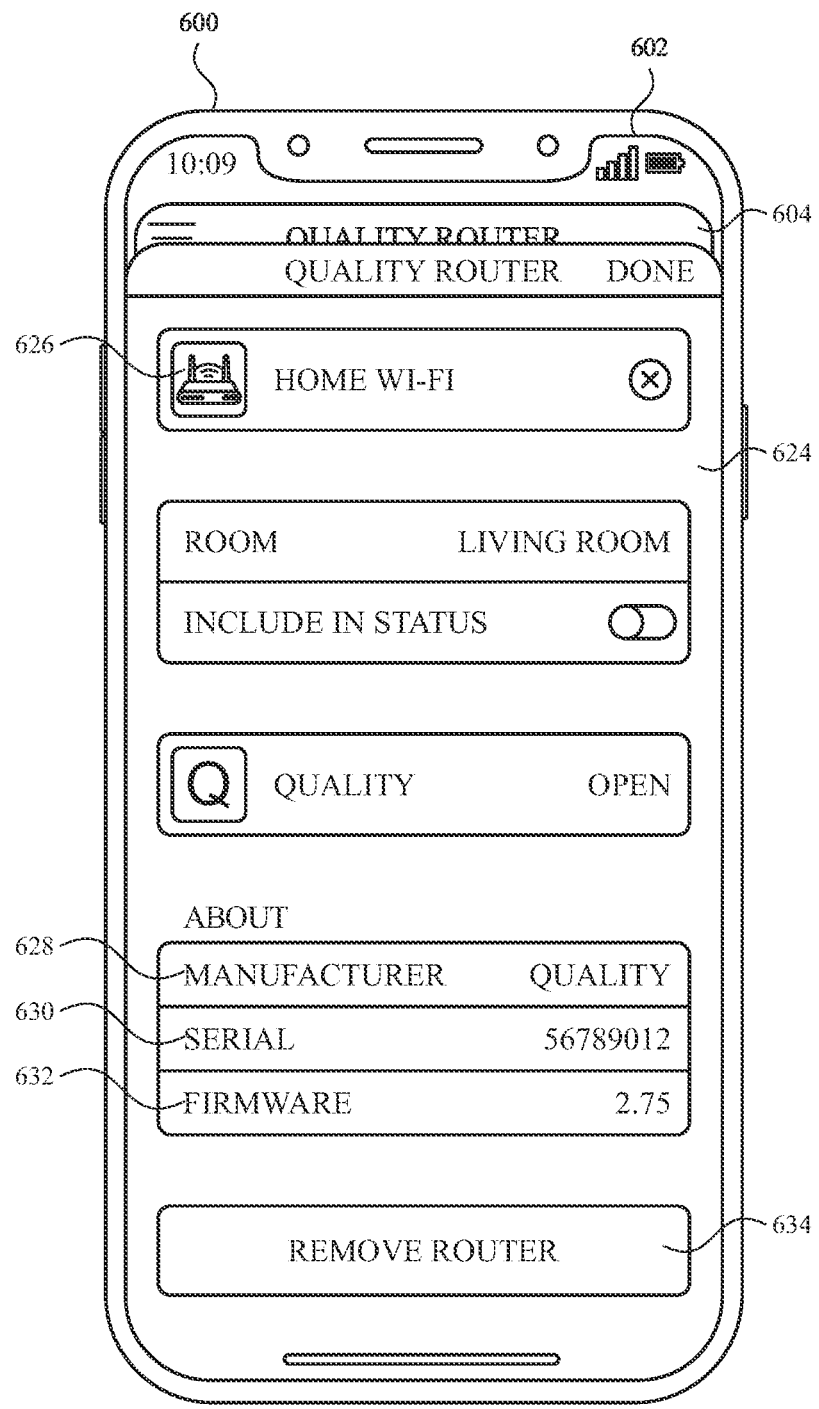

In FIG. 6E, in response to detecting activation 605 of affordance 620, electronic device 600 applies (e.g., automatically, without further input) the single network access policy to all controllable external devices (in this example, the set of first type of external devices 653A-653B (e.g., smart light bulbs) and the second type of external device 655 (e.g., a smart plug)) on the local network. Electronic device 600 also adds router 651 to the home application, permitting management of one or more settings (e.g., security settings) of router 651 via the home application, as discussed in more detail, below.

Further in response to detecting activation 605 of affordance 620, electronic device 600 displays (e.g., replaces display of user interface 616 with), on display 602, a router summary user interface 624 of the home application, where router summary user interface 624 includes information (e.g., settings information; activity information; configuration information) about router 651. In some embodiments, router summary user interface 624 includes an indication 626 of the local network that is connected via router 651, an indication 628 of the manufacturer of router 651, an indication 630 of a serial number of router 651, and an indication 632 of a firmware version of router 651. In some embodiments, router summary user interface 624 includes an affordance 634 for removing router 651 from the home application. In some embodiments, as in FIGS. 6C-6D, a portion of third-party router external device 655 remains visible on display 602 while displaying user interface 616 of the home application.

Figure 6F:
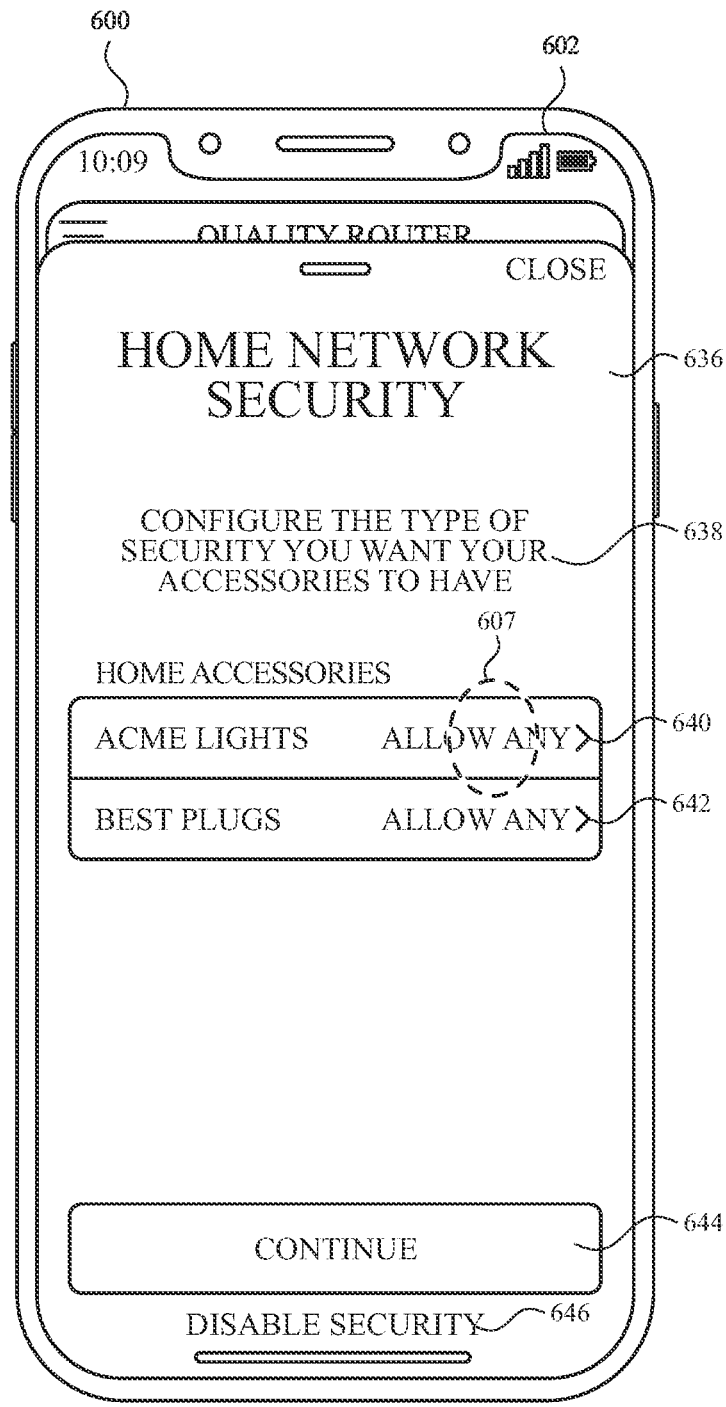

FIG. 6F illustrates electronic device 600 displaying (e.g., by replacing display of user interface 616 with), on display 602, a user interface 636 of the home application in response to detecting a selection of selectable option 622 of user interface 616, as described above with reference to FIG. 6D. In some embodiments, selection of selectable option 622 also adds router 651 to the home application, permitting management of one or more settings (e.g., security settings) of router 651 via the home application. User interface 636 of the home application is directed to (e.g., as indicated by information region 638) enabling customized network access policies such that different network access policies can be applied to different controllable external devices on the local network, instead of a single network access policy (e.g., a global or universal network access policy) being applied to all controllable external devices on the local network.

In some embodiments, user interface 636 includes a first selectable user interface element 640 corresponding to the set of first type of external devices 653A-653B (e.g., smart light bulbs) of the local network connected via router 651. In some embodiments, user interface 636 includes a second selectable user interface element 642 corresponding to second type of external device 655 (e.g., a smart plug) of the local network. In some embodiments, a selectable user interface element includes information about the currently-selected network access policy setting for its respective external device(s).

In some embodiments, user interface 636 includes a continue affordance 644 for confirming and applying the currently-configured network access policy settings. In some embodiments, user interface 636 includes a disable affordance 646 for disabling current network access policy settings. As shown in the embodiment of FIG. 6F, selecting selectable option 622 of user interface 616 of FIG. 6D caused the set of first type of external devices 653A-653B and the second type of external device 655 to both be associated with a network access setting of "ALLOW ANY," which is, effectively, not applying a network access policy (e.g., a policy that provides additional security).

In FIG. 6F, while displaying user interface 636 of the home application, electronic device 600 detects, via display 602, a selection 607 of (e.g., a tap gesture or tap input on; a user input directed to) first selectable user interface element 640 corresponding to the set of first type of external devices 653A-653B (e.g., smart light bulbs) of the local network managed by router 651.

Figure 6G:
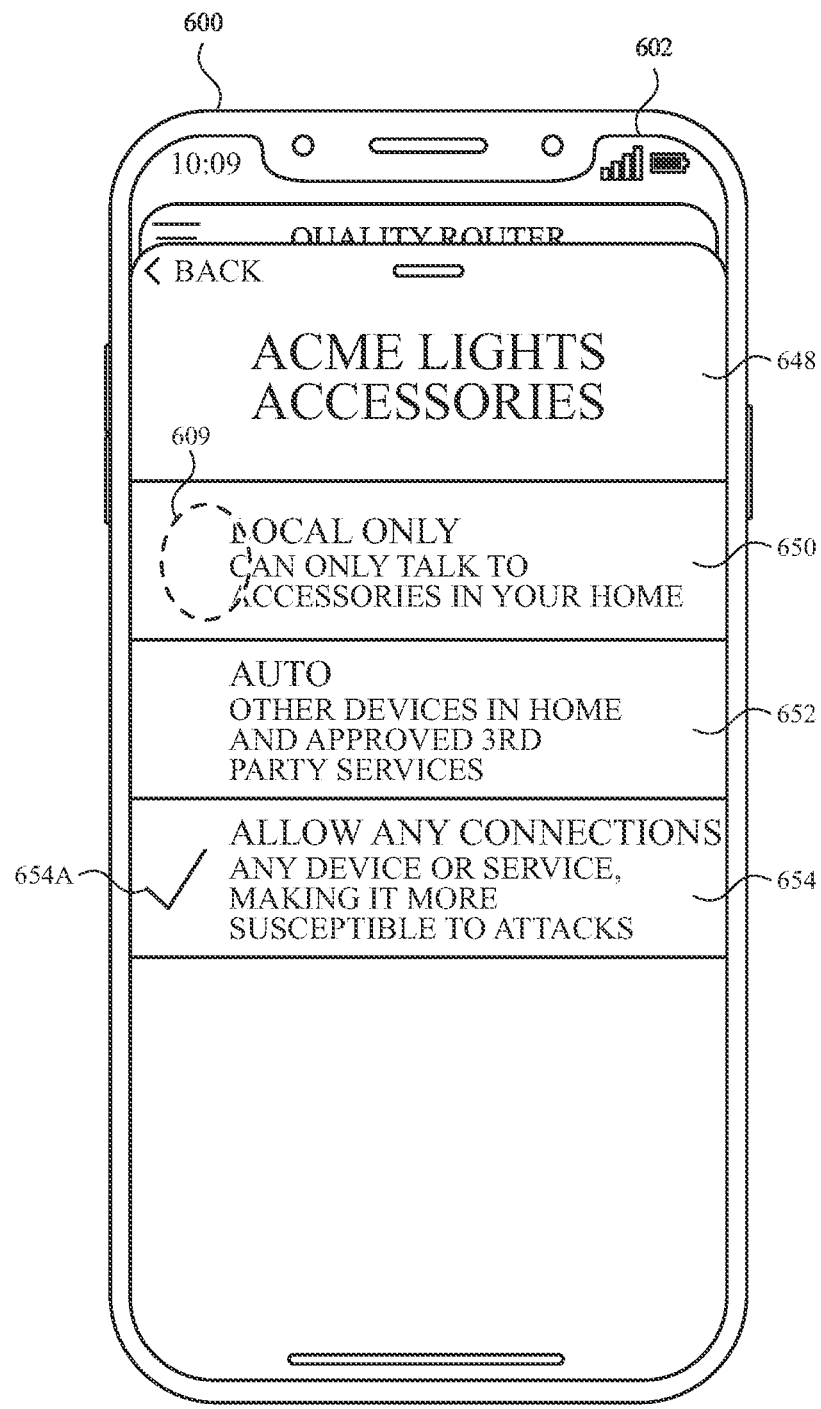

In FIG. 6G, in response to detecting selection 607 of first selectable user interface element 640, electronic device 600 displays (e.g., replaces display of user interface 636 with), on display 602, a user interface 648 of the home application that includes a plurality of selectable network access policy options, including a first option 650 corresponding to a first network access policy (in this example, a "LOCAL ONLY" option), a second option 652 corresponding to a second network access policy (in this example, an "AUTO" option), and a third option 654 corresponding to a third network access policy (in this example, an "ALLOW ANY CONNECTIONS" option), that can be applied to the respective external device(s) (in this example, the set of first type of external devices 653A-653B). In this example, third option 654 includes a selection indicator 654A as the third network access policy is the currently-selected policy for the respective external device(s) (in this example, the set of first type of external devices 653A-653B).

In FIG. 6G, while displaying user interface 648 of the home application corresponding to the set of first type of external devices 653A-653B (e.g., smart light bulbs) with the third network access policy selected for the respective external devices, electronic device 600 detects, via display 602, a selection 609 of (e.g., a tap gesture or tap input on; a user input directed to) first option 650 corresponding to the first network access policy (in this example, a "local only" option).

Figure 6H:
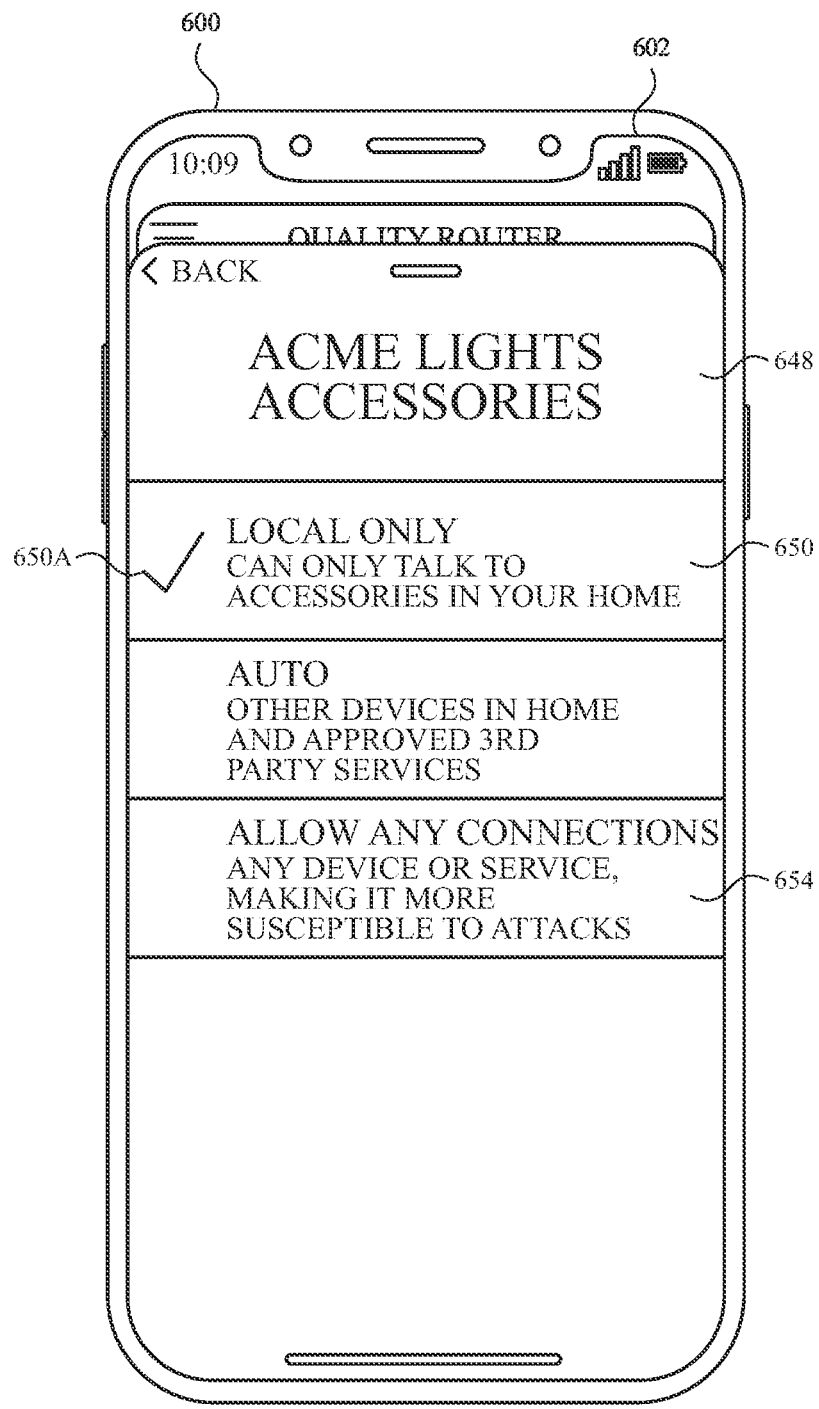

In FIG. 6H, in response to detecting selection 609 of first option 650 corresponding to the first network access policy, electronic device 600 applies the first network access policy to the set of external devices 653A and 653B such that network access by external devices 653A and 653B are now restricted based on network settings of the first network access policy (in this example, a "local only" network access policy). In some embodiments, further in response to detecting selection 609 of first option 650 corresponding to the first network access policy, electronic device 600 displays first option 650 with a selection indicator 650A, thereby indicating that the first network access policy has been applied to the respective external devices (in this example, the set of first type of external devices 653A-653B).

Figure 6I:
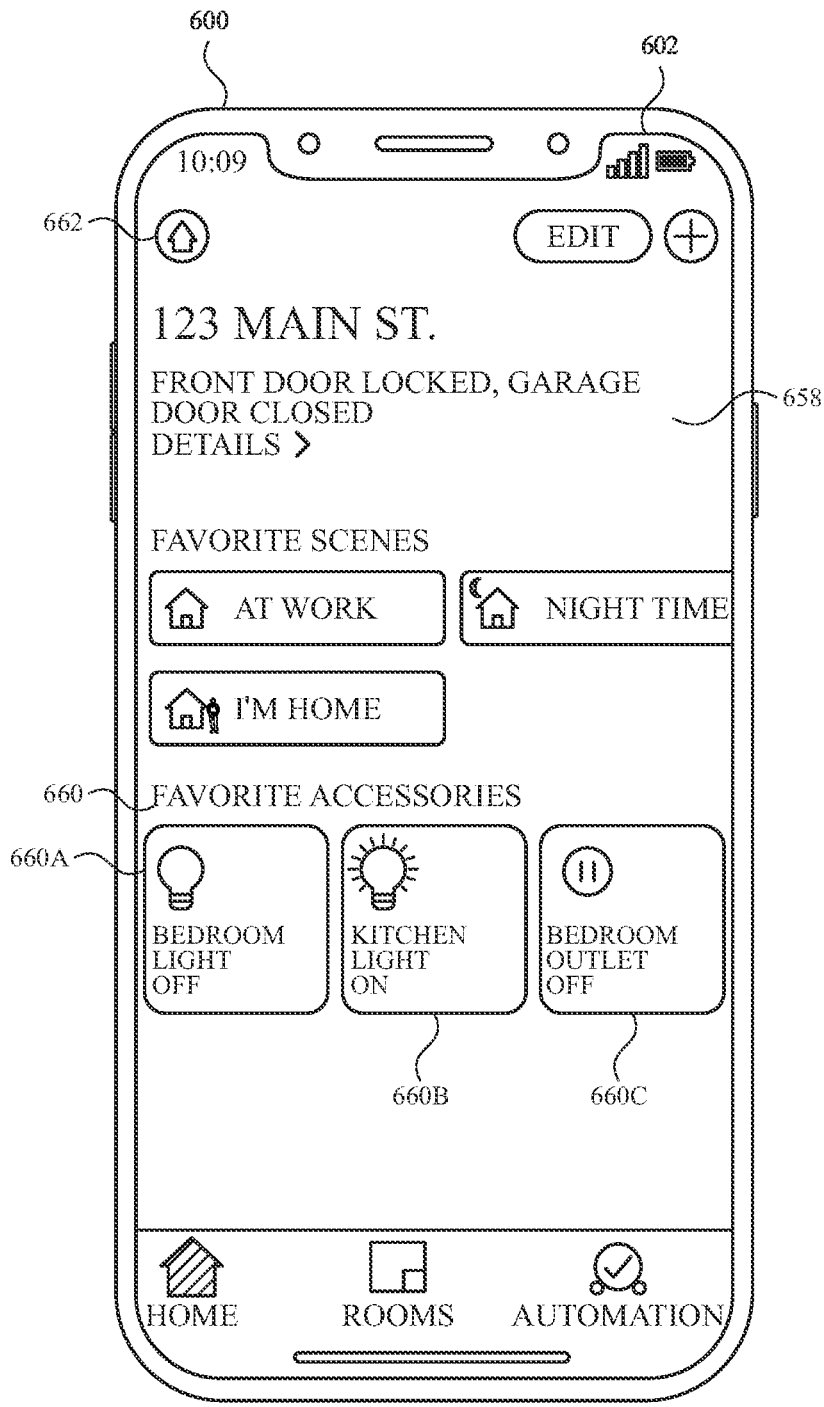

FIG. 6I illustrates electronic device 600 displaying, on display 602, a control user interface 658 of the home application after router 651 has been added to the home application (e.g., and network access policy settings, whether global or customized, have been applied to controllable external devices on the local network). In some embodiments, control user interface 658 of the home application includes a controllable devices region 660 that includes selectable controls corresponding to individual controllable external devices (e.g., smart cameras, smart light bulbs, smart plugs) (in this example, external devices 653A and 653B (e.g., smart light bulbs) and external device 655 (e.g., a smart plug)) on the local network.

In FIG. 6I, electronic device 600 displays, in controllable devices region 660 of control user interface 658 of the home application, a first selectable control 660A corresponding to external device 653A (e.g., a smart light bulb) and a second selectable control 660B corresponding to external device 653B (e.g., a smart light bulb). In some embodiments, external devices 653A and 653B can be controlled (e.g., turned on and off) using selectable control 660A and 660 (e.g., via selection of the respective selectable control), respectively. In some embodiments, electronic device 600 also displays, in controllable devices region 660 of control user interface 658 of the home application, a third selectable control 660C corresponding to external device 602C (e.g., a smart plug). In some embodiments, external device 655 can be controlled (e.g., activated an deactivated; enabled and disabled) using selectable control 660C (e.g., via selection of the selectable control). In some embodiments, control user interface 658 of the home application also includes a settings affordance 662. FIG. 6I is displayed on electronic device 600 after router 651 has been added to the home application, which permits management of one or more settings of router 651 via the home application. However, despite having been added to the home application, a selectable control is not displayed in region 660 for router 651. In some embodiments, a selectable control for router 651 is not displayed because providing such controls can lead to unintentional disabling of router functions (e.g., router security functions).

Figure 6J:
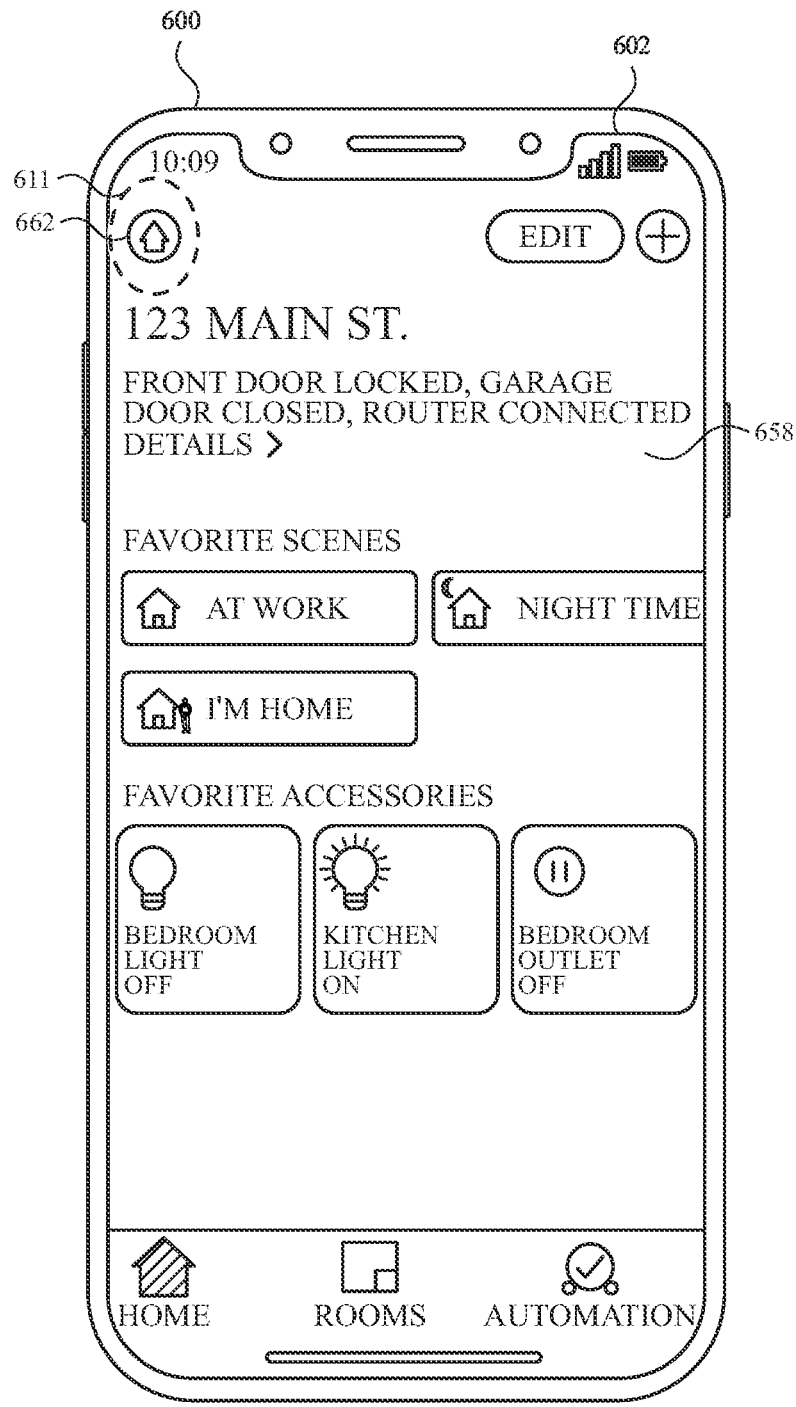

In FIG. 6J, while displaying control user interface 658 of the home application, electronic device 600 detects, via display 602, an activation 611 of (e.g., a selection of; a tap gesture or input on; a user input directed to) settings affordance 662.

Figure 6K:
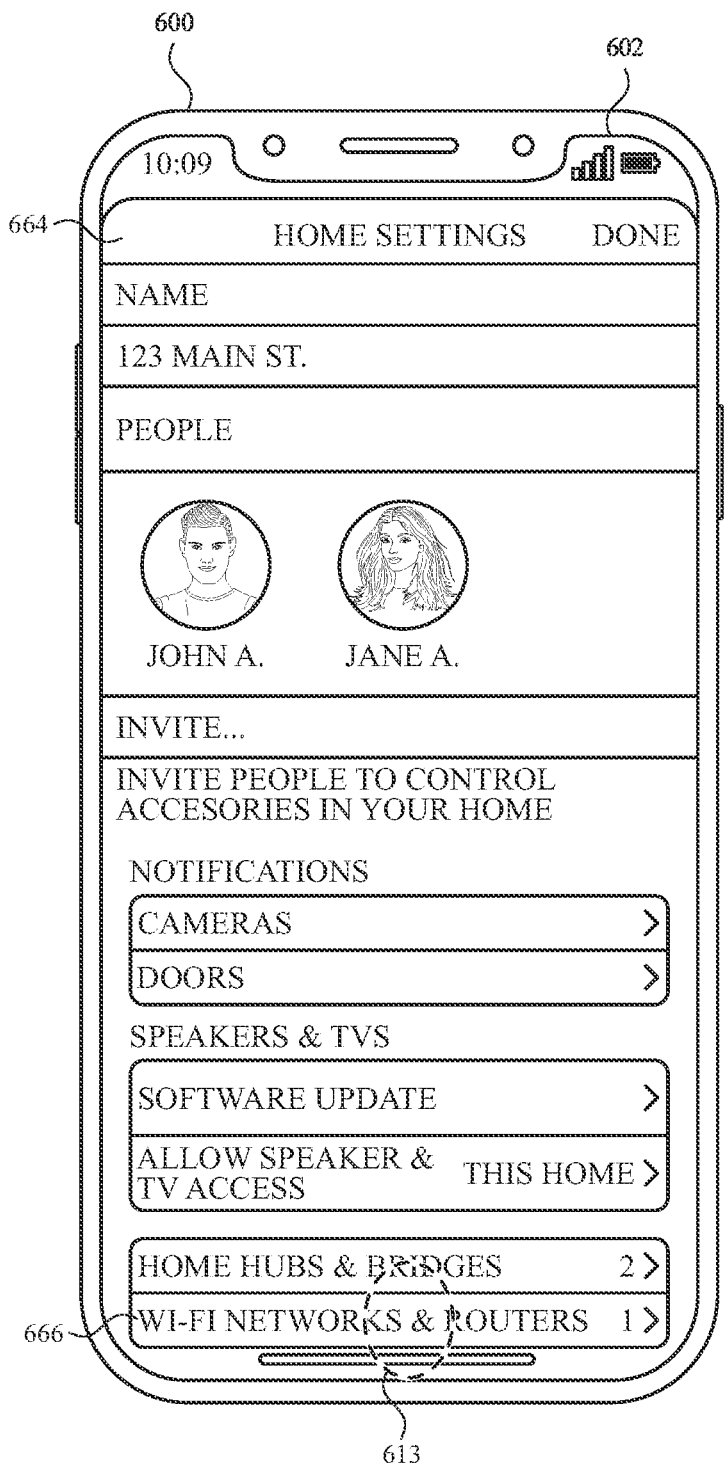

In FIG. 6K, in response to detecting activation 611 of settings affordance 662, electronic device 600 displays, on display 602, a settings user interface 664 of the home application. In some embodiments, settings user interface 664 of the home application includes a selectable option 666 for causing display of network and router information of the local network. In some embodiments, selectable option 666 includes an indication of the number of routers and router extenders that are managing the local network.

In FIG. 6K, while displaying settings user interface 664 of the home application, electronic device 600 detects, via display 602, a selection 613 of (e.g., a tap gesture or tap input on; a user input directed to) selectable option 666 for causing display of network and router information of the local network.

Figure 6L:
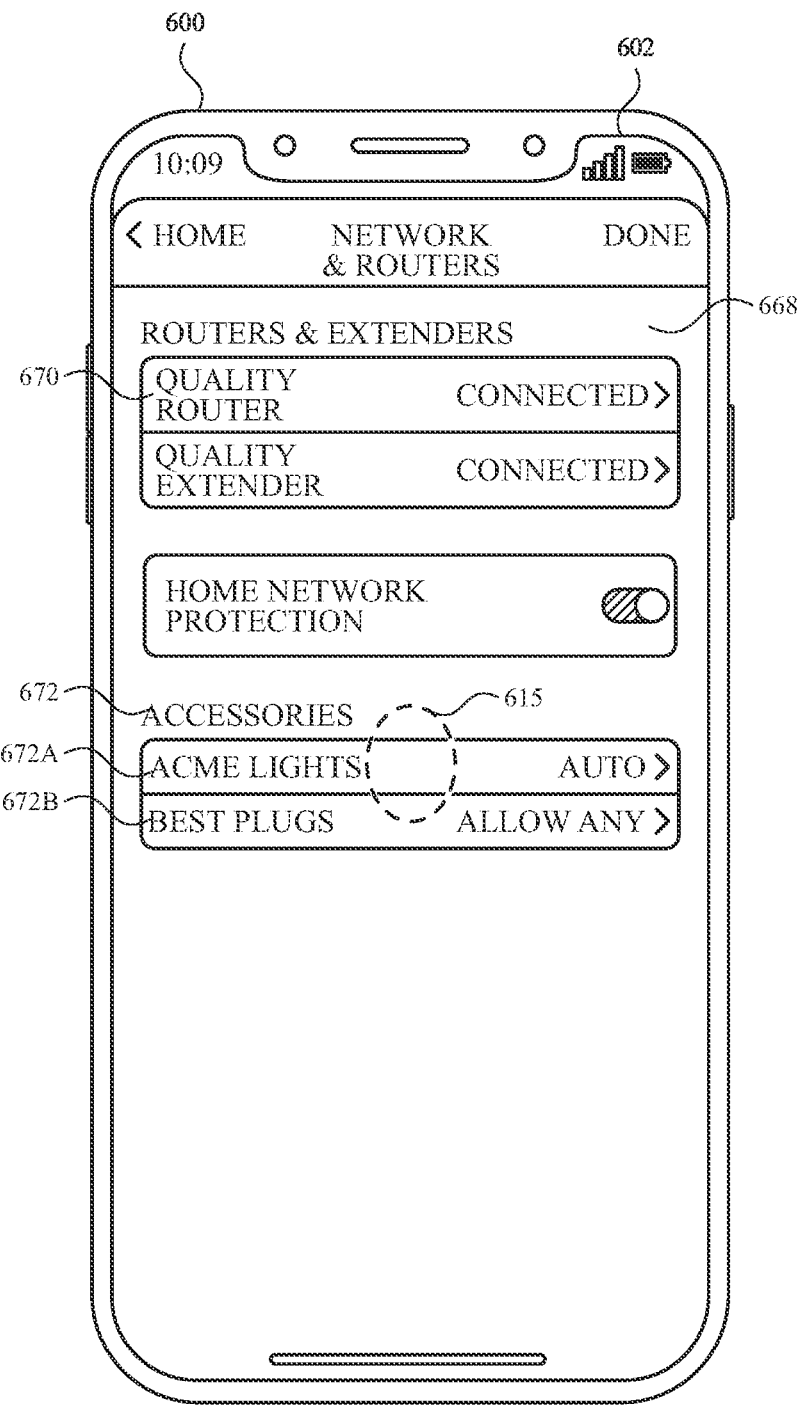

In FIG. 6L, in response to detecting selection 613 of selectable option 666, electronic device 600 displays (e.g., replaces display of settings user interface 664 with), on display 602, a network and router information user interface 668 of the home application.

In some embodiments, network and router information user interface 668 includes a selectable option 670 that indicates that router 651 is managing the local network and which, when selected, causes display of detailed information about router 651 (e.g., similar to the information shown in FIG. 6E). In some embodiments, network and router information user interface 668 includes a connected devices region 672 (e.g., labeled "ACCESSORIES") that includes selectable options corresponding to controllable external devices and/or sets of similar/related controllable external devices (e.g., the set of external devices 653A-653B, external device 655) that are connected to the local network managed by router 651. In this example, connected devices region 672 includes a first selectable option 672A corresponding to the set of first type of external devices 653A-653B (e.g., smart light bulbs) and a second selectable option 672B corresponding to the second type of external device 655 (e.g., a smart plug). In some embodiments, a selectable option of connected devices region 672 includes an indication of a network access policy type that is currently being applied to the respective controllable external device(s) or sets of external devices. In this example, first selectable option 672A indicates that the second network access policy (in this example, the "AUTO" network access policy) is currently applied to the set of first type of external devices 653A-653B (e.g., smart light bulbs) and second selectable option 672B indicates that the third network access policy (in this example, the "allow any connections" network access policy) is currently applied to second type of external device 655 (e.g., a smart plug). In some embodiments, the "AUTO" policy allows the respective device to access devices and addresses on the local area network and also allows the respective device to access devices and addresses outside the local area network (e.g., a remote network) that are approved (e.g., that are on a white list).

In FIG. 6L, while displaying network and router information user interface 668 of the home application, electronic device 600 detects, via display 602, a selection 615 of first selectable option 672A corresponding to the set of first type of external devices 653A-653B (e.g., smart light bulbs).

Figure 6M:
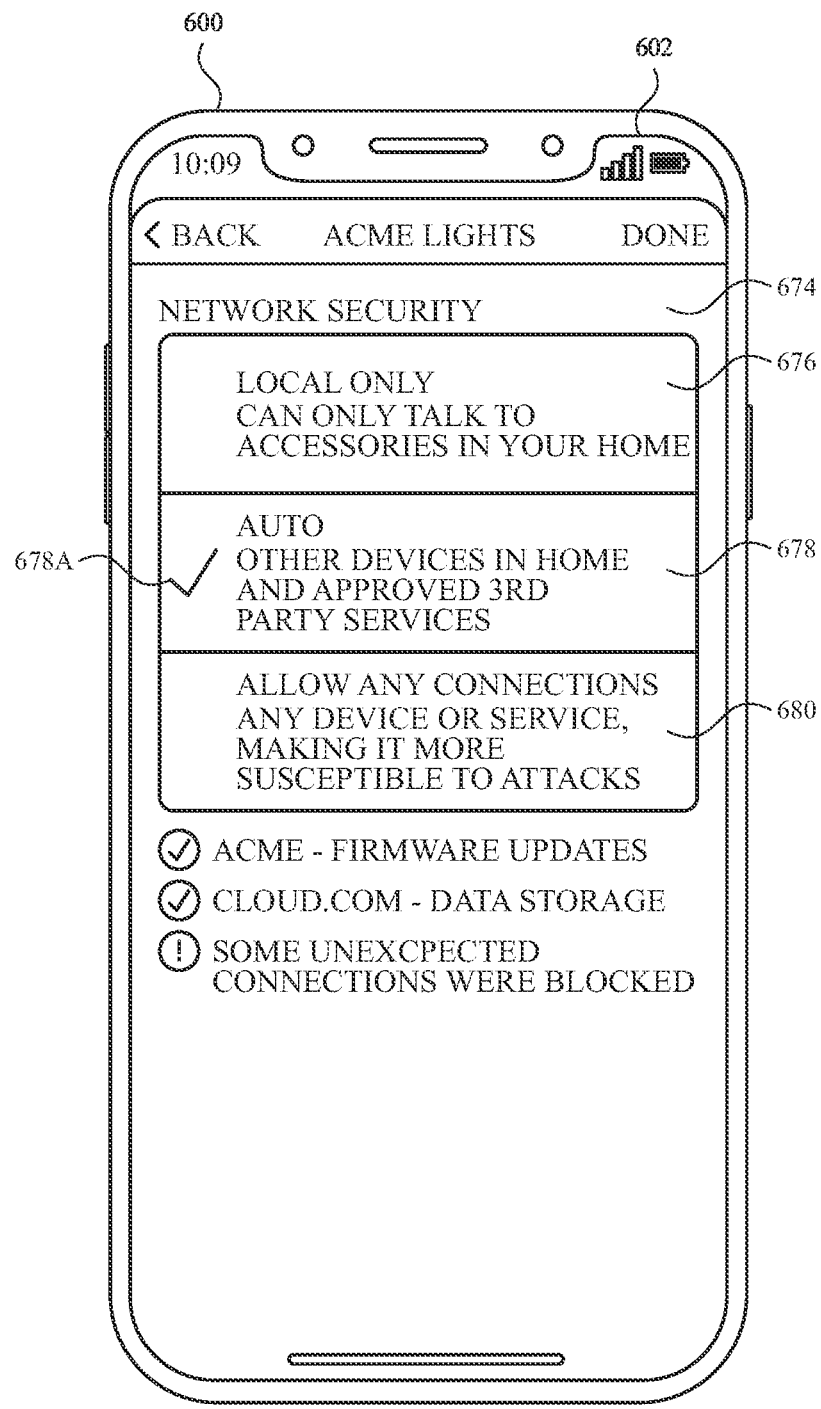

In FIG. 6M, in response to detecting selection 615 of first selectable option 672A, electronic device 600 displays, on display 602, a policy selection user interface 674 of the home application (e.g., similar to user interface 648 of the home application described above with reference to FIGS. 6G-6H).

In some embodiments, similar to user interface 648, policy selection user interface 674 includes a plurality of selectable network access policy options including a first option 676 corresponding to the first network access policy (in this example, a "LOCAL ONLY" option), a second option 678 corresponding to the second network access policy (in this example, an "AUTO" option), and a third option 680 corresponding to the third network access policy (in this example, an "ALLOW ANY CONNECTIONS" option), that can be applied to the respective external device(s) (in this example, the set of first type of external devices 653A-653B). In this example, second option 678 includes a selection indicator 678A, as the second network access policy is the currently-selected network access policy for the set of first type of external devices 653A-653B. User interface 648 also includes indications of network events related to the selected type of external device. As seen in FIG. 6M, events can include software updates (e.g., "FIRMWARE UPDATES"), access blocked events (e.g., "SOME UNEXPECTED CONNECTIONS WERE BLOCKED"), and access granted events (e.g., "CLOUD.COM—DATA STORAGE"), based on the network access policy that has been set for the selected type of external device.

Figure 6N:
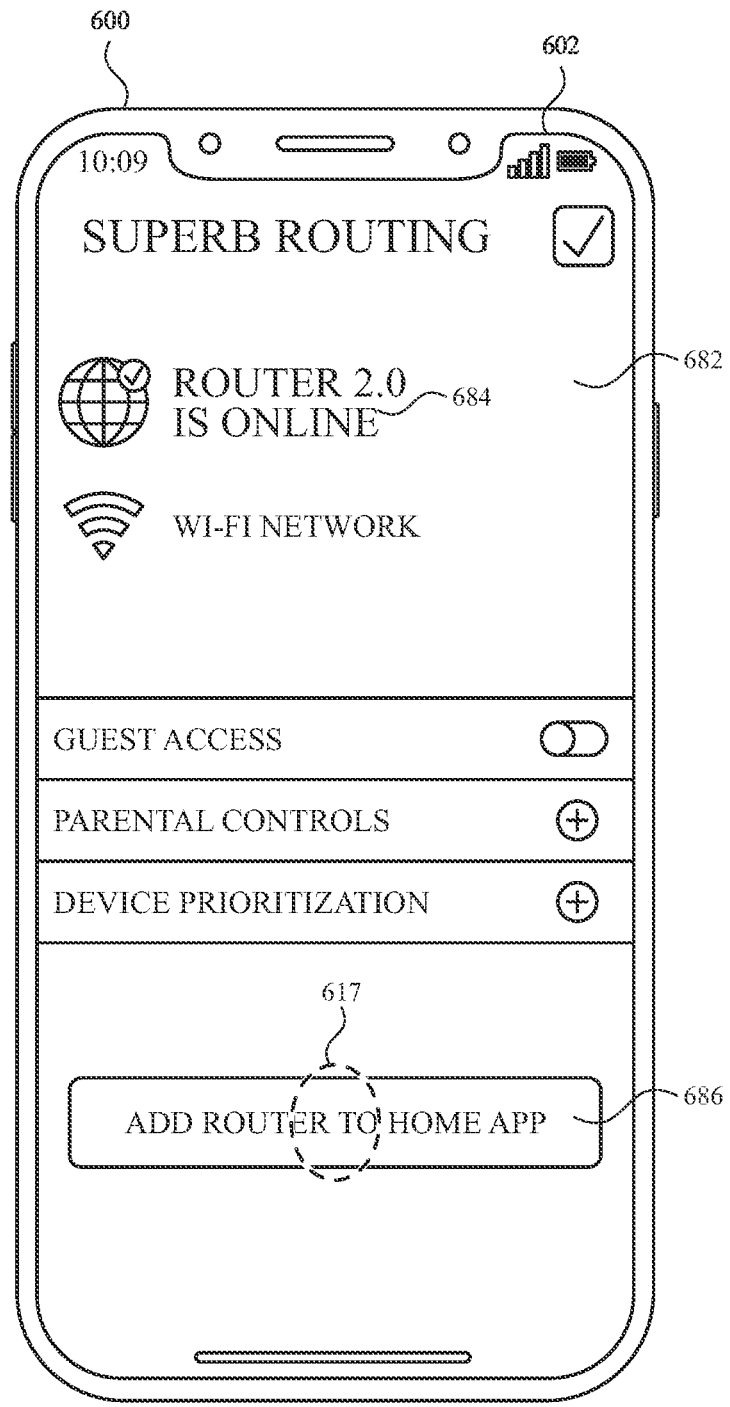

FIG. 6N illustrates electronic device 600 displaying, on display 602, a third-party router user interface 682 of a third-party router application corresponding to a replacement router that is different from router 651. In some embodiments, the replacement router is manufactured by the same third-party manufacturer as router 651. In some embodiments, the replacement router is manufactured by a different third-party manufacturer as router 651. In some embodiments, third-party router user interface 682 includes an indication 684 that the replacement router is currently online (and thus is part of the local network). In some embodiments, third-party router user interface 682 includes an affordance 686 for adding replacement new router to the home application.

In FIG. 6N, electronic device 600 detects, via display 602, an activation 617 of (e.g., selection of; a tap gesture or tap input on; a user input directed to) affordance 686 for adding the replacement router to the home application.

Figure 6O:
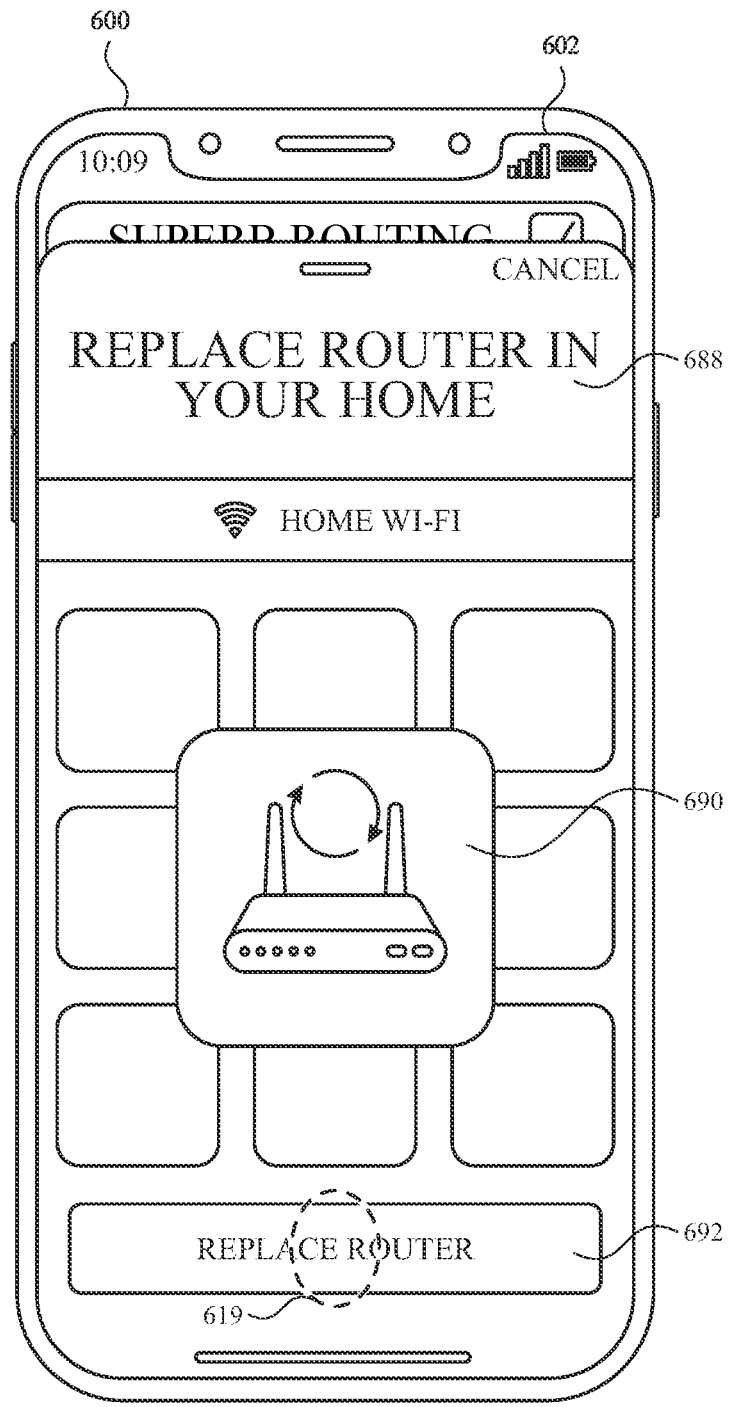

In FIG. 6O, in response to detecting activation 617 of affordance 686, electronic device 600 displays, on display 602, a user interface 688 of the home application for initiating a process to replace router 651 with the replacement router on the home application (e.g., similar to user interface 610 of the home application for initiating a process to add router 651 to the home application described above with reference to FIG. 6C). In some embodiments, user interface 688 of the home application is displayed over a portion of, but not all of, third-party router user interface 682 such that a portion of third-party router user interface 682 remains visible on display 602.

In some embodiments, user interface 688 of the home application includes an indication 690 (e.g., a graphical representation) of the replacement router which is to replace router 651 in the home application. In some embodiments, user interface 688 of the home application includes an affordance 692 for proceeding with the process of replacing router 651 with the replacement router in the home application.

In FIG. 6O, while displaying user interface 688 of the home application, electronic device 600 detects, via display 602, an activation 619 of (e.g., a selection of; a tap gesture or input on; a user input directed to) affordance 692 for proceeding with the process of replacing router 651 with the replacement router in the home application.

Figure 6P:
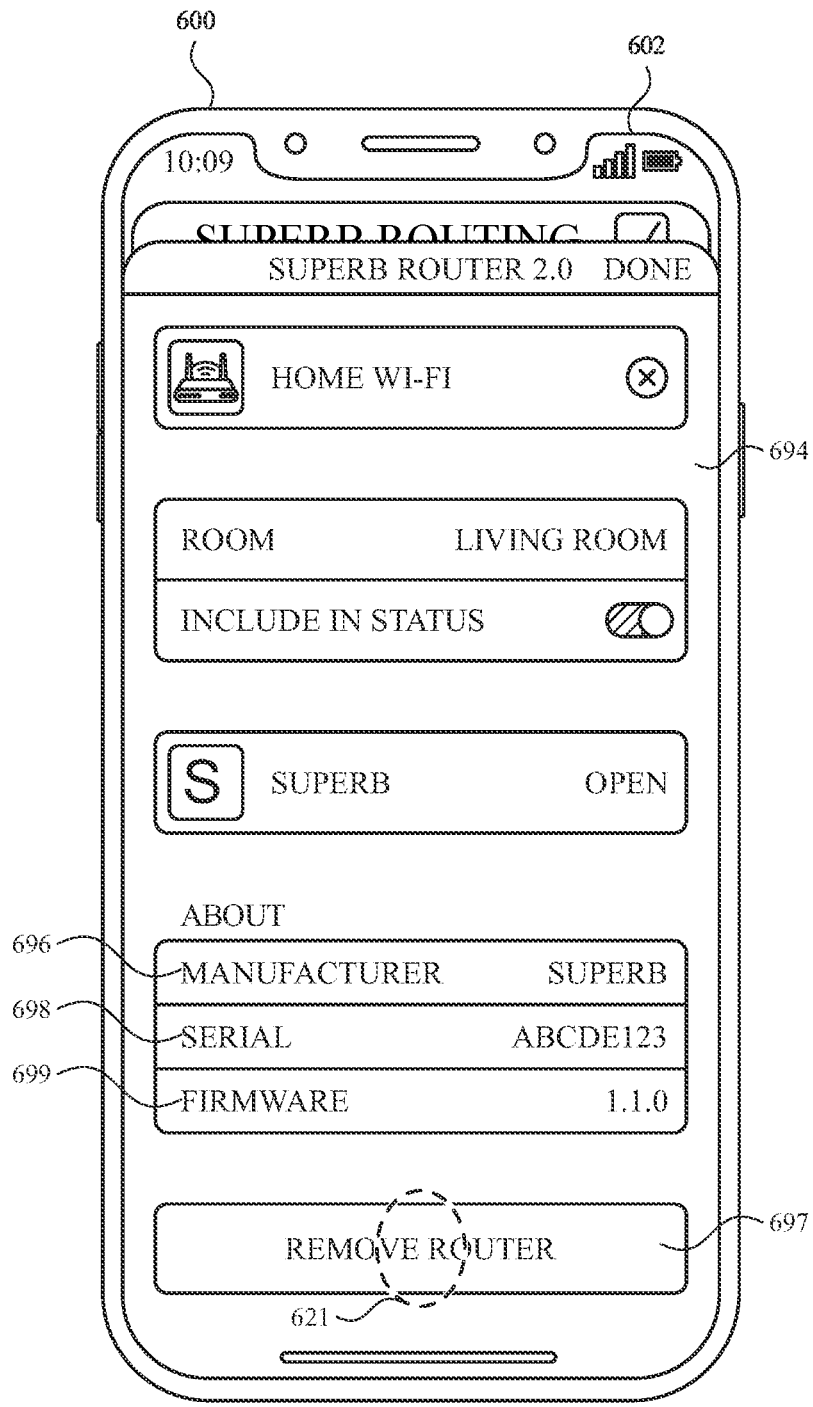

In FIG. 6P, in response to detecting activation 619 of affordance 692, electronic device 600 continues to apply the same network access policy (or policies) to the controllable external devices (in this example, the set of first type of external devices 653A-653B (e.g., smart light bulbs) and second type of external device 655 (e.g., a smart plug)) of the local network under the replacement router as was being applied under router 651.

In some embodiments, further in response to detecting activation 619 of affordance 692, electronic device 600 displays (e.g., replaces display of user interface 688 with), on display 602, a router summary user interface 694 for the corresponding to the replacement router (e.g., similar to router summary user interface 624 of the home application corresponding to router 651 described above with reference to FIG. 6E) that includes information (e.g., settings information; activity information; configuration information) about the replacement router. In some embodiments, router summary user interface 694 includes an indication 696 of the manufacturer of the replacement router, an indication 698 of a serial number of the replacement router, and an indication 699 of a firmware version of the replacement router. In some embodiments, router summary user interface 694 includes an affordance 697 for removing the replacement router from the home application.

In FIG. 6P, while displaying user interface 694 corresponding to the replacement router, electronic device 600 detects, via display 602, an activation 621 of (e.g., a selection of; a tap gesture or tap input on; a user input directed to) affordance 697 for removing the replacement router from the home application.

In some embodiments, when electronic device 600 detects activation 621 of affordance 697 in FIG. 6P, the replacement router is connected to the local network and all controllable external devices on the local network (in this example, the set of first type of external devices 653A-653B (e.g., smart light bulbs) and second type of external device 655 (e.g., a smart plug)) support network reconfiguration.

Figure 6Q:
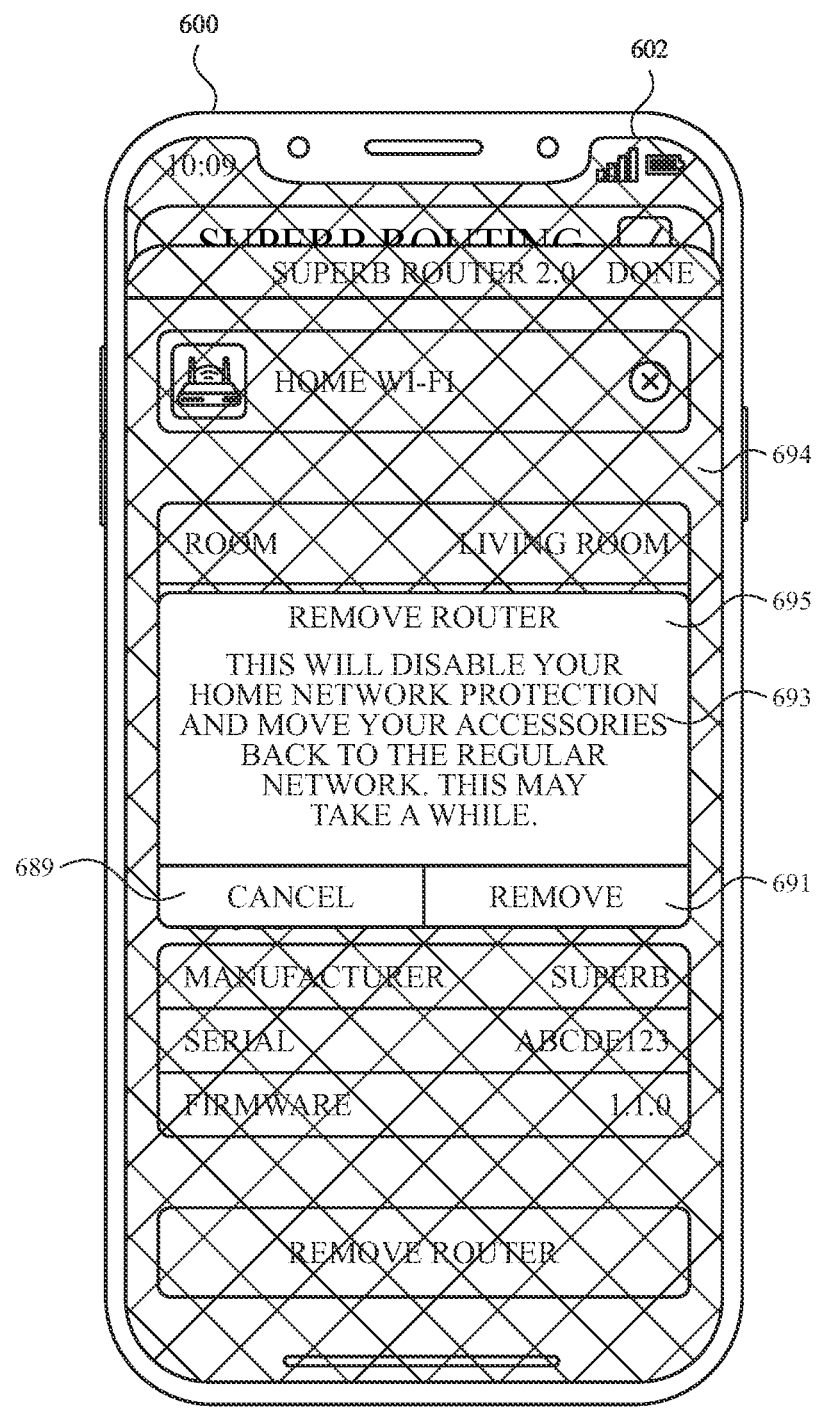

In FIG. 6Q, in response to detecting activation 621 of affordance 697, in accordance with a determination that the replacement router is connected to the local network and all of the controllable external devices on the local network support network reconfiguration, electronic device 600 displays, over user interface 694, a notification 695 that includes an indication 693 that the current home application-enforced network access policy (or policies) will be disabled and that all of the applicable external devices on the local network (in this example, the set of first type of external devices 653A-653B (e.g., smart light bulbs) and second type of external device 655 (e.g., a smart plug)) will be returned to a regular, non-home application-enforced network policy. In some embodiments, notification 695 also includes a remove affordance 691 for proceeding with the removal of the replacement router and a cancel affordance 689 for not proceeding with the removal of the replacement router.

In some embodiments, in response to detecting an activation of (e.g., a selection of; a tap gesture or tap input on; a user input directed to) remove affordance 691, electronic device 600 removes the current network access policy (or policies) (e.g., based on a virtualized security network) that was enforced by the home application on the local network such that all of the controllable external devices on the local network (in this example, the set of first type of external devices 653A-653B (e.g., smart light bulbs) and second type of external device 655 (e.g., a smart plug)) are returned to a regular, non-home application-enforced network policy (e.g., based on a non-virtualized security network).

In some embodiments, when electronic device 600 detects activation 621 of affordance 697 in FIG. 6P, the replacement router is connected to the local network but at least one of the controllable external devices on the local network (in this example, at least one of external devices 653A-653B (e.g., smart light bulbs) and/or second type of external device 655 (e.g., a smart plug)) do not support network reconfiguration.

Figure 6R:
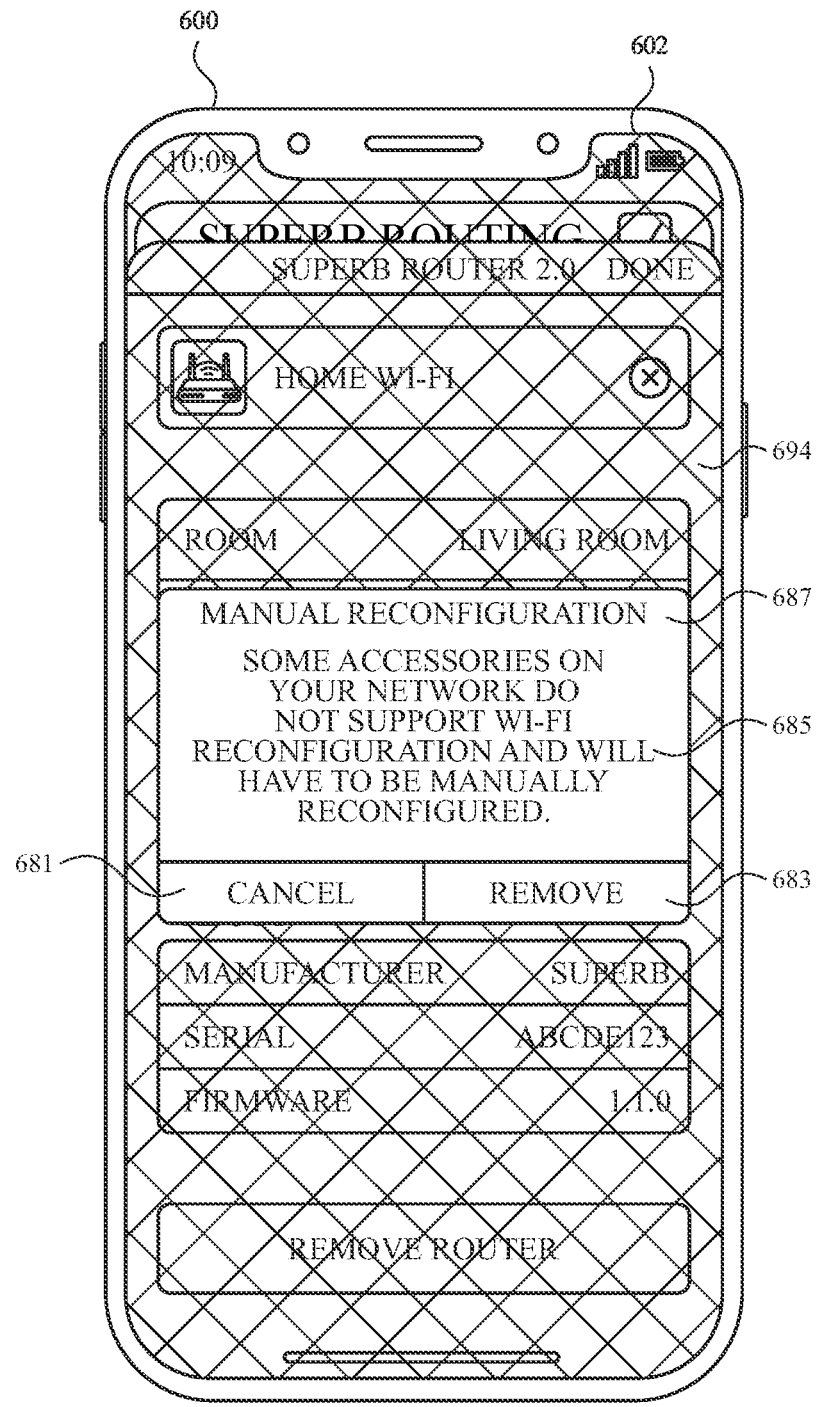
Figure 6S:
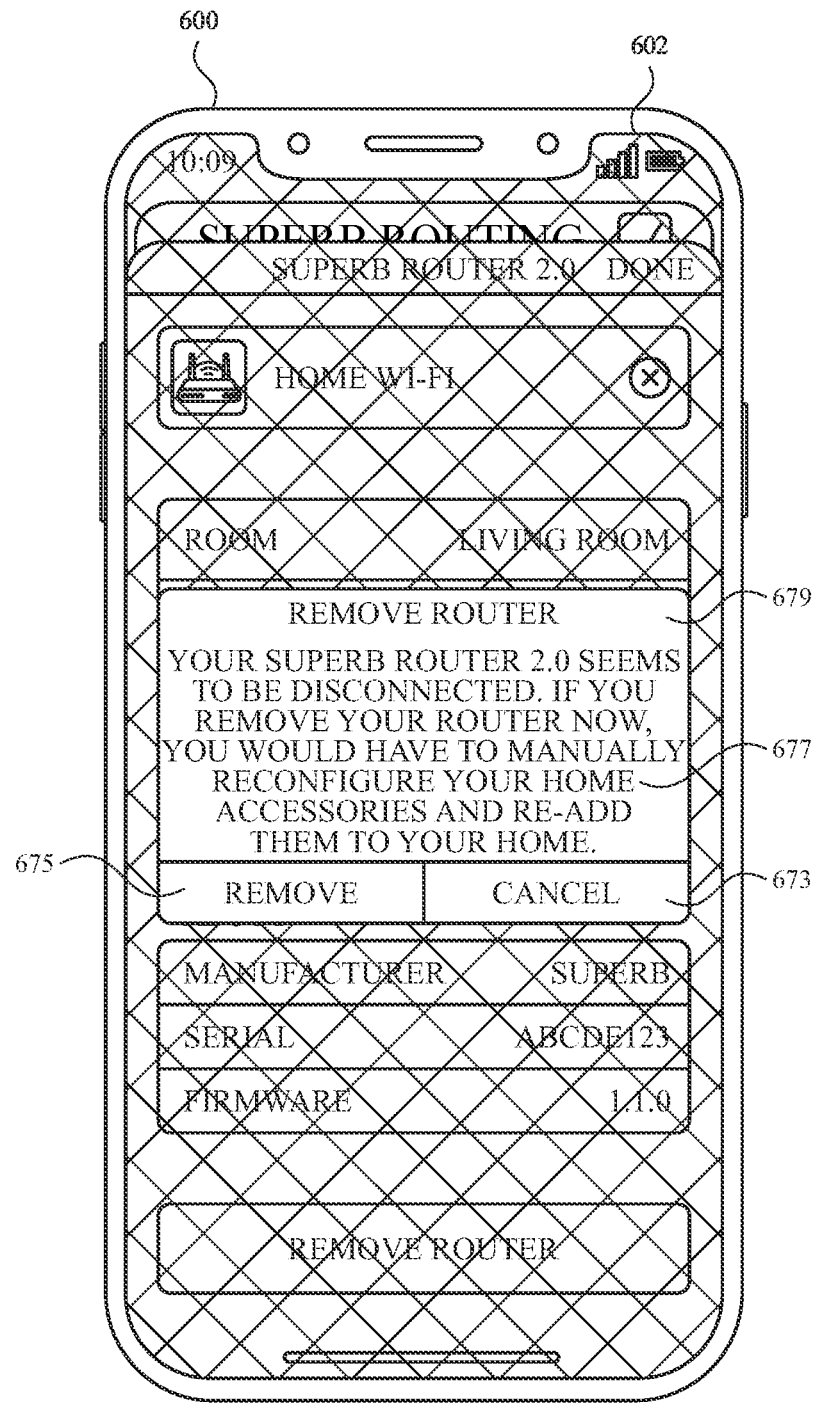
Figure 7A:
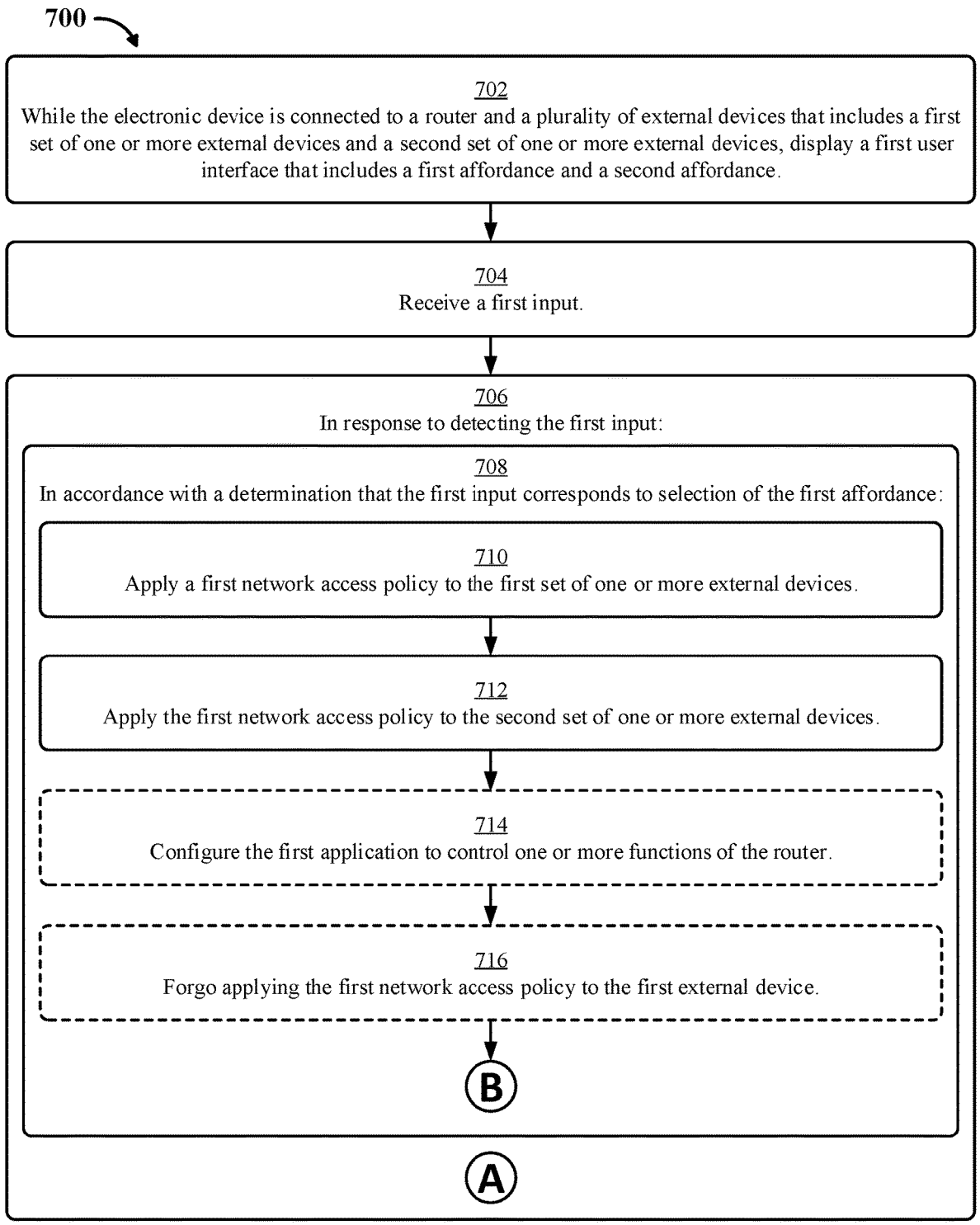
FIGS. 7A-7D are a flow diagram illustrating a method for managing and securing a local network using an electronic device, in accordance with some embodiments.
Figure 7B:
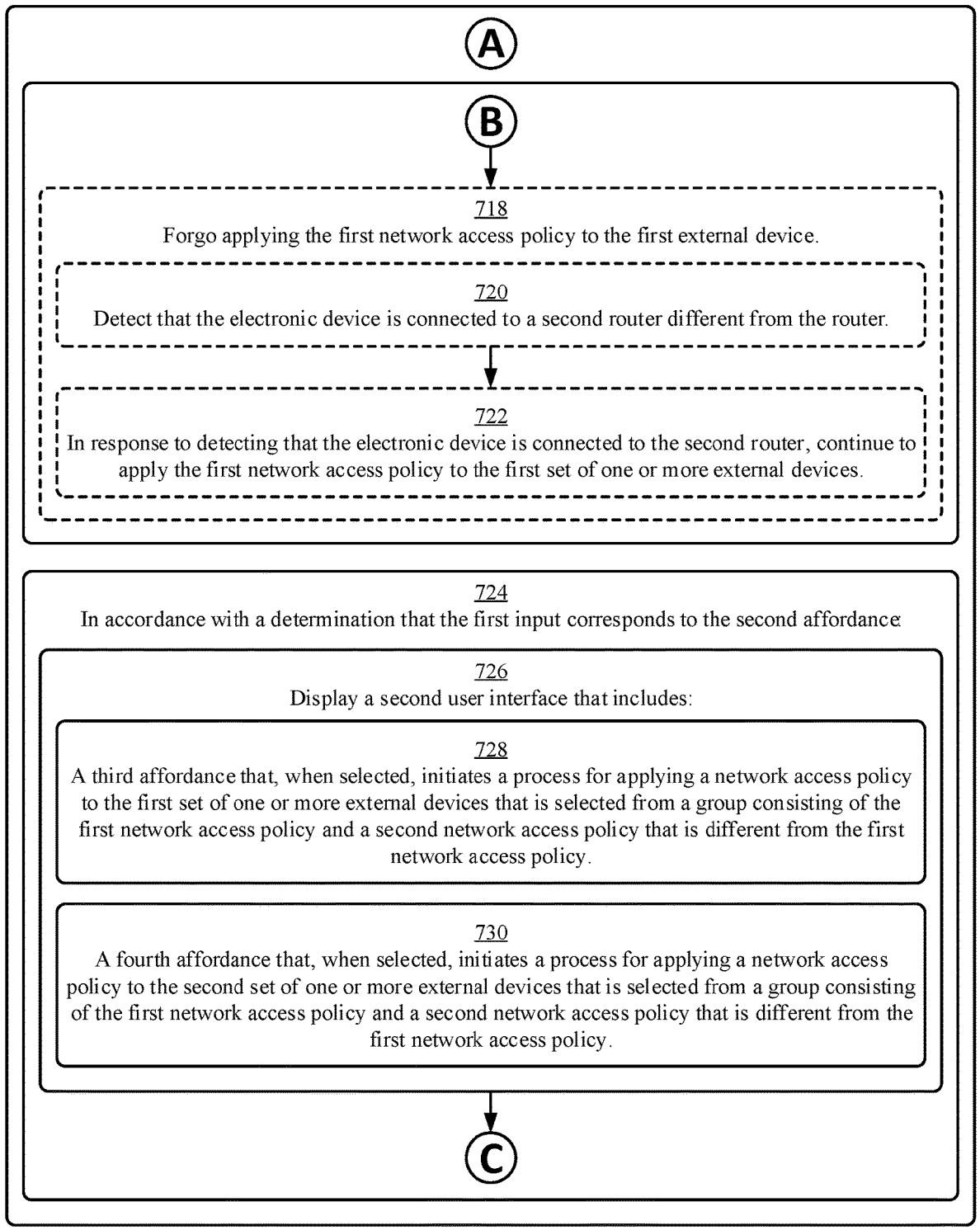
Figure 7C:
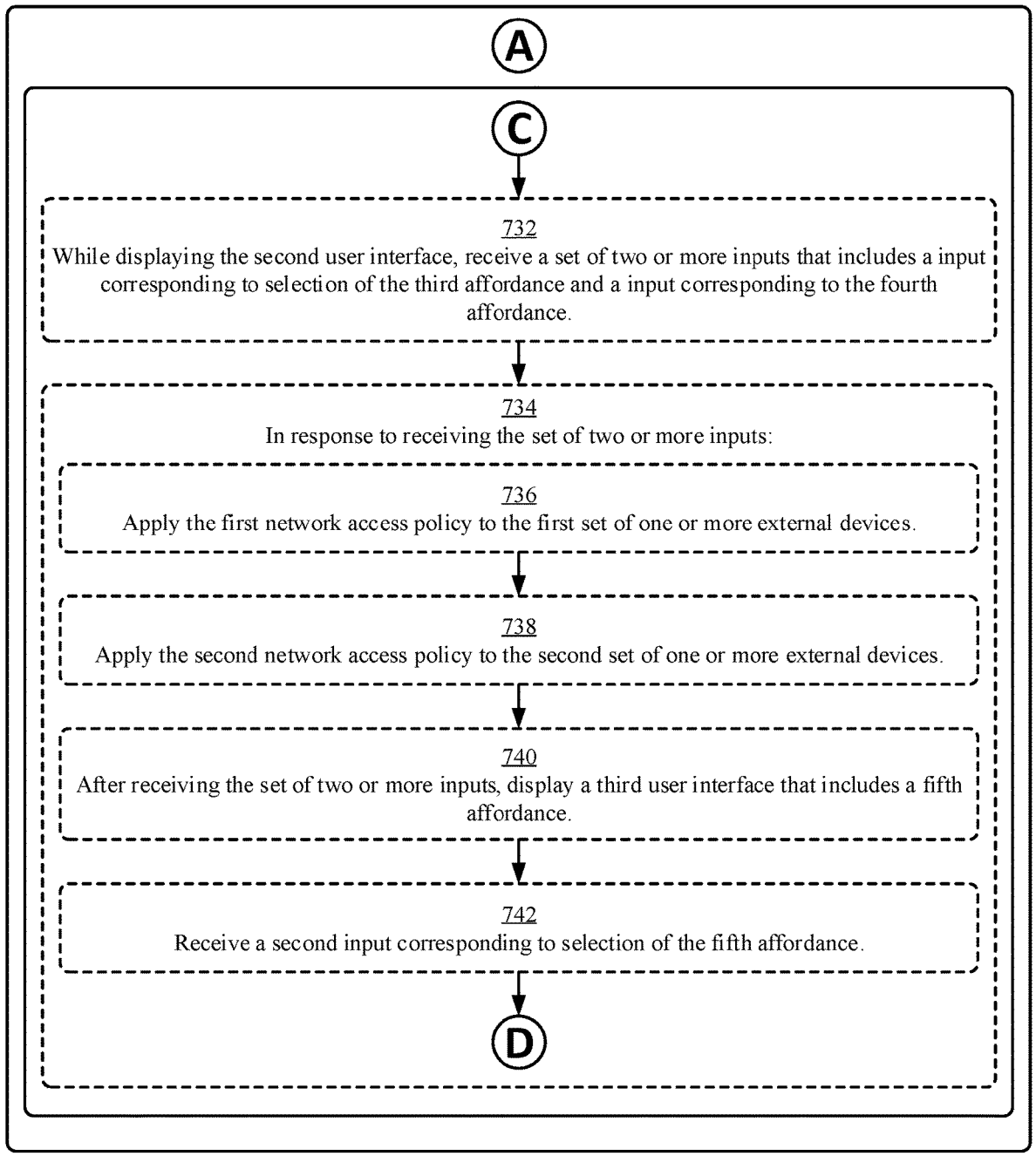
Figure 7D:
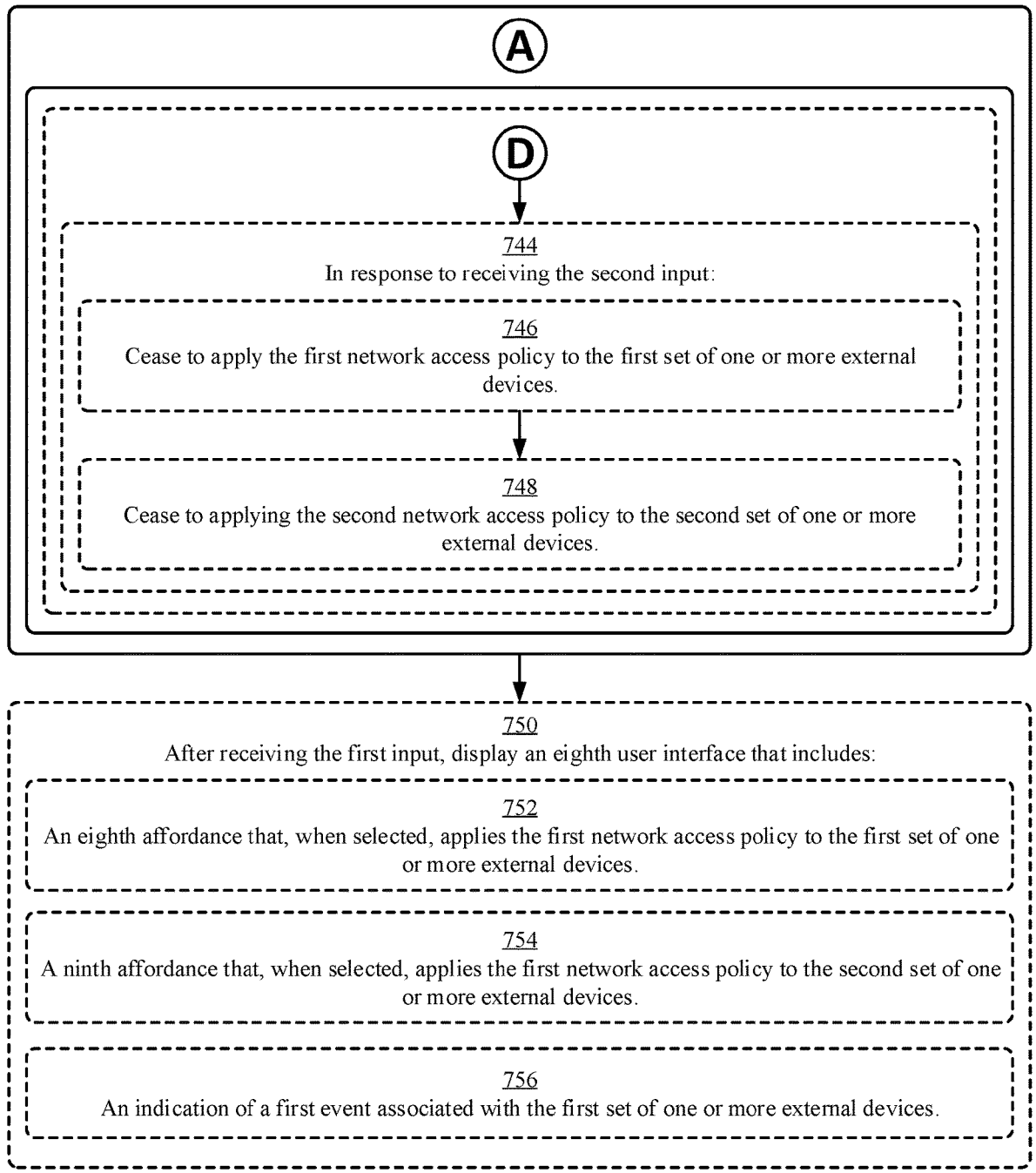

In FIG. 6R, in response to detecting activation 621 of affordance 697, in accordance with a determination that the replacement router is connected to the local network but at least one of the controllable external devices on the local network do not support network reconfiguration, electronic device 600 displays, over user interface 694, a notification 687 that includes an indication 685 but that the at least one of the controllable external devices on the local network will need to manually reconfigured (e.g., re-booted, re-plugged) in order for the respective external device(s) to return to the regular, non-home application-enforced network policy. In some embodiments, notification 687 also includes a remove affordance 683 for proceeding with the removal of the replacement router and a cancel affordance 681 for not proceeding with the removal of the replacement router.

In some embodiments, in response to detecting an activation of (e.g., a selection of; a tap gesture or tap input on; a user input directed to) remove affordance 683, electronic device 600 removes the current network access policy (or policies) (e.g., based on a virtualized security network) that was enforced by the home application on the local network such that a compatible external device(s) on the local network (e.g., the set of first type of external devices 653A-653B (e.g., smart light bulbs)) is automatically returned to the non-home application-enforced network policy (e.g., based on a non-virtualized security network) while a non-compatible external device(s) on the local network (e.g., the second type of external device 655) is not automatically returned to the regular, non-home application-enforced network policy.

In some embodiments, when electronic device 600 detects activation 621 of affordance 697 in FIG. 6P, the replacement router is not connected to the local network (e.g., because the replacement router was already manually removed (e.g., unplugged) from the local network).

In FIG. 6S, in response to detecting activation 621 of affordance 697, in accordance with a determination that the replacement router is not connected to the local network, electronic device 600 displays, over user interface 694, a notification 679 that includes an indication 677 the replacement router is (or appears to be) disconnected from the local network, and that removal of the replacement router at this team would lead to all controllable external devices (in this example, the set of first type of external devices 653A-653B (e.g., smart light bulbs) and second type of external device 655 (e.g., a smart plug)) having to be manually reconfigured (e.g., re-booted, re-plugged) in order for the respective external device(s) to return to the regular, non-home application-enforced network policy. In some embodiments, notification 679 also includes a remove affordance 673 for proceeding with the removal of the replacement router and a cancel affordance 675 for not proceeding with the removal of the replacement router.

In some embodiments, in response to detecting an activation of (e.g., a selection of; a tap gesture or tap input on; a user input directed to) remove affordance 673, electronic device 600 removes the replacement router but does not automatically return the controllable external devices (in this example, the set of first type of external devices 653A-653B (e.g., smart light bulbs) and second type of external device 655 (e.g., a smart plug)) to the regular, non-home application-enforced network policy.

FIGS. 7A-7D are a flow diagram illustrating a method for managing a local network (e.g., a home network) using an electronic device, in accordance with some embodiments. Method 700 is performed at an electronic device (e.g., 100, 300, 500, 600) with a display (e.g., 602; a touch-sensitive display). Some operations in method 700 are, optionally, combined, the orders of some operations are, optionally, changed, and some operations are, optionally, omitted.

As described below, method 700 provides an intuitive way for managing a local network using an electronic device (e.g., 600). The method reduces the cognitive burden on a user for managing a local network (e.g., a home network) using an electronic device (e.g., 600), thereby creating a more efficient human-machine interface. For battery-operated computing devices, enabling a user to manage a local network faster and more efficiently conserves power and increases the time between battery charges.

While the electronic device (e.g., 600) is connected (e.g., wireless; via a wire) to a router (e.g., 651; a packet-forwarding networking device for managing a local area network) and a plurality of external devices (e.g., 653A-653B, 655; controllable electronic devices (e.g., smart lights, smart outlets) (e.g., connected via the router (e.g., the electronic device and the plurality of external devices are on the same local area network managed by the router)) that includes a first set of one or more external devices (e.g., 653A-653B) and a second set of one or more external devices (e.g., 655), the electronic device displays (702) a first user interface (e.g., 616) that includes a first affordance (e.g., 620) and a second affordance (e.g., 622). In some embodiments, the electronic device (e.g., 600) is both connected to the plurality of external devices (e.g., 653A-653B, 655) and configured to control (e.g., remotely control) one or more functions of each of the plurality of external devices using a first application that generates the first user interface (e.g., 616). In some embodiments, the first user interface (e.g., 616) is displayed during a configuration process for configuring one or more settings of the router and/or for associating the router with the first application (e.g., configuring the router and/or the first application to permit the first application to control one or more functions of the router). In some embodiments, the electronic device (e.g., 600) is part of local area network managed by the router (e.g., 651).

In some embodiments, the one or more devices of the first set of one or more devices are associated with (e.g., are identified as being associated with or provided by) a first device source (e.g., manufacturer, distributor, supplier). In some embodiments, the one or more devices of the second set of one or more devices are associated with a second device source different from the first device source. In some embodiments, the third affordance (e.g., 640) described below and the fourth affordance (e.g., 642) described below each included indications of the associated device source.

In some embodiments, the one or more devices of the first set of one or more devices are devices of a first type (e.g., a category of devices, such as lights or outlets). In some embodiments, the one or more devices of the second set of one or more devices are devices of a second type different from the first type. In some embodiments, the third affordance (e.g., 640) described below and the fourth affordance (e.g., 642) described below each included indications of the associated device type.

In some embodiments, prior to displaying the first user interface (e.g., 616), the electronic device (e.g., 600) displays a sixth user interface (e.g., 655, 682; a user interface generated by an application provided by a source of the router) that includes a seventh affordance (e.g., 608, 686). In some embodiments, the electronic device (e.g., 600) receives a third user input corresponding to the seventh affordance (e.g., 608, 686). In some embodiments, displaying the first user interface (e.g., 616) occurs in response to the third user input. In some embodiments, displaying the first user interface (e.g., 616) includes maintaining display of at least a first portion of the sixth user interface (e.g., 655, 682). In some embodiments, the first user interface (e.g., 616) is overlaid over a portion of the sixth user interface (e.g., 655, 682). In some embodiments, dismissing the first user interface (e.g., after completion of a configuration process for the router) causes the sixth user interface to be restored/uncovered. Displaying the first user interface while maintaining display of at least a first portion of the sixth user interface and/or displaying the first user interface overlaid over a portion of the sixth user interface enables a user to recognize that all of the sixth user interface can be quickly and easily re-displayed. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device (e.g., 600) receives (704) a first input (e.g., a tap at a location on touch-sensitive display (e.g., 602) of the electronic device).

In response to receiving the first input (706), in accordance with a determination that the first input corresponds to selection of the first affordance (e.g., 620; an automatic configuration affordance) (708), the electronic device (e.g., 600) applies (710) a first network access policy (e.g., a policy that controls the first set of one or more external devices' access to one or more local and/or remote network domains/addresses; a policy that is administered/enforced via the router (e.g., via one or more functions and/or settings of the router)) to the first set of one or more external devices (e.g., 653A-653B). Automatically applying the first network access policy to the first set of one or more external devices in accordance with a determination that the first input corresponds to selection of the first affordance enables a user to quickly and easily apply a network access policy to the first set of one or more external devices. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the first input (706), in accordance with a determination that the first input corresponds to selection of the first affordance (e.g., 620; an automatic configuration affordance) (708), the electronic device (e.g., 600) applies (712) the first network access policy to the second set of one or more external devices (e.g., 655). Automatically applying the first network access policy to the second set of one or more external devices in accordance with a determination that the first input corresponds to selection of the first affordance enables a user to quickly and easily apply a network access policy to the second set of one or more external devices. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface (e.g., 616) is associated with (e.g., generated by) a first application that is configured to control one or more functions of the first set of one or more external devices (e.g., 653A-653B) and one or more functions of the second set of one or more external devices (e.g., 655). In some embodiments, in response to receiving the first input (706), in accordance with the determination that the first input corresponds to selection of the first affordance (e.g., 620) (708), the electronic device (e.g., 600) configures (714) the first application to control one or more functions of the router (e.g., 651). In some embodiments, the electronic device (e.g., 600) also initiates a process to associate the router (e.g., 651) with a location (e.g., a room) that is also associated with an external device of the plurality of external devices in the first application.

In some embodiments, after receiving the first input, the electronic device (e.g., 600) displays a seventh user interface (e.g., 658; a control user interface). In some embodiments, the seventh user interface (e.g., 658) includes a first control affordance (e.g., 660A, 660B) that, when selected, transmits a command to the first set of external devices (e.g., 653A, 653B) to perform a first function (e.g., turning on a light, turning off a light). In some embodiments, the seventh user interface (e.g., 658) includes a second control affordance (e.g., 600C) that, when selected, transmits a command to the second set of external devices (e.g., 655) to perform a second function. In some embodiments, the seventh user interface (e.g., 658) does not include a third control affordance that, when selected, transmits a command to the router (e.g., 651) to perform a third function (e.g., a function of the router; any function of the router). In some embodiments, the seventh user interface (e.g., 658) does not include any affordances associated with the router (e.g., 651). Not including the third control affordance that, when selected, transmits a command to the router to perform a third function prevents unnecessarily clustering the UI with features that are not likely to be used to be useful, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the router (e.g., 651) is connected to a first external device (e.g., 600B). In some embodiments, the first external device (e.g., 600B) is a device that is part of the local area network managed by the router (e.g., 651), but is not a device that is controllable by the electronic device (e.g., 600). In some embodiments, in response to receiving the first input (706), in accordance with determination that the first input corresponds to selection of the first affordance (e.g., 620) (708), the electronic device (e.g., 600) forgoes applying (716) the first network access policy to the first external device (e.g., 600B). In some embodiments, selection of the first affordance (e.g., 620) only applies the first network access policy to devices that the external device (e.g., 653A-653B, 655) is currently configured to control one or more functions of.

In some embodiments, the first network access policy is managed by (e.g., administered, controlled by the packet routing function of) the router (e.g., 651). In some embodiments, after applying the first network access policy to the first set of one or more external devices (718), the electronic device (e.g., 600) detects (720) that the electronic device is connected to a second router (e.g., and no longer connected to the router) different from the router (e.g., detecting that the electronic device is now a part of a local area network managed by the second router and no longer part of a local area network managed by the router). In some embodiments, in response to detecting that the electronic device (e.g., 600) is connected to the second router, the electronic device continues to apply (722) the first network access policy to the first set of one or more external devices (e.g., 653A-653B). In some embodiments, an applied network access policy is transferred to the second router and then managed through the second router. Continuing to apply the first network access policy to the first set of one or more external devices in response to detecting that the electronic device is connected to the second router (e.g., without any further user input) enables a user to quickly and easily switch routers without having to re-apply the first network access policy to the first set of one or more external devices. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the first input and in accordance with determination that the first input corresponds to selection of the first affordance (e.g., 620), the electronic device (e.g., 600) displays a fourth user interface (e.g., 624, 694; a router information user interface). In some embodiments, the fourth user interface (e.g., 624, 694; includes first information associated with the router (e.g., 651) selected from the group consisting of: a serial number, a firmware version, and a router source (e.g., manufacturer, distributor, supplier). In some embodiments, the fourth user interface (e.g., 624, 694) includes second information associated with the router selected from the group consisting of: a serial number, a firmware version, and a router source. In some embodiments, the fourth user interface (e.g., 624, 694) includes one or more affordances for adjusting settings of the router.

In some embodiments, the fourth user interface (e.g., 624, 694) includes a sixth affordance that, when selected, causes display of a fifth user interface that is generated by an application other than the application that generates the first user interface. In some embodiments, the fifth user interface is generated by an application provided by the router source (e.g., manufacturer, distributor, supplier).

In response to receiving the first input (706), in accordance with a determination that the first input corresponds to the second affordance (e.g., 622) (724), the electronic device (e.g., 600) displays (726) a second user interface (e.g., 636; a router network access policy setting interface). In some embodiments, the electronic device (e.g., 600) also forgoes applying the first network access policy to the first set of one or more external devices (e.g., 653A-653B) and the second set of one or more external devices (e.g., 655), based on receiving the first input.

The second user interface (e.g., 636) includes (726) a third affordance (e.g., 640; an affordance that is associated with a sub-set of the plurality of external devices that includes the first set of one or more external devices) that, when selected, initiates a process for applying a network access policy to the first set of one or more external devices (e.g., 653A-653B) (e.g., without applying a policy to the second set of one or more external devices) that is selected from a group consisting of the first network access policy and a second network access policy that is different from the first network access policy (728).

The second user interface (e.g., 636) includes (726) a fourth affordance (e.g., 642; an affordance that is associated with a sub-set of the plurality of external devices that includes the second set of one or more external devices) that, when selected, initiates a process for applying a network access policy to the second set of one or more external devices (e.g., 655) (e.g., a policy independent of the policy applied to the first set of one or more external devices) that is selected from a group consisting of the first network access policy and a second network access policy that is different from the first network access policy (730). Displaying the second user interface with the second affordance and the fourth affordance enables a user to quickly and easily customize security settings for different sets of external devices connected to the network. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first network access policy (in some embodiments, also the second network access policy) is selected from the group consisting of: a network access policy that permits (e.g., only permits) affected devices to access devices, addresses, and domains on the local area network managed by the router (e.g., 651), and a network access policy that permits (e.g., only permits) affected devices to access devices, addresses, or domains on the local area network managed by the router or included on a white list of approved devices, addresses, or domains. In some embodiments, the first access policy can also be a policy that permits access to any devices, addresses, or domain.

In some embodiments, while displaying the second user interface (e.g., 636), the electronic device (e.g., 600) receives (732) a set of two or more inputs that includes a input corresponding to selection of the third affordance (e.g., 640) and a input corresponding to the fourth affordance (e.g., 642). In some embodiments, in response to receiving the set of two or more inputs (734), the electronic device (e.g., 600) applies (736) the first network access policy to the first set of one or more external devices (e.g., 653A-653B). In some embodiments, in response to receiving the set of two or more inputs (734), the electronic device (e.g., 600) applies (738) the second network access policy to the second set of one or more external devices (e.g., 655).

In some embodiments, after receiving the set of two or more inputs, the electronic device (e.g., 600) displays (740) a third user interface (e.g., 636; a router network access policy setting interface; the second user interface) that includes a fifth affordance (e.g., 646; a disable affordance). In some embodiments, the electronic device (e.g., 600) receives (742) a second input corresponding to selection of the fifth affordance (e.g., 646). In some embodiments, in response to receiving the second input (744), the electronic device (e.g., 600) ceases (746) to apply the first network access policy to the first set of one or more external devices (e.g., 653A-653B). In some embodiments, in response to receiving the second input (744), the electronic device (e.g., 600) ceases (748) to apply the second network access policy to the second set of one or more external devices (e.g., 655). In some embodiments, selection of the fifth affordance (e.g., 646) causes network access policies that are being managed by the electronic device (e.g., 600) to be disabled. Ceasing to apply the first network access policy to the first set of one or more external devices and ceasing to apply the second network access policy to the second set of one or more external devices after receiving the set of two or more inputs enables a user to, when needed, quickly and easily disable active security settings on the network. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after receiving the first input, the electronic device (e.g., 600) displays (750) an eighth user interface (e.g., a management interface for the first set of one or more external devices). In some embodiments, the eighth user interface includes an eighth affordance that, when selected, applies the first network access policy to the first set of one or more external devices (e.g., 653A-653B) (752). In some embodiments, the eighth user interface includes a ninth affordance that, when selected, applies the first network access policy to the second set of one or more external devices (e.g., 655) (754). In some embodiments, the eighth user interface includes an indication (e.g., a graphical indication, a text indication) of a first event (e.g., a software/firmware update; a connection block event based on an applied network access policy; a connection permitted event based on an applied network access policy) associated with the first set of one or more external devices (756). In some embodiments, the eight user interface includes an event log of events (e.g., network-related events) effecting the first set of one or more external devices (e.g., 653A-653B).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve network security. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve security on local WiFi networks. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide account information regarding their router hardware and/or accounts associated therewith. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the external device management software, or publicly available information.

What is claimed is:

1. An electronic device, comprising:
   a display;
   one or more processors; and
   memory storing one or more programs configured to be executed by the one or more processors, the one or more programs including instructions for:
      applying, with a first router, a network access policy to one or more devices of a local network, wherein the first router is associated with an automation application;
      displaying, via the display, a user interface including an affordance for associating a second router with the automation application;
      receiving a user input on the affordance for associating the second router with the automation application; and
      in response to receiving the user input:
         associating the automation application with the second router; and
         applying, with the second router, the network access policy to the one or more devices.

2. The electronic device of claim 1, the one or more programs further including instructions for:
   in response to receiving the user input,
      removing the first router from the automation application.

3. The electronic device of claim 1, wherein the user interface includes an indication that the second router is online.

4. The electronic device of claim 1, wherein the automation application is a smart home management application.

5. The electronic device of claim 1, wherein the network access policy includes a plurality of security settings for the one or more devices of the local network.

6. The electronic device of claim 1, wherein applying, with the second router, the network access policy to the one or more devices includes continuing to apply the network access policy with the second router, as applied with the first router.

7. A method comprising:
   at an electronic device with a display:
      applying, with a first router, a network access policy to one or more devices of a local network, wherein the first router is associated with an automation application;
      displaying, via the display, a user interface including an affordance for associating a second router with the automation application;
      receiving a user input on the affordance for associating the second router with the automation application; and
      in response to receiving the user input:
         associating the automation application with the second router; and
         applying, with the second router, the network access policy to the one or more devices.

8. A non-transitory computer-readable storage medium storing one or more programs configured to be executed by one or more processors of an electronic device with a display, the one or more programs including instructions for:

applying, with a first router, a network access policy to one or more devices of a local network, wherein the first router is associated with an automation application;

displaying, via the display, a user interface including an affordance for associating a second router with the automation application;

receiving a user input on the affordance for associating the second router with the automation application; and in response to receiving the user input:
associating the automation application with the second router; and
applying, with the second router, the network access policy to the one or more devices.

9. The method of claim 7, further comprising:
in response to receiving the user input,
removing the first router from the automation application.

10. The method of claim 7, wherein the user interface includes an indication that the second router is online.

11. The method of claim 7, wherein the automation application is a smart home management application.

12. The method of claim 7, wherein the network access policy includes a plurality of security settings for the one or more devices of the local network.

13. The method of claim 7, wherein applying, with the second router, the network access policy to the one or more devices includes continuing to apply the network access policy with the second router, as applied with the first router.

14. The non-transitory computer-readable storage medium of claim 8, the one or more programs further including instructions for:
in response to receiving the user input,
removing the first router from the automation application.

15. The non-transitory computer-readable storage medium of claim 8, wherein the user interface includes an indication that the second router is online.

16. The non-transitory computer-readable storage medium of claim 8, wherein the automation application is a smart home management application.

17. The non-transitory computer-readable storage medium of claim 8, wherein the network access policy includes a plurality of security settings for the one or more devices of the local network.

18. The non-transitory computer-readable storage medium of claim 8, wherein applying, with the second router, the network access policy to the one or more devices includes continuing to apply the network access policy with the second router, as applied with the first router.

* * * * *